(12) United States Patent
Arai

(10) Patent No.: US 7,404,851 B2
(45) Date of Patent: Jul. 29, 2008

(54) INK COMPOSITION AND RECORDING METHOD USING THE SAME

(75) Inventor: Yoshimitsu Arai, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/700,818

(22) Filed: Feb. 1, 2007

(65) Prior Publication Data

US 2007/0176991 A1 Aug. 2, 2007

(30) Foreign Application Priority Data

Feb. 2, 2006 (JP) .............................. 2006-025801

(51) Int. Cl.
*C09D 11/00* (2006.01)
*C09D 11/02* (2006.01)
*B41J 2/01* (2006.01)

(52) U.S. Cl. .............. 106/31.48; 106/31.58; 106/31.77; 106/31.86; 106/31.87; 347/100

(58) Field of Classification Search .............. 106/31.48, 106/31.58, 31.77, 31.86, 31.87; 347/100
See application file for complete search history.

(56) References Cited

U.S. PATENT DOCUMENTS

| | | | | |
|---|---|---|---|---|
| 5,501,726 A | * | 3/1996 | Yui et al. ................. | 106/31.58 |
| 5,622,549 A | * | 4/1997 | Yui et al. ................. | 106/31.58 |
| 7,025,818 B2 | * | 4/2006 | Miyamoto et al. ........ | 106/31.58 |
| 7,048,789 B2 | * | 5/2006 | Taguchi et al. ........... | 106/31.43 |
| 7,083,666 B2 | * | 8/2006 | Taguchi et al. ........... | 106/31.43 |
| 7,108,743 B2 | * | 9/2006 | Fujiwara et al. .......... | 106/31.48 |
| 2004/0246321 A1 | * | 12/2004 | Takashima et al. .......... | 347/100 |
| 2005/0178288 A1 | * | 8/2005 | Taguchi ................... | 106/31.13 |
| 2006/0009357 A1 | * | 1/2006 | Fujiwara et al. ............. | 503/227 |
| 2006/0268086 A1 | * | 11/2006 | Kawakami et al. .......... | 347/100 |
| 2007/0176992 A1 | * | 8/2007 | Arai et al. ................... | 347/100 |

FOREIGN PATENT DOCUMENTS

| | | | |
|---|---|---|---|
| EP | 1251154 | * | 10/2002 |
| JP | 55-161856 A | | 12/1980 |
| JP | 61-36362 A | | 2/1986 |
| JP | 2-212566 A | | 8/1990 |
| JP | 11-504958 A | | 5/1999 |
| JP | 2002-371079 A | | 12/2002 |
| JP | 2002-371214 A | | 12/2002 |
| WO | WO 02/083795 | * | 10/2002 |
| WO | WO 03/066756 | * | 8/2003 |

* cited by examiner

*Primary Examiner*—Helene Klemanski
(74) *Attorney, Agent, or Firm*—Sughrue Mion, PLLC

(57) ABSTRACT

An ink composition which comprises a compound represented by formula (1), which is described in the specification; and a plurality of water-soluble organic solvents, wherein the water-soluble organic solvents contains at least a water-soluble organic solvent having a thioether or sulfoxide moiety in an amount of 10 mass % to 80 mass %, and a recording method which uses the ink composition.

8 Claims, No Drawings

INK COMPOSITION AND RECORDING METHOD USING THE SAME

BACKGROUND OF THE INVENTION

1. Field of the Invention

This invention relates to an ink composition and a recording method which use the same, particularly an ink composition suitable as an ink for ink jet recording use which can further improve ozone-proof property and inhibit changes in hue, and a recording method which use the same.

2. Description of the Related Art

In recent years, with the popularization of computers, ink jet printers are broadly used, not only at offices but also at homes, for the purpose of printing letters and pictures on paper, films, cloth and the like.

The ink jet recording method includes a system in which droplets are discharged by applying pressure using a piezo element, a system in which droplets are discharged by generating bubbles in the ink with heat, a system in which ultrasonic wave is used, and a system in which droplets are sucked and discharged by electrostatic force. As the ink for these ink jet recording system, water-color ink, oil base ink or solid (melt type) ink is used.

Among these inks, water-color ink is relatively superior to oil base ink and solid (melt type) ink, in terms of the possibility of taking a triangular position regarding its production, handling, odor, safety and the like, so that it is now the main stream of the ink for ink jet recording use.

For the dyes to be used in these inks for ink jet recording use, there are requirements such as high solubility in solvent (ink medium), ability to perform high density recording, proper hue, excellent solidity for light, heat, air, water and drugs, good fixing ability to and difficulty in soaking into image receiving material, excellent shelf life as ink, no toxicity, high purity and inexpensive availability. However, it is extremely difficult to find a dye which satisfies the aforementioned various requirements at a high level. Particularly, the excellent hue and the solidity conflict in most cases, for example, it is difficult to obtain a coloring material for magenta ink use which satisfies the aforementioned various requirements, and it is particularly difficult to find a dye that has both of good magenta hue and light solidity capable of standing against oxidizing atmosphere.

Thus, though various dyes and pigments have already been proposed as compounds for ink jet use and are now actuary used, it is the present situation that a dye which satisfies all of the aforementioned requirements has not been found yet.

In the case of the conventionally well known dyes and pigments having color index (C.I.) numbers, it is difficult to simultaneously obtain both of the hue and solidity required for the ink for ink jet recording use.

As a dye capable of improving solidity, azo dyes derived from an aryl amine and a 5-membered heterocyclic amine have been proposed, which are described in JP-A-55-161856 (the term "JP-A" as used herein means an "unexamined published Japanese patent application"). However, since these dyes have undesirable hues in the yellow and cyan regions, they have a problem of worsening color reproducibility.

Inks for ink jet recording use have been disclosed in JP-A-61-36362 and JP-A-2-212566, with the aim of simultaneously obtaining the hue and light solidity. However, the dye used in each of the official gazettes is insufficient in terms of its solubility in water when used as a water-soluble ink. In addition, when the dye described in each of the official gazettes is used as a water-soluble ink for ink jet use, it also causes a problem in terms of wet heat solidity.

As a means for solving these problems, improved magenta pigments and inks which used the same proposed, as described in JP-T-11-504958 (the term "JP-T" as used herein means an "unexamined published international patent application in Japanese"), JP-A-2002-371079 and JP-A-2002-371214. However, these inks for ink jet recording use. were not sufficient in terms of their color reproducibility and solidity of output images.

In addition, it was revealed that shelf life of images is considerably worsened in some cases when images are recorded on a ink jet-exclusive use glossy paper for photographic image quality use and applied to an indoor wall or the like. The present inventors guess that this phenomenon is due to ozone and the like certain oxidizing gasses in the air. Also, this phenomenon hardly occurs when flow of the air is blocked by a treatment such as sealing in a glass frame, but its use conditions are limited.

Since this phenomenon is particularly significant on the ink jet-exclusive use glossy paper for photographic image quality use, this is a serious problem for the current ink jet recording system in which the photographic image quality is one of the important characteristics.

On the other hand, the ink for ink jet recording use which uses the aforementioned water-soluble dye has the aforementioned advantages, but on the contrary, it has a problem of generating changes in hue at the time of fading, so that its resolution is required.

SUMMARY OF THE INVENTION

The object of the invention is to solve the problems involved in the ink as described in the aforementioned related art, illustratively, to provide an ink composition which can further improve ozone-proof property and inhibit changes in hue, and a recording method which use the same.

The invention is as follows.

1) An ink composition which comprises:

a compound represented by formula (1); and a plurality of water-soluble organic solvents, wherein the water-soluble organic solvents contains at least a water-soluble organic solvent having a thioether or sulfoxide moiety in an amount of 10 mass % to 80 mass % (In this specification, mass ration is equal to weight ratio):

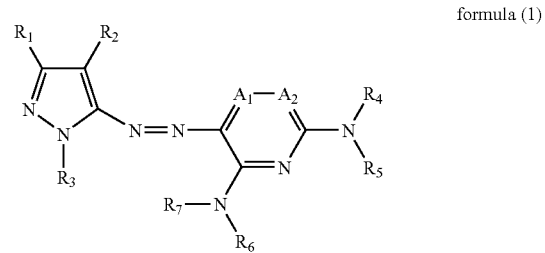

formula (1)

in formula (1), $R_1$ represents hydrogen atom, alkyl group, cycloalkyl group, aralkyl group, aryl group, heterocyclic group or acyl group, wherein each substituent group may be further substituted;

$R_2$ represents hydrogen atom, halogen atom or cyano group;

$R_3$ represents hydrogen atom, alkyl group, cycloalkyl group, aralkyl group, alkenyl group, aryl group, heterocyclic group, carboxyl group or sulfo group, wherein each substituent group may be further substituted;

$R_4$, $R_5$, $R_6$ and $R_7$ each independently represents hydrogen atom; alkyl group, cycloalkyl group, aralkyl group, alkenyl group, aryl group, heterocyclic group, sulfonyl group, acyl group, carboxyl group, sulfo group or carbamoyl group, wherein each substituent group may be further substituted, with the proviso that $R_4$ and $R_5$ are not hydrogen atoms at the same time, and $R_6$ and $R_7$ are not hydrogen atoms at the same time; and both of $A_1$ and $A_2$ are carbon atoms which may be substituted, or one of them is a carbon atom which may be substituted and the other is a nitrogen atom.

2) An ink composition which comprises:
a compound which is represented by formula (2) and has at least one ionic hydrophilic group; and
a plurality of water-soluble organic solvents,
wherein the water-soluble organic solvents contains at least a water-soluble organic solvent having a thioether or sulfoxide moiety in an amount of 10 mass % to 80 mass %:

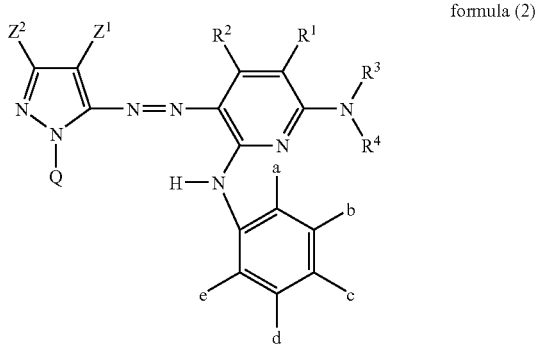

formula (2)

in formula (2), $R^1$ and $R^2$ each independently represents hydrogen atom, halogen atom, aliphatic group, aryl group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic ring oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group, wherein $R^1$ and $R^2$ may be bonded together to form a 5- or 6-membered ring;

$R^3$ and $R^4$ each independently represents hydrogen atom, aliphatic group, aryl group, heterocyclic group, acyl group, alkoxycarbonyl group, aryloxycarbonyl group, carbamoyl group, alkylsulfonyl group, arylsulfonyl group or sulfamoyl group, wherein $R^3$ and $R^4$ may be bonded together to form a 5- or 6-membered ring;

a and e each independently represents alkyl group, alkoxy group or halogen atom, wherein when both of a and e are alkyl groups, total of the number of carbons constituting the alkyl groups is 3 or more and each of the alkyl groups may be further substituted, and b, c and d each independently has the same meaning of $R^1$ or $R^2$, wherein a and b may be bonded together to form a condensed ring and e and d may be bonded together to form a condensed ring;

$Z^1$ represents an electron attractive group having a Hammett substituent constant up value of 0.20 or more;

$Z^2$ represents hydrogen atom, aliphatic group, aryl group or heterocyclic group; and
Q represents hydrogen atom, aliphatic group, aryl group or heterocyclic group.

3) The ink composition as described above in 1),
wherein the water-soluble organic solvent having a thioether or sulfoxide moiety is selected from the group consisting of 2,2'-thiodiethanol, dimethyl sulfoxide, 2,2-bishydroxyethyl sulfoxide and 3,6-dithiooctane 1,8 diol.

4) The ink composition as described above in 2),
wherein the water-soluble organic solvent having a thioether or sulfoxide moiety is selected from the group consisting of 2,2'-thiodiethanol, dimethyl sulfoxide, 2,2-bishydroxyethyl sulfoxide and 3,6-dithiooctane 1,8 diol.

5) A recording method, which uses an ink composition as described above in 1).

6) A recording method, which uses an ink composition as described above in 2).

7) The recording method as described above in 5), which is an ink jet recording method.

8) The recording method as described above in 6), which is an ink jet recording method.

DETAILED DESCRIPTION OF THE INVENTION

The following minutely describes on the illustrative embodiments of the invention.

Firstly, the compound represented by formula (1) (azo dye) is described.

Formula (1) is preferably formula (1-R1) and formula (1-H1). Further, formula (1-R1) is preferably formula (1-R2), formula (1-R3) and formula (1-R4). In the same manner, formula (1-H1) is preferably formula (1-H2). It is desirable that the compound represented by formula (1) is water-soluble.

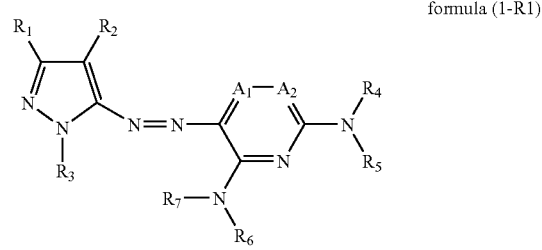

formula (1-R1)

In formula (1-R1), $R_1$, $R_2$, $R_4$, $R_5$, $R_6$, $R_7$, $A_1$ and $A_2$ are the same as those of formula (1), and $R_3$ is alkyl group, cycloalkyl group, aralkyl group, alkenyl group, aryl group, heterocyclic group, carboxyl group or sulfo group.

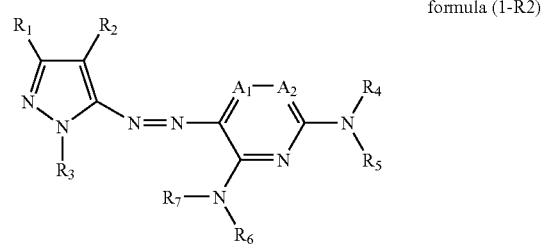

formula (1-R2)

In formula (1-R2), $R_1$, $R_2$, $R_3$, $R_5$, $R_6$, $R_7$, $A_1$ and $A_2$ are the same as those of formula (1), and $R_4$ is alkyl group, cycloalkyl group, aralkyl group, alkenyl group, aryl group or heterocyclic group, which may be substituted.

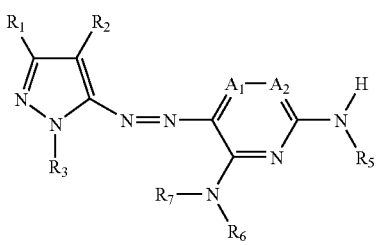

formula (1-R3)

In formula (1-R3), $R_1, R_2, R_3, R_5, R_6, R_7, A_1$ and $A_2$ are the same as those of formula (1-R1).

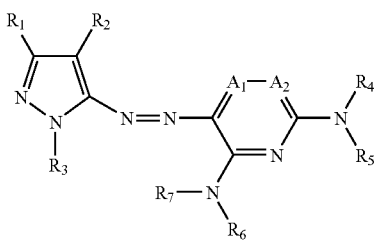

formula (1-R4)

In formula (1-R4), $R_1, R_2, R_3, A_1$ and $A_2$ are the same as those of formula (1-R1), and each of $R_4, R_5, R_6$ and $R_7$ is independently hydrogen atom, alkyl group, cycloalkyl group, aralkyl group, alkenyl group, aryl group, heterocyclic group, acyl group or carbamoyl group.

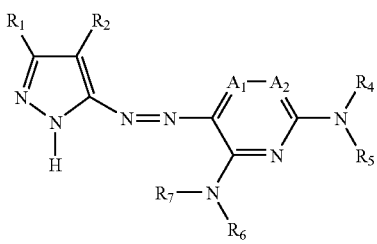

formula (1-H1)

In formula (1-H1), $R_1, R_2, R_4, R_5, R_6, R_7, A_1$ and $A_2$ are the same as those of formula (1).

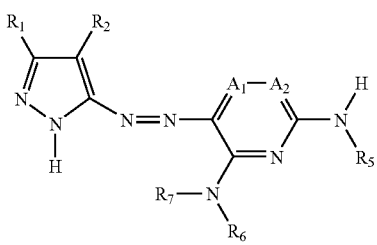

formula (1-H2)

In formula (1-H2), $R_1, R_2, R_6, A_1$ and $A_2$ are the same as those of formula (1-H1), and $R_5$ and $H_7$ are not hydrogen atoms.

The following illustratively describes the compound of the invention represented by formula (1). $R_1$ represents hydrogen atom, alkyl group, cycloalkyl group, aralkyl group, aryl group, heterocyclic group or acyl group, wherein each substituent group may be further substituted. An alkyl group having a substituent group and an unsubstituted alkyl group are included in the alkyl group. The aforementioned alkyl group is preferably an alkyl group having from 1 to 12 carbon atoms, when the carbon atoms of its substituent group are removed, more preferably an alkyl group having from 1 to 6 carbon atoms. Examples of the substituent group include hydroxyl group, alkoxy group, cyano group, halogen atom and ionic hydrophilic group. Examples of the alkyl group include methyl, ethyl, propyl, isopropyl, t-butyl, hydroxyethyl, methoxyethyl, cyanoethyl, trifluoromethyl, 3-sulfopropyl and 4-sulfobutyl. A cycloalkyl group having a substituent group and an unsubstituted alkyl group are included in the cycloalkyl group. The aforementioned cycloalkyl group is preferably a cycloalkyl group having from 5 to 12 carbon atoms, when the carbon atoms of its substituent group are removed. Examples of the substituent group include an ionic hydrophilic group. Examples of the cycloalkyl group include cyclohexyl group.

As the aralkyl group, an aralkyl group having a substituent group and an unsaturated aralkyl group are included. As the aralkyl group, an aralkyl group having from 7 to 12 carbon atoms, when the carbon atoms of its substituent group are removed, is desirable. Examples of the aforementioned substituent group include an ionic hydrophilic group. Examples of the aforementioned aralkyl group include benzyl group and 2-phenetyl group. An aryl group having a substituent group and an unsubstituted aryl group are included in the aryl group. As the aryl group, an aryl group having from 6 to 12 carbon atoms, when the carbon atoms of its substituent group are removed, is desirable. Examples of the substituent group include alkyl group, alkoxy group, halogen atom, alkylamino group, amido group, carbamoyl group, sulfamoyl group, sulfonamido group, hydroxyl group, ester group and ionic hydrophilic group. Examples of the aryl group include phenyl, p-tolyl, p-methoxyphenyl, o-chlorophenyl and m-(3-sulfopropylamino)phenyl.

A heterocyclic group having a substituent group and an unsubstituted heterocyclic group are included in the heterocyclic group. As the heterocyclic group, a 5- or 6-membered heterocyclic group is desirable. Examples of the substituent group include amido group, carbamoyl group, sulfamoyl group, sulfonamido group, hydroxyl group, ester group and ionic hydrophilic group. Examples of the heterocyclic group include 2-pyridyl group, 2-thienyl group, 2-thiazolyl group, 2-benzothiazolyl group and 2-furyl group. An acyl group having a substituent group and an unsubstituted acyl group are included in the acyl group. As the aforementioned acyl group, an acyl group having from 1 to 12 carbon atoms, when carbon atoms of its substituent group are removed, is desirable. Examples of the substituent group include an ionic hydrophilic group. Examples of the acyl group include acetyl group and benzoyl group.

$R_2$ represents hydrogen atom, halogen atom or cyano group. Each of $R_4, R_5, R_6$ and $R_7$ independently represents hydrogen atom, alkyl group, cycloalkyl group, aralkyl group, alkenyl group, aryl group, heterocyclic group, sulfonyl group, acyl group, carboxyl group or carbamoyl group, wherein each substituent group may be further substituted. Regarding the alkyl group, cycloalkyl group, aralkyl group, aryl group, heterocyclic group and acyl group, they are the same as those in the aforementioned $R_1$. An alkenyl group having a substituent group and an unsaturated alkenyl group are included in the alkenyl group. As the alkenyl group, an alkenyl group having from 5 to 12 carbon atoms, when the carbon atoms of its substituent group are removed, is desirable. Examples of the substituent group include an ionic hydrophilic group. Examples of the alkenyl group include vinyl group, allyl group and the like. As the sulfonyl group, an alkylsulfonyl group such as methanesulfonyl group and an arylsulfonyl group such as phenylsulfonyl group and the like are included. However, $R_4$ and $R_5$ are not hydrogen atoms at the same time, and $R_6$ and $R_7$ are not hydrogen atoms at the same time.

$R_3$ represents hydrogen atom, alkyl group, cycloalkyl group, aralkyl group, alkenyl group, aryl group, heterocyclic group, carboxyl group or sulfo group, wherein each substituent group may be further substituted. Details of these substituent groups are the same as the case of the aforementioned $R_4$, $R_5$, $R_6$ and $R_7$. Both of $A_1$ and $A_2$ are carbon atoms which may be substituted, or one of them is carbon atom which may be substituted and the other is nitrogen atom. Substituent group of the carbon atom which may be substituted is the same as the case of the aforementioned $R_4$, $R_5$, $R_6$ and $R_7$.

Regarding formula (1), examples of the preferable substituent groups represented by $R_1$ to $R_7$, $A_1$ and $A_2$ are shown in the following. As $R_1$, an alkyl group and an aryl group are desirable. In addition, among the alkyl group, isopropyl group and t-butyl group are most desirable. As the aryl group, phenyl group and phenyl group having an additional substituent group on either one of the 2-, 4- and 6-positions looking from the pyrazole mother nucleus side are desirable. Cyano group is most desirable as $R_2$.

An aryl group substituted with an electron attractive group or heterocyclic group is desirable as $R_3$. Now, the Hammett substituent constant $\sigma p$ value as used herein is described a little. The Hammett's rule is a rule of thumb proposed by L. P. Hammett in 1935 with the aim of quantitatively discussing influence of substituent groups upon the reaction or balance of benzene derivatives, and its pertinence is now broadly recognized. The substituent constant required by the Hammett's rule include up value and am value, these values can be found in many general books such as "Lange's Handbook of Chemistry" 12th edition, edited by J. A. Dean, 1979 (McGraw-Hill) and "Kagaku-no Ryoiki (Field of Chemistry" a special issue, No. 122, pp. 96-103, 1979 (Nanko-do). In this connection, each substituent group is restricted by the Hammett substituent constant up or described based thereon in the invention, but this does not mean that the invention is effected only when the substituent groups are limited to those which have the conventionally known values by references, which can be found in the aforementioned books, and it is needless to say that substituent groups considered to be within the measuring range based on the Hammett's rule are included therein even when the values cannot be found in references.

The aforementioned electron attractive group of $R_3$ is an electron attractive group having a Hammett substituent constant $\sigma p$ value of 0.20 or more, preferably 0.30 or more. The upper limit of $\sigma p$ value is preferably 1.0 or less. Illustrative examples of the electron attractive group having a up value of 0.20 or more include acyl group, acyloxy group, carboxyl group, carbamoyl group, alkoxycarbonyl group, aryloxycarbonyl group, cyano group, nitro group, a dialkylphosphono group, a diarylphosphono group, a diarylphosphinyl group, an alkylsulfinyl group, an arylsulfinyl group, an alkylsulfonyl group, an arylsulfonyl group, sulfonyloxy group, acylthio group, sulfamoyl group, thiocyanate group, thiocarbonyl group, an alkyl halide group, an alkoxy halide group, a aryloxy halide group, an alkylamino halide group, an alkylthio halide group, a heterocyclic group, a halogen atom, azo group, selenocyanate group and an aryl group substituted with other electron attractive group having a $\sigma p$ value of 0.20 or more, of which cyano group, nitro group and an halogen atom are desirable. The aforementioned heterocyclic group may be substituted or unsubstituted with an electron attractive group.

As is already described, both of $A_1$ and $A_2$ are carbon atoms which may be substituted, or one of them is carbon atom which may be substituted and the other is nitrogen atom. A case in which both of $A_1$ and $A_2$ are carbon atoms is desirable from the viewpoint that further superior performance can be exerted. As the additional substituent group of carbon atom, an alkyl group having from 1 to 3 carbon atoms, carboxyl group, carbamoyl group or cyano group is desirable. In addition, it is desirable that each of $R_4$, $R_5$, $R_6$ and $R_7$ is independently hydrogen atom, an alkyl group having from 1 to 8 carbon atoms, an aryl group, sulfonyl group, an acyl group or a heterocyclic group, most desirably sulfonyl group, an acyl group, an aryl group or a heterocyclic group. In this connection, though it is already described, $R_4$ and $R_5$ do not become hydrogen atoms at the same time, and $R_6$ and $R_7$ do not become hydrogen atoms at the same time.

When a compound of the invention represented by formula (1) is used as a water-soluble form, it is desirable that the compound is substituted with at least two or more of sulfo group or carboxyl group among $R_4$, $R_5$, $R_6$ and $R_7$, more desirably with three or more of sulfo group or carboxyl group.

Production method of the compound of the invention represented by formula (1) is conventionally known and is disclosed for example in JP-A-2002-371079.

Illustrative examples of the compound of the invention represented by formula (1) (exemplified compounds 1-1 to 8-3) are shown in the following, though not limited to the following examples.

TABLE 1

| Dye | $R_1$ | $R_2$ | $R_3$ |
|---|---|---|---|
| 1-1 | 2-benzothiazolyl | —C$_6$H$_4$—C$_8$H$_{17}$ | —C$_6$H$_4$—C$_8$H$_{17}$ |

TABLE 1-continued
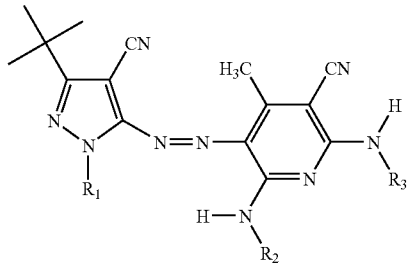
| Dye | R₁ | R₂ | R₃ |
|---|---|---|---|
| 1-2 | 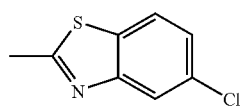 | 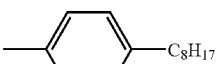 | 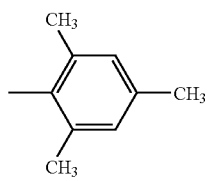 |
| 1-3 | 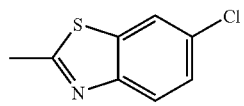 | 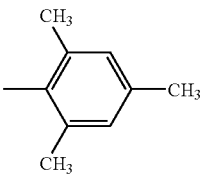 | 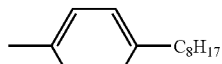 |
| 1-4 | 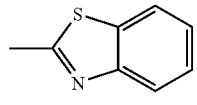 | 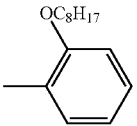 | 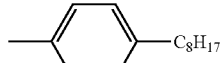 |
| 1-5 | 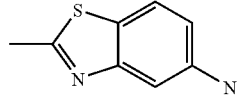 | 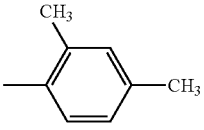 | 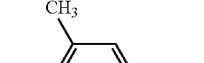 |
TABLE 2
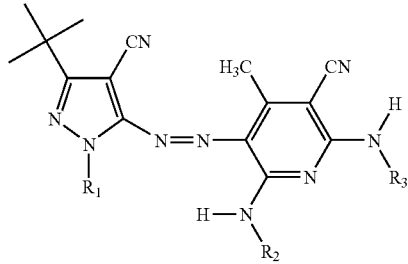
| Dye | R₁ | R₂ | R₃ |
|---|---|---|---|
| 1-6 | 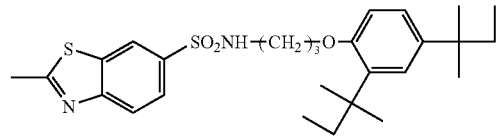 | 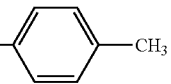 | 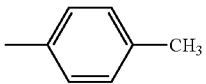 |

TABLE 2-continued
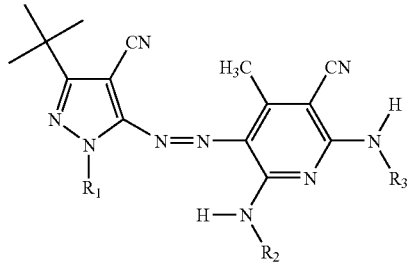
| Dye | R₁ | R₂ | R₃ |
|---|---|---|---|
| 1-7 | 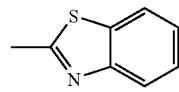 | 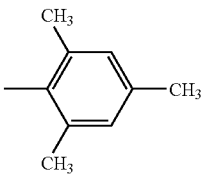 | 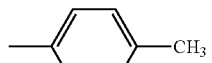 |
| 1-8 | 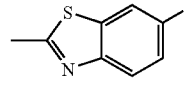 | 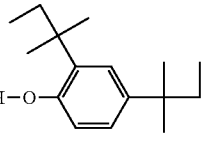 | 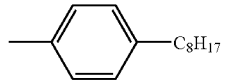 |
| 1-9 | 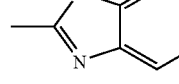 | 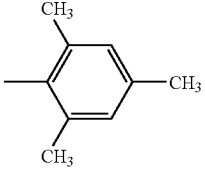 |  |
| 1-10 | 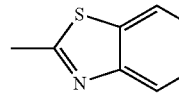 | 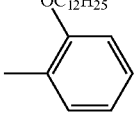 | 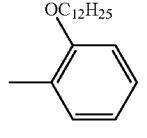 |
TABLE 3
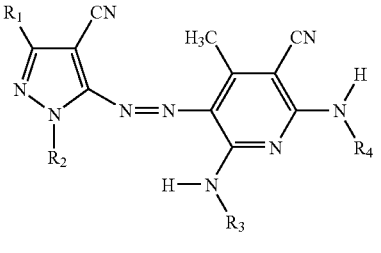
| Dye | R₁ | R₂ | R₃ | R₄ |
|---|---|---|---|---|
| 1-11 | 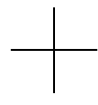 | 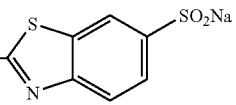 | 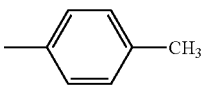 | 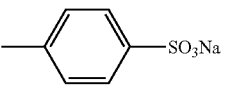 |

TABLE 3-continued
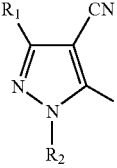
| Dye | R₁ | R₂ | R₃ | R₄ |
|---|---|---|---|---|
| 1-12 | 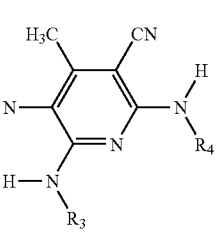 | 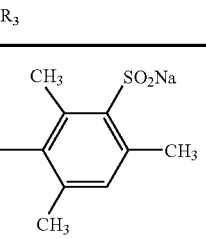 | 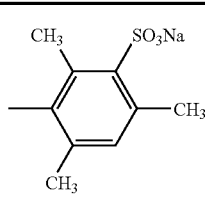 | 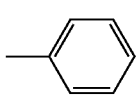 |
| 1-13 | 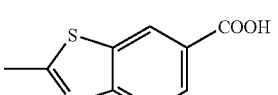 | 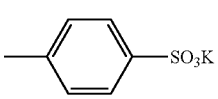 | 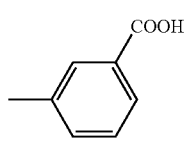 | 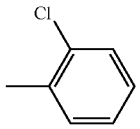 |
| 1-14 | 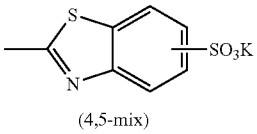 | 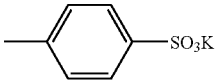 (4,5-mix) | 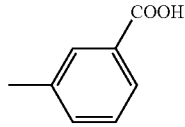 | 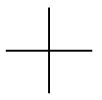 |
| 1-15 | 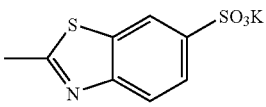 | 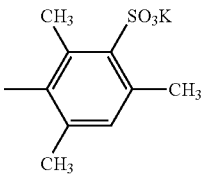 | 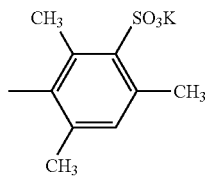 | 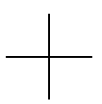 |
| 1-16 | 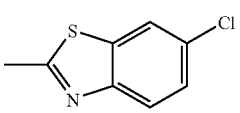 | 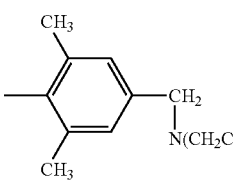 | 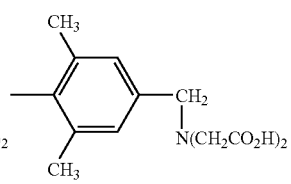 | 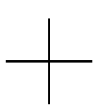 |
| 1-17 | 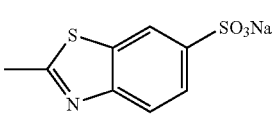 | 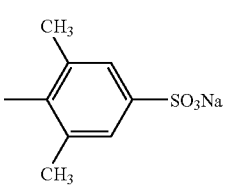 | 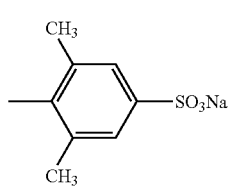 | |

TABLE 4

| Dye | R₁ | R₂ | R₃ | R₄ |
|---|---|---|---|---|
| 2-1 | 2-benzothiazolyl | 2-benzothiazolyl | 2,3,5-trimethyl-4-methylphenyl | 2,4,6-trimethylphenyl |
| 2-2 | 2-benzothiazolyl (5-Cl) | —SO₂CH₃ | 2,3,5-trimethylphenyl | 4-methylphenyl |
| 2-3 | 2-benzothiazolyl | —SO₂CH₃ | C₈H₁₇(t) | C₈H₁₇(t) |
| 2-4 | 2-benzothiazolyl | H | 2,3,5-trimethyl-4-methylphenyl | 2,4,6-trimethylphenyl |
| 2-5 | 2-benzothiazolyl (6-Cl) | —SO₂CH₃ | 2,4-dimethylphenyl | C₈H₁₇(t) |
| 2-6 | 2-benzothiazolyl | H | 2-methylphenyl | 2-methylphenyl |
| 2-7 | 2-benzothiazolyl | H | 2,6-dimethylphenyl | 2,6-dimethylphenyl |

TABLE 5
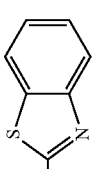

TABLE 5-continued
| Dye | R₁ | R₂ | R₃ | R₄ |
|---|---|---|---|---|
| 2-11 | 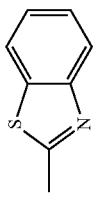 | 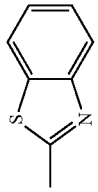 | 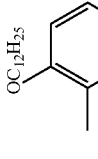 2-OC₁₂H₂₅ | 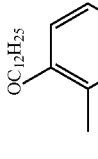 2-OC₁₂H₂₅ |
| 2-12 | 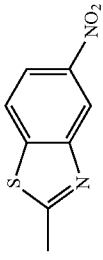 5-NO₂ | 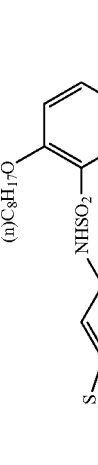 |  4-C₈H₁₇ | C₈H₁₇(t) |

TABLE 6

[Structure: pyrazole-azo-pyridine dye with substituents R1, R2, R3, R4; pyrazole bears CN, tert-butyl, and R1 on N; pyridine bears CH3, N(R2)(R3), and NH-R4]

| Dye | R1 | R2 | R3 | R4 |
|---|---|---|---|---|
| 2-13 | 2-methylbenzothiazol-6-yl-SO3K | 2-methylbenzothiazol-6-yl-SO3K | 2,4,6-trimethylphenyl (mesityl) | 2,4,6-trimethylphenyl (mesityl) |
| 2-14 | 2-methylbenzothiazol-6-yl-SO2NH-(3,5-dicarboxyphenyl) | 2-methylbenzothiazol-6-yl-SO2NH-(3,5-dicarboxyphenyl) | 2,4,6-trimethylphenyl (mesityl) | 2,4,6-trimethylphenyl (mesityl) |

TABLE 6-continued

| Dye | R₁ | R₂ | R₃ | R₄ |
|---|---|---|---|---|
| 2-15 | 2-methylbenzothiazol-5/6-yl-SO₂NH-(3,5-dicarboxyphenyl) (5,6-mix) | 2-methylbenzothiazol-5/6-yl-SO₂NH-(3,5-dicarboxyphenyl) (5,6-mix) | 2,4,6-trimethylphenyl | 2,4,6-trimethylphenyl |
| 2-16 | 2-methylbenzothiazol-5/6-yl-SO₃Na (5,6-mix) | 2-methylbenzothiazol-5/6-yl-SO₂NH-(3,5-dicarboxyphenyl) (5,6-mix) | 4-methylphenyl | 2,3-dimethylphenyl |

TABLE 7

| Dye | R₁ | R₂ | R₃ | R₄ |
|---|---|---|---|---|
| 2-17 | 2-methylbenzothiazol-6-yl with SO₃Na | 2-methylbenzothiazol-6-yl with SO₃Na | 2,4,6-trimethylphenyl with SO₃Na at position 3 | 2,4,6-trimethylphenyl with SO₃Na at position 3 |
| 2-18 | 2-methylbenzothiazol-6-yl with SO₂NH-(3,5-dicarboxyphenyl-COOK) | 2-methylbenzothiazole | 2,4,6-trimethylphenyl with SO₃K at position 3 | 2,4,6-trimethylphenyl with SO₃K at position 3 |

TABLE 7-continued
| Dye | R₁ | R₂ | R₃ | R₄ |
|---|---|---|---|---|
| 2-19 |  |  |  |  |
| 2-20 | 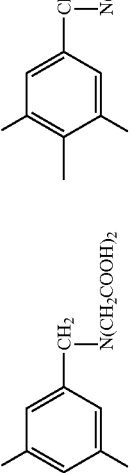 | 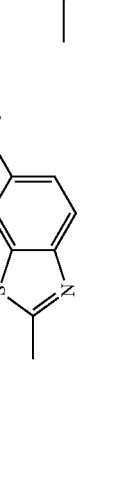 | 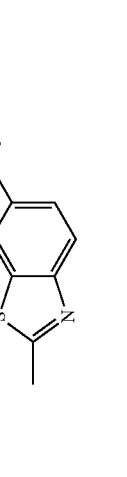 | 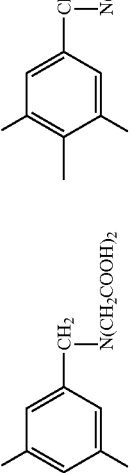 |

TABLE 8
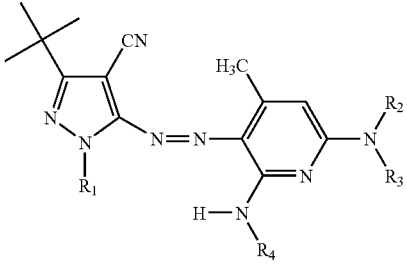
| Dye | R$_1$ | R$_2$ | R$_3$ | R$_4$ |
|---|---|---|---|---|
| 2-21 | 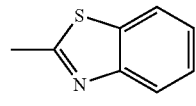 | 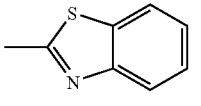 | 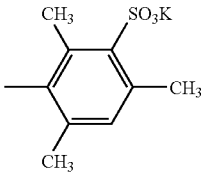 | 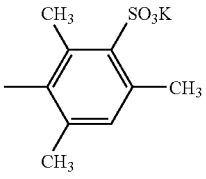 |
| 2-22 | 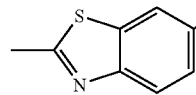 | 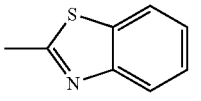 | 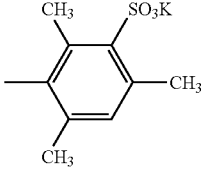 | 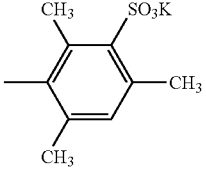 |
| 2-23 | 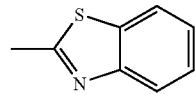 | 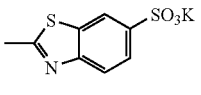 | 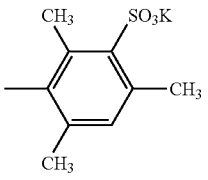 | 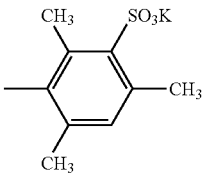 |

TABLE 9
| Dye | R1 | R2 | R3 | R4 | R5 | R6 | R7 | R8 |
|---|---|---|---|---|---|---|---|---|
| 3-1 | 2-methylphenyl | CN | 2-pyridyl | H | CONH₂ | SO₂CH₃ | 2-methylphenoxy (OC₈H₁₇) | 2-methylphenyl (CH₃) |
| 3-2 | t-butyl | Br | 2-pyrimidinyl | COOEt | H | 2-methylbenzothiazol-5-yl | C₈H₁₇(t) | COCH₃ |
| 3-3 | 2-pyridyl | SO₂CH₃ | 4,6-bis(methylamino)-1,3,5-triazin-2-yl | CONH₂ | H | 6-chloro-2-methylbenzothiazol-5-yl | 4-methylbenzyl | C(CH₃)₃ |
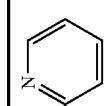

TABLE 9-continued

Structure: pyrazolylazo-pyridine with substituents $R_1$-$R_8$

| Dye | $R_1$ | $R_2$ | $R_3$ | $R_4$ | $R_5$ | $R_6$ | $R_7$ | $R_8$ |
|---|---|---|---|---|---|---|---|---|
| 3-4 | t-Bu | CN | 2-cyano-5-methyl-4-cyanophenyl | H | H | CONH₂ | 5-chloro-2-methylbenzothiazol-2-yl | SO₂CH₃ |
| 3-5 | t-Bu | Br | 3,5-dichloro-4-methyl-nitrophenyl | H | H | COCH₃ | 3,4,5-trimethylphenyl | 4-octylphenyl |

TABLE 10
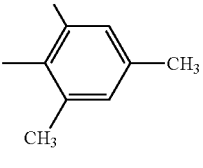
| Dye | R₁ | R₂ | R₃ |
|---|---|---|---|
| 4-1 | CN | 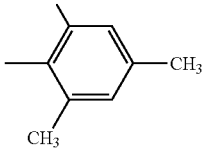 | 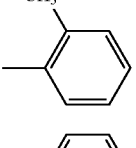 |
| 4-2 | CN | 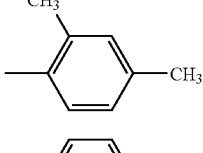 | 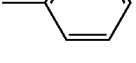 |
| 4-3 | CONH₂ | 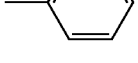 | 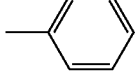 |
TABLE 10-continued
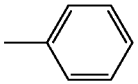
| Dye | R₁ | R₂ | R₃ |
|---|---|---|---|
| 4-4 | CONH₂ | 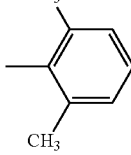 | 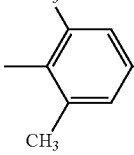 |
| 4-5 | H | 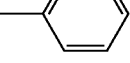 | 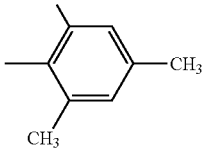 |
TABLE 11
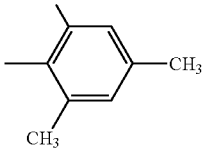
| Dye | R₁ | R₂ | R₃ | R₄ |
|---|---|---|---|---|
| 5-1 | 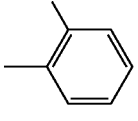 | CN | 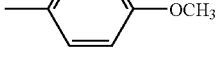 | 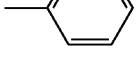 |
| 5-2 |  | CN | 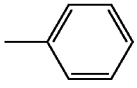 |  |
| 5-3 |  | CONH₂ | COCH₃ |  |

TABLE 11-continued
| Dye | R₁ | R₂ | R₃ | R₄ |
|---|---|---|---|---|
| 5-4 | 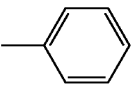 | H |  | COCH₃ |
| 5-5 |  | H | 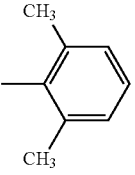 | 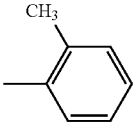 |
TABLE 12
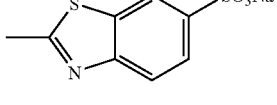
| Dye | R₁ | R₂ | R₃ |
|---|---|---|---|
| 6-1 | 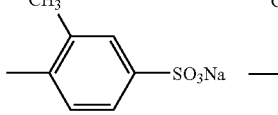 | 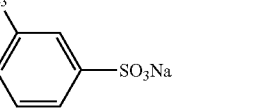 | 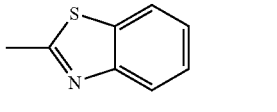 |
| 6-2 | 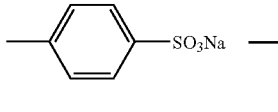 | 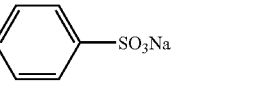 | 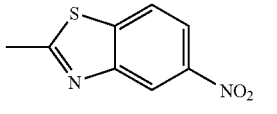 |
| 6-3 | 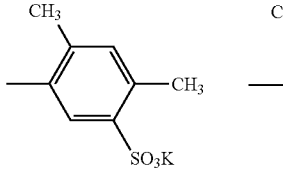 | 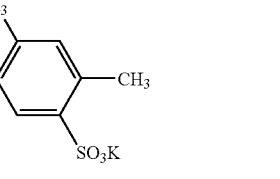 | (CH₃, CH₃, SO₃K substituted phenyl) |

TABLE 13

| Dye | R₁ | R₂ | R₃ |
|---|---|---|---|
| 6-4 | 2-methylbenzothiazole-6-sulfonate potassium | 2,4,6-trimethyl-3-sulfonate potassium phenyl | 2,4,6-trimethyl-3-sulfonate potassium phenyl |
| 6-5 | 2-methylbenzothiazole-6-sulfonate potassium | 3-methyl-4-methyl-...-SO₃K phenyl | 3-methyl-4-methyl-...-SO₃K phenyl |
| 6-6 | 2-methylbenzothiazole-6-sulfonate sodium | 4-COOH phenyl | 4-COOH phenyl |
| 6-7 | 2-methyl-6-chlorobenzothiazole | 2,4,6-trimethyl-CH₂N(CH₂CO₂H)₂ phenyl | 2,4,6-trimethyl-CH₂N(CH₂CO₂H)₂ phenyl |
| 6-8 | 2-methyl-5-nitrobenzothiazole | 3-methyl-4-methyl-SO₃K phenyl | 3-methyl-4-COOH phenyl |

TABLE 14
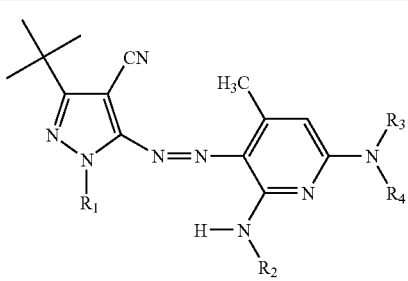
| Dye | R₁ | R₂ | R₃ | R₄ |
|---|---|---|---|---|
| 7-1 | 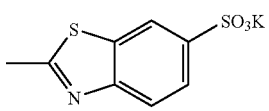 | 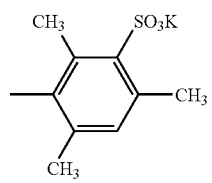 | 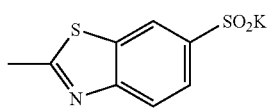 | 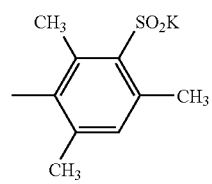 |
| 7-2 | 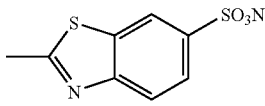 | 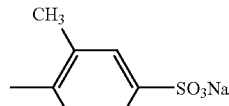 | 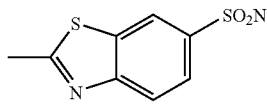 | 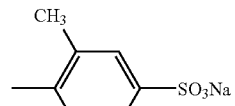 |
| 7-3 | 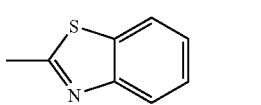 | 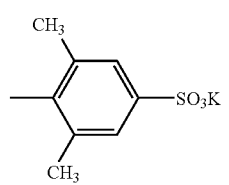 | 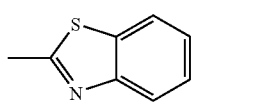 | 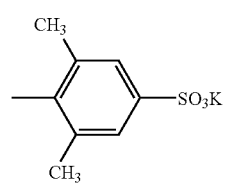 |
| 7-4 | 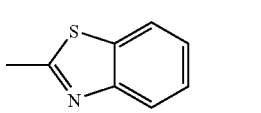 | 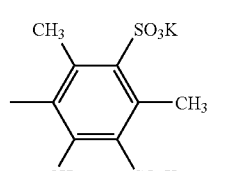 | 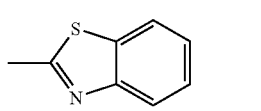 | 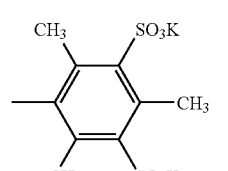 |
| 7-5 | 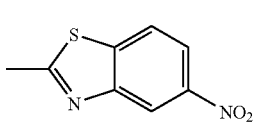 | 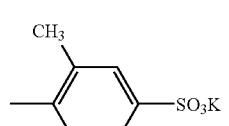 | 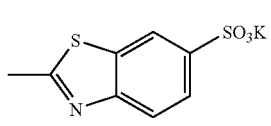 | 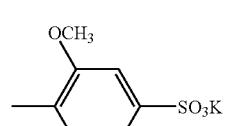 |

TABLE 15
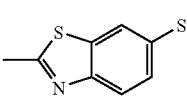
| Dye | R₁ | R₂ | R₃ |
|---|---|---|---|
| 7-6 | 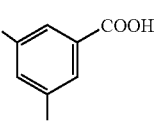 | 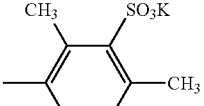 | 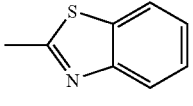 |
| 7-7 | 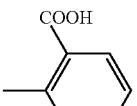 | 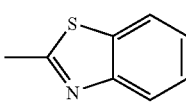 | 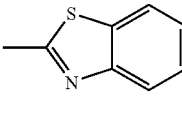 |
| 7-8 | 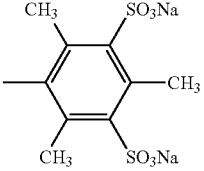 | 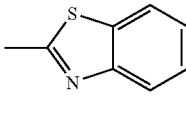 | 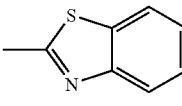 |
| 7-9 | 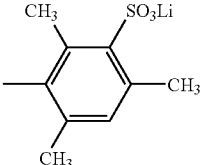 | 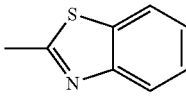 | 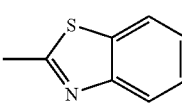 |
| 7-10 | 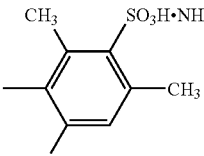 | 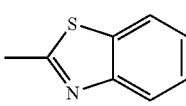 | 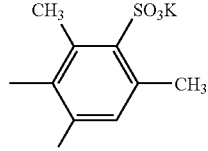 |
| Dye | R₄ |
|---|---|
| 7-6 | 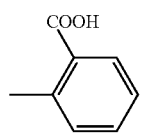 |
| 7-7 |  |

TABLE 15-continued
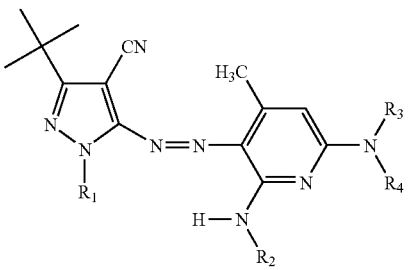
|   |   |
|---|---|
| 7-8 | 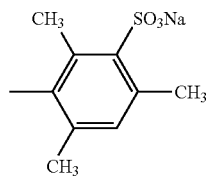 |
| 7-9 | 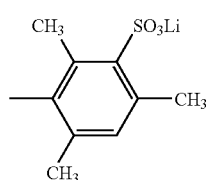 |
| 7-10 | 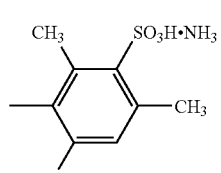 |
TABLE 16
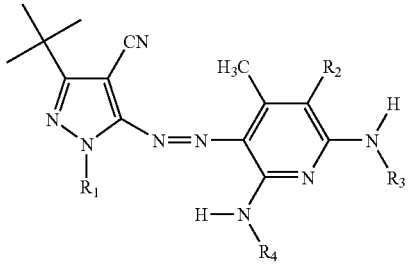
| Dye | R₁ | R₂ | R₃ | R₄ |
|---|---|---|---|---|
| 8-1 | 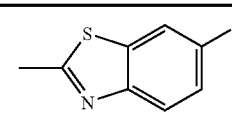 | H | 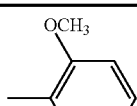 | 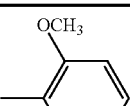 |
| 8-2 | 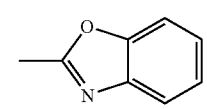 | H | 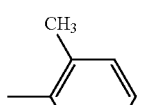 | 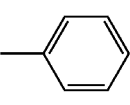 |

TABLE 16-continued

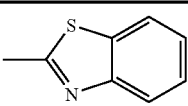

| Dye | R₁ | R₂ | R₃ | R₄ |
|-----|----|----|----|----|
| 8-3 | 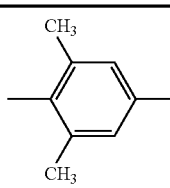 | CN | 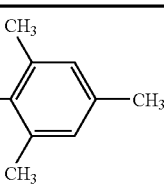 |  |

Next, the compound represented by formula (2) is described. It is desirable that the compound represented by formula (2) is water-soluble.

Each of $R^1$ and $R^2$ independently represents hydrogen atom, halogen atom, aliphatic group, aryl group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic ring oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group. Each group may be further substituted.

Each of $R^3$ and $R^4$ independently represents hydrogen atom, aliphatic group (substituted or unsubstituted alkyl group, substituted or unsubstituted alkenyl group, substituted or unsubstituted alkynyl group or the like), aryl group (substituted or unsubstituted phenyl group, substituted or unsubstituted naphthyl group or the like), heterocyclic group, acyl group, alkoxycarbonyl group, aryloxycarbonyl group, carbamoyl group, sulfonyl group (alkylsulfonyl group, arylsulfonyl group) or sulfamoyl group. Preferred are hydrogen atom, alkyl group, cycloalkyl group, aralkyl group, alkenyl group, aryl group, heterocyclic group, sulfonyl group, acyl group and carbamoyl group, and each substituent group may be further substituted.

In addition, $R^1$ and $R^2$ or $R^3$ and $R^4$ may together form a 5- or 6-membered ring.

Each of a and e independently represents alkyl group, alkoxy group or halogen atom, wherein when both of a and e are alkyl groups, total of the number of carbons constituting the alkyl groups is 3 or more, and they may be further substituted. Each of b, c and d independently has the same meaning of $R^1$ and $R^2$, and a and b, or e and d, may together form a condensed ring. However, formula (2) has at least one ionic hydrophilic group.

Also in formula (2), $Z^1$ represents an electron attractive group having a Hammett substituent constant σp value of 0.20 or more.

The aforementioned electron attractive group of $Z^1$ is an electron attractive group having a Hammett substituent constant σp value of 0.20 or more, preferably 0.30 or more. The upper limit of σp value is preferably 1.0 or less.

Illustrative examples of the electron attractive group having a σp value of 0.20 or more include acyl group, acyloxy group, carbamoyl group, alkoxycarbonyl group, aryloxycarbonyl group, cyano group, nitro group, a dialkylphosphono group, a diarylphosphono group, a diarylphosphinyl group, an alkylsulfinyl group, an arylsulfinyl group, an alkylsulfonyl group, an arylsulfonyl group, sulfonyloxy group, acylthio group, sulfamoyl group, thiocyanate group, thiocarbonyl group, an alkyl halide group, an alkoxy halide group, a aryloxy halide group, an alkylamino halide group, an alkylthio halide group, a heterocyclic group, a halogen atom, azo group, selenocyanate group and an aryl group substituted with other electron attractive group having a σp value of 0.20 or more, of which cyano group, nitro group or an halogen atom are desirable as $Z^1$, an halogen atom or cyano group is more desirable, and cyano group is most desirable.

$Z^2$ represents hydrogen atom, aliphatic group, aryl group or heterocyclic group. As $Z^2$, hydrogen atom, alkyl group, cycloalkyl group, aralkyl group, aryl group, heterocyclic group, acyl group, alkenyl group or sulfonyl group is desirable, and alkyl group is more desirable. Each substituent group may be further substituted.

An alkyl group having a substituent group and an unsubstituted alkyl group are included in the alkyl group. The aforementioned alkyl group is preferably an alkyl group having from 1 to 12 carbon atoms, when the carbon atoms of its substituent group are removed, more preferably an alkyl group having from 1 to 6 carbon atoms. Examples of the substituent group include hydroxyl group, alkoxy group, cyano group, halogen atom and ionic hydrophilic group. Examples of the alkyl group include methyl, ethyl, butyl, isopropyl, t-butyl, hydroxyethyl, methoxyethyl, cyanoethyl, trifluoromethyl, 3-sulfopropyl and 4-sulfobutyl.

A cycloalkyl group having a substituent group and an unsubstituted alkyl group are included in the cycloalkyl group. The aforementioned cycloalkyl group is preferably a cycloalkyl group having from 5 to 12 carbon atoms, when the carbon atoms of its substituent group are removed. Examples of the substituent group include an ionic hydrophilic group. Examples of the cycloalkyl group include cyclohexyl group.

As the aralkyl group, an aralkyl group having a substituent group and an unsaturated aralkyl group are included. As the aralkyl group, an aralkyl group having from 7 to 12 carbon atoms, when the carbon atoms of its substituent group are removed, is desirable. Examples of the aforementioned substituent group include an ionic hydrophilic group. Examples of the aforementioned aralkyl group include benzyl group and 2-phenetyl group.

An aryl group having a substituent group and an unsubstituted aryl group are included in the aryl group. As the aryl group, an aryl group having from 6 to 12 carbon atoms, when the carbon atoms of its substituent group are removed, is desirable. Examples of the substituent group include alkyl group, alkoxy group, halogen atom, alkylamino group, amido group, carbamoyl group, sulfamoyl group, sulfonamido group, hydroxyl group, ester group and ionic hydrophilic group. Examples of the aryl group include phenyl, p-tolyl, p-methoxyphenyl, o-chlorophenyl and m-(3-sulfopropylamino)phenyl.

A heterocyclic group having a substituent group and an unsubstituted heterocyclic group are included in the heterocyclic group. As the heterocyclic group, a 5- or 6-membered heterocyclic group is desirable. Examples of the substituent group include amido group, carbamoyl group, sulfamoyl group, sulfonamido group, hydroxyl group, ester group and ionic hydrophilic group. Examples of the heterocyclic group include 2-pyridyl group, 2-thienyl group, 2-thiazolyl group, 2-benzothiazolyl group and 2-furyl group.

An acyl group having a substituent group and an unsubstituted acyl group are included in the acyl group. As the aforementioned acyl group, an acyl group having from 1 to 12 carbon atoms, when carbon atoms of its substituent group are removed, is desirable. Examples of the substituent group include an ionic hydrophilic group. Examples of the acyl group include acetyl group and benzoyl group.

An alkenyl group having a substituent group and an unsaturated alkenyl group are included in the alkenyl group. As the alkenyl group, an alkenyl group having from 5 to 12 carbon atoms, when the carbon atoms of its substituent group are removed, is desirable. Examples of the substituent group include an ionic hydrophilic group. Examples of the alkenyl group include vinyl group, allyl group and the like.

As the sulfonyl group, an alkylsulfonyl group such as methanesulfonyl group and an arylsulfonyl group such as phenylsulfonyl group and the like are included. However, $R^3$ and $R^4$ are not hydrogen atoms at the same time.

Q represents hydrogen atom, aliphatic group, aryl group or heterocyclic group. It preferably represents alkyl group, cycloalkyl group, aralkyl group, alkenyl group, aryl group or heterocyclic group, wherein each of these substituent groups may be further substituted. Detains of these substituent groups are the same as the case of the aforementioned $R^1$ and $R^2$.

Q is preferably an aryl group or a heterocyclic group, which is substituted with an electron attractive group.

The aforementioned electron attractive group of Q is an electron attractive group having a Hammett substituent constant σp value of 0.20 or more, preferably 0.30 or more. The upper limit of σp value is preferably 1.0 or less.

Illustrative examples of the electron attractive group having a σp value of 0.20 or more include acyl group, acyloxy group, carbamoyl group, alkoxycarbonyl group, aryloxycarbonyl group, cyano group, nitro group, a dialkylphosphono group, a diarylphosphono group, a diarylphosphinyl group, an alkylsulfinyl group, an arylsulfinyl group, an alkylsulfonyl group, an arylsulfonyl group, sulfonyloxy group, acylthio group, sulfamoyl group, thiocyanate group, thiocarbonyl group, an alkyl halide group, an alkoxy halide group, a aryloxy halide group, an alkylamino halide group, an alkylthio halide group, a heterocyclic group, a halogen atom, azo group, selenocyanate group and an aryl group substituted with other electron attractive group having a σp value of 0.20 or more, of which cyano group, nitro group and an halogen atom are desirable. The aforementioned heterocyclic group may be substituted or unsubstituted with an electron attractive group.

In a desirable combination, each of $R^3$ and $R^4$ is hydrogen atom, alkyl group, aralkyl group, aryl group, heterocyclic group, sulfonyl group or acyl group, each of a and e is preferably alkyl group or halogen atom and is unsaturated alkyl group when both of a and e are alkyl groups, total of the number of carbons of a and e is 3 or more (preferably 5 or less), and each of b, c and d is hydrogen atom, halogen atom, alkyl group or ionic hydrophilic group (preferably hydrogen atom, an alkyl group having from 1 to 4 carbon atoms or an ionic hydrophilic group).

As $Z^1$, cyano group is most desirable.

As $Z^2$, an alkyl group or an aryl group is desirable. In addition, among the alkyl groups, an alkyl group having 3 or 4 carbon atoms (preferably isopropyl group or t-butyl group) is desirable. As the aryl group, phenyl group and phenyl group having an additional substituent group on either one of the 2-, 4- and 6-positions looking from the pyrazole mother nucleus side are desirable.

Regarding formula (2), an example of the combination of desirable substituent groups is shown in the following. The desirable combination is a case in which $Z^1$ is cyano group; $Z^2$ is isopropyl group, t-butyl group or phenyl group (preferably t-butyl group); $R^1$ is hydrogen atom; $R^2$ is hydrogen atom or an alkyl group having from 1 to 4 carbon atoms (preferably methyl group); each of $R^3$ and $R^4$ is hydrogen atom, an alkyl group, an aralkyl group, an aryl group, a heterocyclic group, sulfonyl group or an acyl group, preferably hydrogen atom, a heterocyclic group (preferably benzoxazole ring or benzothiazole ring (preferably unsubstituted or sulfo-substituted benzothiazole)) group or alkyl- and/or sulfo-substituted phenyl group; each of a and e is an alkyl group which may be substituted, wherein the number of carbon atoms of a+e is 3 or more (preferably 5 or less), preferably an unsubstituted alkyl group wherein the number of carbon atoms is 4 or more and 5 or less; each of b, c and d is hydrogen atom, a halogen atom, an alkyl group or an ionic hydrophilic group (preferably each of them is hydrogen atom, an alkyl group having from 1 to 4 carbon atoms or sulfo group); and Q is a heterocyclic (preferably benzoxazole ring or benzothiazole ring (preferably sulfamoyl- or sulfo-substituted benzoxazole ring or benzothiazole ring)) group.

The compound represented by formula (2) (azo dye) has at least 1 (preferably 3 or more and 6 or less) ionic hydrophilic group in its molecule. The ionic hydrophilic group may be any group with the proviso that it is an ionic dissociation group. Sulfo group, carboxyl group, phosphono group, quaternary ammonium group and the like are included in the ionic hydrophilic group. As the aforementioned ionic hydrophilic group, carboxyl group, phosphono group and sulfo group are desirable, of which carboxyl group and sulfo group are more desirable. Particularly, it is most desirable that at least 1 of them is sulfo group. Carboxyl group, phosphono group and sulfo group may be in the form of a salt, and examples of the salt-forming counter ion include ammonium ion, an alkali metal ion (e.g., lithium ion, sodium ion or potassium ion) and an organic cation (e.g., tetramethylammonium ion, tetramethylguanidium ion or tetramethylphosphonium). Among these counter ions, an alkali metal salt is desirable.

It is desirable that the aforementioned azo dye has 3 or more and 6 or less of ionic hydrophilic groups in its molecule, more desirably has 3 or more and 6 or less of sulfo groups, further desirably has 3 or more and 5 or less of sulfo groups.

(Azo Dye Production Method)

The azo dye represented by formula (2) is obtained by the following methods <1> and/or <2>.

The method <1> is a method which comprises the following steps.

(a) A step for forming a diazonium salt by allowing aminopyrazole to react with a diazotation agent,
(b) a step for forming a substituent group-introduced compound by allowing the diazonium salt formed by the aforementioned step (a) to react with a coupling agent, and
(c) a step for forming a precursor compound of formula (2) by allowing the compound formed by the aforementioned step (b) to react with an alkylating agent, an arylation agent or a heterylation agent in the presence of a base.

In the method <1>, it is desirable to use a dilute hydrochloric acid aqueous solution of sodium nitrite as the diazotation agent to be used in the step (a). In addition, isopentyl nitrite, nitrosyl sulfate or the like can also be used as the diazotation agent. As the coupling agent to be used in the step (b), it is most desirable to use a nitrogen-containing 6-membered heterocyclic coupler. As the base to be used in the step (b) together with an alkylating agent, an arylation agent or a heterylation agent, diisopropylethylamine and the like organic bases and potassium carbonate, sodium carbonate, sodium bicarbonate, potassium bicarbonate, sodium hydroxide, potassium hydroxide and the like inorganic bases can be exemplified.

The method <2> is a method which comprises a step for introducing a water-soluble group into the precursor compound of formula (2) by an electrophilic reaction. In addition, the method minutely described in the following is desirable as the electrophilic reaction.

The electrophilic reaction in the method <2> include sulfonation, Mannich reaction and Friedel-Crafts reaction, of which sulfonation is desirable.

As the method for effecting sulfonation of the precursor compound of formula (2), the sulfonation can be carried out using a sulfonation agent such as concentrated sulfuric acid, fuming nitric acid of from 10% to 60%, chlorosulfonic acid, sulfur trioxide or amide sulfate. In addition, a solvent may also be used, and as the solvent, acetic acid, acetic anhydride, sulfolane, ethyl acetate, ether, carbon tetrachloride, acetonitrile or the like may be used.

Regarding the precursor compound of formula (2), it is desirable that $R^3$ and $R^4$ and b(d) and c are sulfonated, and when a substituent group of $R^3$ and $R^4$ and b(d) and c has two or more reaction points which can be sulfonated, sulfonated pigments having different substitution positions may be contaminated. In this case, sulfonated pigments having different substitution positions of within the range of from 0.1% to 20% by HPLC area percentage based on the main sulfonated pigment may be contaminated. The reaction temperature is preferably within the range of from −5° C. to 80° C., more preferably from 10° C. to 70° C. The reaction time is preferably between 30 minutes and 10 hours, more preferably between 1 hour and 6 hours.

Regarding the aforementioned deoxidation condition of the production method of the precursor compound of formula (2), it is desirable to produce it by filling the reaction system with nitrogen, argon or the like inert gas, more preferably by bubbling such an inert gas into the reaction liquid.

The aminopyrazole as the starting substance to be used in the step (a) of method <1> can be synthesized by the methods described for example in U.S. Pat. No. 3,336,285, *Heterocycles*, 20, 519 (1983) and JP-B-6-19036 (the term "JP-B" as used herein means an "examined Japanese patent application").

The pyridine coupler (coupling agent) to be used in the step (b) of method <1> can be synthesized by the methods described for example in JP-A-51-83631, JP-A-49-74718 and JP-B-52-46230.

Illustrative examples of the azo dye to be used in the ink composition of the invention are shown below, though not limited to the following examples.

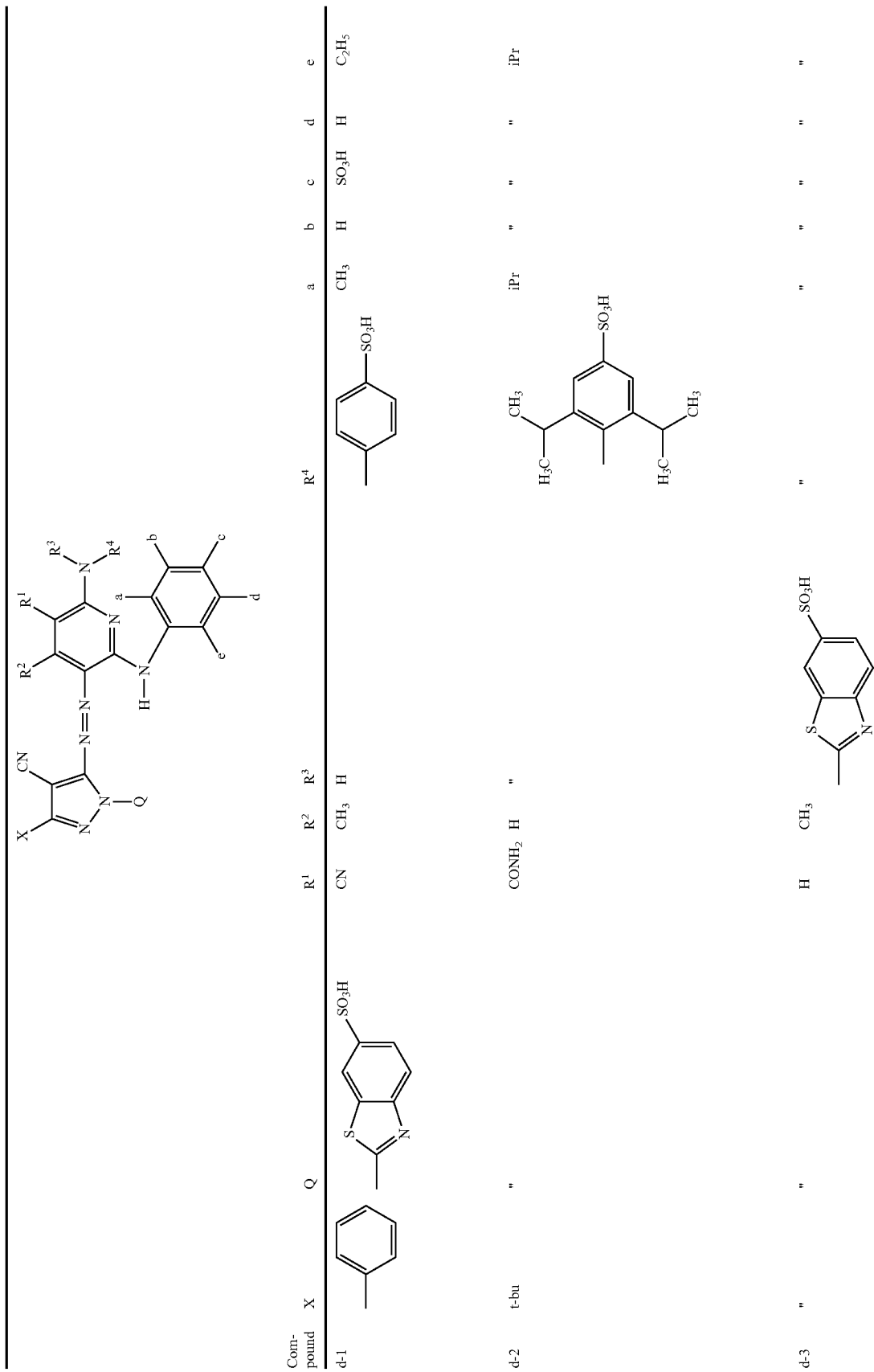
| Compound | X | Q | $R^1$ | $R^2$ | $R^3$ | $R^4$ | a | b | c | d | e |
|---|---|---|---|---|---|---|---|---|---|---|---|
| d-1 | ![phenyl-CH3] | ![benzothiazole-SO3H-CH3] | CN | CH₃ | H | ![phenyl-SO3H] | CH₃ | H | SO₃H | H | C₂H₅ |
| d-2 | t-bu | " | CONH₂ | H | " | ![dimethyl-isopropyl-SO3H phenyl] | iPr | " | " | " | iPr |
| d-3 | " | " | H | CH₃ | " | ![benzothiazole-SO3H-CH3] | " | " | " | " | " |

-continued
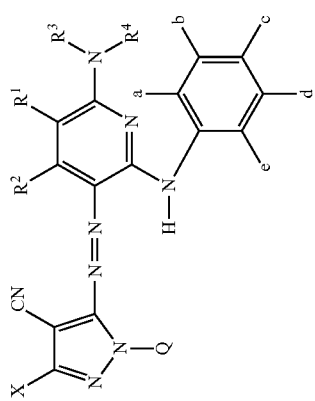
| Compound | X | Q | R¹ | R² | R³ | R⁴ | a | b | c | d | e |
|---|---|---|---|---|---|---|---|---|---|---|---|
| d-4 | " | " | " | " | " | 3,5-diethyl-4-methyl-phenyl-SO₃H | C₂H₅ | " | " | " | C₂H₅ |
| d-5 | " | " | " | " | " | 2-SO₃H-3,5-diethyl-4-methyl-6-CH₃-phenyl | " | " | CH₃ | SO₃H | — |
| d-6 | t-bu | 2-methylbenzothiazol-6-yl | H | CH₃ | " | 3-methyl-4-methyl-5-(1-methylethyl)-phenyl-SO₃H | CH₃ | H | SO₃H | H | iPr |

-continued
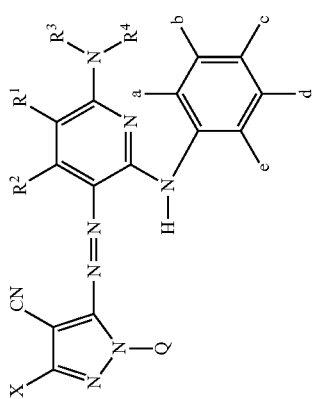
| Compound | X | Q | R¹ | R² R³ | R⁴ | a | b | c | d | e |
|---|---|---|---|---|---|---|---|---|---|---|
| d-7 | " | " | " | " | ![H3C, SO3H, H3CO structure] | " | " | " | " | OCH₃ |
| d-8 | " | " | " | " | ![H3C, CH3, SO3H, Cl structure] | " | " | CH₃ | SO₃H | Cl |
| d-9 | " | " | ![SO2NH-benzothiazole-COOH,COOH structure] | " | ![C2H5, CH3, SO3H, C2H5 structure] | C₂H₅ | " | " | " | C₂H₅ |

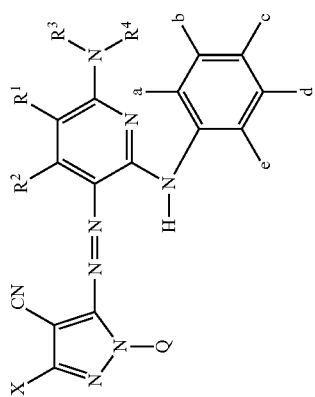

-continued
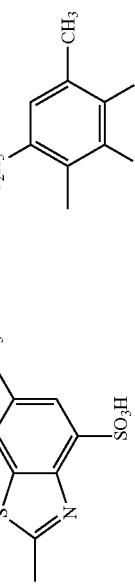
| Compound | X | Q | R¹ | R² R³ | R⁴ | a | b | c | d | e |
|---|---|---|---|---|---|---|---|---|---|---|
| d-18 | " | 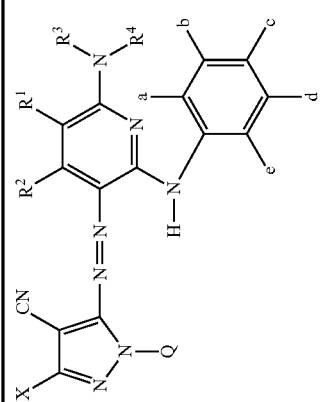 | " | 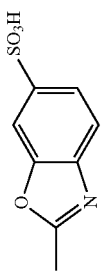 | 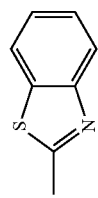 | " | " | " | " | " |
| d-19 | " |  | " | | " | " | " | " | " | " |
| d-20 | " | | " | | " | " | " | " | " | " |

In this connection, —SO₃Li group can also be suitably used instead of the —SO₃H group in each of the aforementioned tables.

Synthesis examples of the azo dye represented by the aforementioned formula (2) are shown in the following, though not limited thereto.

As synthesis methods of the compound represented by formula (2), the following examples of compound (d-5) are shown.

Synthesis of Compound (d-5)

(1) Synthesis of Compound (d-5a)

A 24.1 g (0.147 mol) portion of 5-amino-3-tert-butyl-4-cyanopyrazole (1), 45 ml of concentrated hydrochloric acid, 30 ml of acetic acid and 45 ml of propionic acid were stirred at 0° C., and 10.1 g (0.147 mol) of sodium nitrite dissolved in 20 ml of water was added dropwise thereto spending 10 minutes. The mixture was stirred as such for 30 minutes. A 84.7 g (0.147 mol) portion of the coupler component (2) was dissolved in 231 ml of methanesulfonic acid, 147 ml of acetic acid and 221 ml of propionic acid and stirred at 0° C., and the aforementioned diazonium salt was added thereto spending 30 minutes. After the addition of diazonium salt, the reaction liquid was further stirred for 30 minutes, and then the aforementioned reaction liquid was gradually added to 2,250 ml of water which was mixed with 750 g of ice and stirred, and the thus precipitated compound (d-5a) was isolated by suction filtration. Yield 73.8 g (85%).

(2) Synthesis of Compound (d-5b)

A 26.6 g (157 mmol) portion of the heterylation agent (3), 21.7 g of potassium carbonate and 147 ml of DMSO were added to 21 g (35.5 mmol) of the compound (d-5a), and the mixture was stirred at 92° C. for 4 hours. After completion of the stirring and subsequent cooling to room temperature, the compound (d-5b) precipitated from the reaction system was isolated by suction filtration. These crude crystals were dispersed in 3 liters of water to dissolve excess potassium carbonate and then subjected to suction filtration to obtain the intended compound (d-5b). Yield 20.0 g (63.5%). λmax=558 nm (DMF solution). m/z (POSI)=858.

(3) Synthesis of Compound (d-5)

A 2 g (2.33 mmol) portion of the compound (d-5b) was dispersed in 7 g of sulfolane manufactured by Tokyo Kasei, and 1.7 g of Nisso Sulfan (sulfur trioxide) manufactured by NISSO METALLOCHEMICAL Co. Ltd. was added dropwise thereto at 15° C. After completion of the dropwise addition, the reaction was carried out at 70° C. for 2 hours. After completion of the reaction, the reaction liquid was cooled to 20° C., and 2 ml of water was added dropwise thereto. After cooling to 5° C., 3.3 ml of 25 wt % sodium hydroxide aqueous solution was added dropwise thereto, and 28 wt % sodium methoxide methanol solution was further added dropwise thereto. Subsequently, 4 ml of methanol was added dropwise thereto, and the thus precipitated inorganic salt was filtered and washed with 2 ml of methanol. A 2 g portion of potassium acetate and 5.6 ml of methanol were added to this filtrate, 22.5 ml of ethanol was further added thereto to effect precipitation of the dye, and then crude crystals of the compound (d-5) was obtained by carrying out its suction filtration and washing with ethanol. Desalting and purification of the crude crystals containing the aforementioned inorganic salt were carried out using Sephadex LH-20 gel chromatography manufactured by Pharmacia (eluent, water/methanol=1:1 (v/v)), thereby obtaining the compound (d-5). Yield 2 g (66%). λmax (DMSO)=567.1 nm, ε=46900

The ink composition of the invention (to be referred also to as the ink of the invention) is prepared by dissolving or dispersing at least one species of the azo dye of formula (1) or (2) and contains the azo dye in an amount of preferably from 0.2 to 20 mass %, more preferably from 0.3 to 15 mass %, further preferably from 0.5 to 10 mass %.

According to the dye represented by formula (1) or (2) to be used un the invention, oxidation potential of the dye in the aqueous medium of ink is nobler than 1.0 V vs SCE, preferably nobler than 1.1 1.0 V vs SCE, particularly preferably nobler than 1.2 V. As means for increasing the potential, a dye structure of a type having a chromophore represented by (heterocyclic A)-N=N-(heterocyclic B) is selected, an azo dye in which the azo group is directly linked to at least one side thereof via an aryl nitrogen-containing 6-membered heterocyclic as the coupling component is selected, an azo dye having an aryl cyclic ring amino group- or heterocyclic amino group-containing structure as the auxochrome is selected, or a hydrogen of the azo dye is removed. Particularly, the dye of the aforementioned formula (2) expresses noble potential.

The oxidation potential measuring method as used herein is a measuring method which uses SCE (standard saturated calomel electrode) as the basis as the reference electrode in a dye-dissolved aqueous solution or a water-mixed solvent system, and various measuring methods can be applicable, such as a direct current polarography which uses a graphite electrode or platinum electrode as the working electrode, a polarography by a dropping mercury electrode, a cyclic voltammetry (CV), a rotary ring disc electrode method, a comb plate electrode method and the like. The oxidation potential is measured as a value based on the SCE (standard saturated calomel electrode) using the aforementioned measuring method, by dissolving $1 \times 10^{-2}$ to $1 \times 10^{-6}$ mol·dm$^{-3}$ of the sample to be tested in dimethylformamide, acetonitrile or the like solvent containing sodium perchlorate, tetrapropylammonium perchlorate or the like supporting electrolyte. In addition, the appropriate supporting electrolyte and solvent to be used can be selected depending on the oxidation potential and solubility of each sample to be tested. Regarding the supporting electrolytes and solvents which can be used, these are described in "Denki Kagaku Sokutei Ho (Electrochemical Measuring Methods)", edited by A. Fujishima, pp. 101-118, 1984 (published by Gihodo Shuppan).

The value of oxidation potential may sometimes change by a factor of approximately scores of millivolt due to influence of liquid junction potential, liquid resistance of sample solution and the like, but reproducibility of the measured value of potential can be guaranteed by correcting it using a standard sample (e.g., hydroquinone), and the same measured value can be obtained by any one of the aforementioned potential measuring means.

Regarding the azo dye in which the oxidation potential is nobler than 1.0 V vs SCE, other oxidation resistance basis is forced fading rate constant for ozone gas, and it is desirable that a desirable azo dye has a forced fading rate constant of $5.0 \times 10^{-2}$ [hr$^{-1}$] or less, preferably $3.0 \times 10^{-2}$ [hr$^{-1}$] or less, more preferably $1.5 \times 10^{-2}$ [hr$^{-1}$] or less.

Regarding measurement of forced fading rate constant for ozone gas, a coloring range which is a color of the main spectral absorption range of said ink of an image obtained by printing said ink alone on a reflection type image receiving medium, wherein the reflection density measured through a filter of status A is a density of from 0.90 to 1.10, is selected as the initial density point, and this initial density is defined as the starting density (=100%). This image is allowed to fade using an ozone fading tester which constantly keeps an ozone density of 5 mg/l, the period of time until the density becomes 80% of the initial density, and inverse number of this period off time [hour$^{-1}$] is calculated and defined as the fading reaction rate constant based on an assumption that the relationship between fading density and time follows velocity formula of first order reaction. Accordingly, the thus calculated fading rate constant is the fading rate constant of the coloring region printed with said ink, and this value is used herein as the fading rate constant of ink.

As the print patch for testing, a patch on which the closed square mark of JIS code 2223 was printed, a step-formed color patch of Macbeth chart and other optional step-formed density patches capable of giving measuring area can be used.

The reflection density of reflection image (step-formed color patch) to be printed for measuring use is a density calculated with a measuring beam passed through a status A filter by a densitometer which satisfies an international standard ISO 5-4 (geometric conditions of reflection density).

In the testing chamber for measuring forced fading rate constant for ozone gas, an ozone generator which can constantly keep inner ozone gas concentration at 5 mg/l (e.g., a high pressure discharge system which applies alternating voltage to dry air) is arranged, and the aeration temperature is controlled at 25° C.

In this connection, this forced fading rate constant is an index for the aptness to receive oxidation by environmental oxidizing atmospheres such as photo-chemical smog, automobile exhaust, organic vapors from the painted surface of furniture, carpet and the like, and a gas generated in a picture frame of light room, and is an index which typified these oxidizing atmospheres by ozone gas.

Next, hues of the ink of the invention (magenta ink) are described. As the ink for magenta, it is desirable that its λmax is from 500 to 580 nm from the viewpoint of hue, and it is desirable also that half band width between long wave side and short wave side of the maximum absorption wavelength is small, namely a sharp absorption. This is illustratively described in JP-A-2002-309133. In addition, sharpening of the absorption can be realized by introducing methyl group at the α-position.

In addition to the aforementioned specified azo dyes concerned in the invention, other dyes can be added to the magenta ink of the invention for the purpose of adjusting color tone. In addition, in order to construct an ink set for full color use, a cyan ink, a yellow ink and a black ink are used together with the magenta ink of the invention, and respective pigments are used therein. The following can be cited as examples of these pigments which can be jointly used.

Examples of the yellow pigment include aryl or heteryl azo dyes having phenols, naphthols, anilines, pyrazolones, pyridones or open chain type active methylene compounds as the coupling components; azomethine pigments having open chain type active methylene compounds as the coupling components; benzylidene pigments, monomethineoxonol pigments and the like methine pigments; and naphthoquinone pigments, anthraquinone pigments and the like quinone system pigments, and as other pigment species, quinophthalone pigments, nitro-nitroso pigments, acridine pigments, acridinone pigments and the like can be exemplified. These pigments may be those which show yellow for the first time when a part of the chromophore is dissociated, and the counter cation in that case may be an inorganic cation such as an alkali metal or ammonium, or an organic cation such as pyridinium or a quaternary ammonium salt, or also a polymer cation having a partial structure thereof.

Examples of the magenta pigment include aryl or heteryl azo dyes having phenols, naphthols or anilines, as the coupling components; azomethine pigments having pyrazolones or pyrazolotriazoles as the coupling components; methine pigments such as arylidene pigments, styryl pigments, merocyanine pigments or oxonol pigments; carbonium pigments such as diphenylmethane pigments, triphenylmethane pigments or xanthene pigments, quinone system pigments such as naphthoquinone, anthraquinone, anthraxpyridone and the like, and dioxazine pigments and the like condensed polycyclic system pigments. These pigments may be those which show magenta for the first time when a part of the chromophore is dissociated, and the counter cation in that case may be an inorganic cation such as an alkali metal or ammonium, or an organic cation such as pyridinium or a quaternary ammonium salt, or also a polymer cation having a partial structure thereof.

Examples of the cyan pigment include azomethine pigments such as indoaniline pigments or indophenol pigments; polymethine pigments such as cyanine pigments, oxonol pigments or merocyanine pigments; carbonium pigments such as diphenylmethane pigments, triphenylmethane pigments or xanthene pigments; phthalocyanine pigments; anthraquinone pigments; aryl or heteryl azo dyes having phenols, naphthols or anilines, as the coupling components, and indigo-thioindigo pigments. These pigments may be those which show cyan for the first time when a part of the chromophore is dissociated, and the counter cation in that case may be an inorganic cation such as an alkali metal or ammonium, or an organic cation such as pyridinium or a quaternary ammonium salt, or also a polymer cation having a partial structure thereof.

In addition, polyazo dyes and the like black pigments can also be used.

In addition, the pigments including azo dyes to be used in the invention are substantially water-soluble or water-dispersible. Illustratively, solubility or degree of dispersion of pigment in water at 20° C. is 2 mass % or more, preferably 5 mass % or more.

As other water-soluble dyes, direct dyes, acid dyes, food colors, basic dyes, reactive dyes and the like dyes can also be used jointly.

As particularly preferred among them,

C.I. Direct Red 1, 2, 4, 9, 11, 23, 26, 31, 37, 39, 62, 63, 72, 75, 76, 79, 80, 81, 83, 84, 87, 89, 92, 95, 111, 173, 184, 207, 211, 212, 214, 218, 219, 223, 224, 225, 226, 227, 232, 233, 240, 241, 242, 243, 247, 254, C.I. Direct Violet 7, 9, 47, 48, 51, 66, 90, 93, 94, 95, 98, 100, 101

C.I. Direct Yellow 4, 8, 9, 11, 12, 27, 28, 29, 33, 35, 39, 41, 44, 50, 53, 58, 59, 68, 86, 87, 93, 95, 96, 98, 100, 106, 108, 109, 110, 120, 130, 132, 142, 144, 157, 161, 163

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 290, 291

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199

C.I. Acid Red 1, 8, 35, 42, 52, 57, 62, 80, 81, 82, 87, 94, 111, 114, 115, 118, 119, 127, 128, 131, 143, 144, 151, 152, 154, 158, 186, 245, 249, 254, 257, 261, 263, 266, 289, 299, 301, 305, 336, 337, 361, 386, 397

C.I. Acid Violet 5, 34, 43, 47, 48, 90, 103, 126

C.I. Acid Yellow 17, 19, 23, 25, 39, 40, 42, 44, 49, 50, 61, 64, 76, 79, 110, 127, 135, 143, 151, 159, 169, 174, 190,195, 196, 197, 199, 218, 219, 222, 227

C.I. Acid Blue 9, 25, 40, 41, 62, 72, 76, 78, 80, 82, 87, 92, 106, 112, 113, 120, 127:1, 129, 138, 143, 175, 181, 185, 205, 207, 220, 221, 230, 232, 247, 249, 258, 260, 264, 271, 277, 278, 279, 280, 288, 290, 326

C.I. Acid Black 7, 24, 29, 48, 52:1, 172

C.I. Reactive Red 3, 6, 13, 17, 19, 21, 22, 23, 24, 29, 35, 37, 40, 41, 43, 45, 49, 55, 63, 106, 107, 112, 113, 114, 126, 127, 128, 129, 130, 131, 137, 160, 161, 174, 180

C.I. Reactive Violet 1, 3, 4, 5, 6, 7, 8, 9, 16, 17, 22, 23, 24, 26, 27, 33, 34

C.I. Reactive Yellow 2, 3, 13, 14, 15, 17, 18, 23, 24, 25, 26, 27, 29, 35, 37, 41, 42

C.I. Reactive Blue 2, 3, 5, 7, 8, 10, 13, 14, 15, 17, 18, 19, 21, 15, 26, 27, 28, 29, 38, 82, 89, 158, 182, 190, 203, 216, 220, 244

C.I. Reactive Black 4, 5, 8, 14, 21, 23, 26, 31, 32, 34

C.I. Basic Red 12, 13, 14, 15, 18, 22, 23, 24, 25, 27, 29, 35, 36, 38, 39, 45, 46

C.I. Basic Violet 1, 2, 3, 7, 10, 15, 16, 20, 21, 25, 27, 28, 35, 37, 39, 40, 48

C.I. Basic Yellow 1, 2, 4, 11, 13, 14, 15, 19, 21, 23, 24, 25, 28, 29, 32, 36, 39, 40

C.I. Basic Blue 1, 3, 5, 7, 9, 22, 26, 45, 46, 47, 54, 57, 60, 62, 65, 66, 69, 71

C.I. Basic Black 8, and the like can be exemplified.

In addition to the dyes represented by the aforementioned formulae, the dyes described in the following official gazettes can also be used preferably.

Anthrapyridone dyes described in JP-A-10-130557, JP-A-9-255906, JP-A-6-234944, JP-A-7-97541, European Patent 982371, WO 00/43450, WO 00/43451, WO 00/43452, WO 00/43453, WO 03/106572, WO 03/104332, JP-A-2003-238862, JP-A-2004-83609, JP-A-2002-302619, JP-A-2002-327131, JP-A-2002-265809, WO 04/087815, WO 02/090441, WO 03/027185, WO 04/085541, JP-A-2003-321627, JP-A-2002-332418, JP-A-2-2-332419, WO 02/059216, WO 02/059215, WO 04/087814, WO 04/046252, WO 04/046265, U.S. Pat. No. 6,652,637,B, WO 03/106572, WO 03/104332, JP-T-2002-540281 (the term "JP-T" as used herein means an "unexamined published international patent application in Japanese"), Japanese Patent No. 3558213, Japanese Patent No. 3558212, Japanese Patent No. 3558211, JP-A-2004-285351, JP-A-2004-33605, WO 04/104108, JP-A-2003-192930, WO 99/48981, European Patent Publication No. 1063268 and the like, azo dyes described in European Patent No. 682088B1, WO 94/16021A, WO 96/24636 A, U.S. Pat. No. 6,468,338, WO 03/106572A, JP-A-9-124965, JP-A-6-220377, JP-A-6-234944, WO 98/44053, WO 00/58407, European Patent Publication No. 1378549A, European Patent Publication No. 755984A, European Patent Publication No. 1052274A and European Patent Publication No. 1048701, chelate azo dyes described in JP-A-2000-160079, JP-A-10-130557, WO 01/48090A, WO 01/62854A, WO 2004/7622A, European Patent Publication No. 1086999A and European Patent Publication No. 982371A, and those described in European Patent Publication No. 1243627A, European Patent Publication No. 1243626A, European Patent Publication No. 1394227A, JP-A-2003-34758, WO 02/34844A and WO 04/87815.

In addition, a pigment can also be used jointly with the magenta ink of the invention or other ink to be used as an ink set in combination with this.

As the pigment to be used in the invention, conventionally known substances described in various references can be used, in addition to the commercially available products. Such references include Color Index edited by The Society of Dyers and Colorists), "Kaitei Shinpan Ganryo Binran (Pigment Handbook, Revised New Edition)" edited by Japan Pigment Technique Association (published in 1989), "Saishin Ganryo Ohyoh Gijutsu (New Pigment Application Techniques)", CMC Shuppan (published in 1986), "Insatsu Inki Gijutsu (Printing Ink Techniques)". CMC Shuppan (published in 1984), Industrial Organic Pigments, edited by W. Herbst and K. Hunger (VCH Verlagsgesellschaft, published in 1993) and the like. Illustratively, organic pigments include azo pigments (azo-lake pigments, insoluble azo pigments, condensed azo pigments, chelate azo pigments), polycyclic pigments (phthalocyanine system pigments, anthraquinone system pigments, perylene and perynone system pigments, indigo system pigments, quinacridone system pigments, dioxazine system pigments, isoindolinone system pigments, quinophthalone system pigments, diketopyrrolopyrrole system pigments and the like), dyeing lake pigments (lake pigments of acidic or basic dyes), azine pigments and the like, and inorganic pigments include yellow pigments C.I. Pigment Yellow 34, 37, 42, 53 and the like, red system pigments C.I. Pigment red 101, 108 and the like, blue system pigments C.I. Pigment Blue 27, 29, 17:1 and the like, black system pigments C.I. Pigment Black 7, magnetite and the like, and white system pigments C.I. Pigment White 4, 6, 18, 21.

Regarding pigments having desirable color tones for image formation, a phthalocyanine pigment, an anthraquinone system indanthrone pigment (e.g., C.I. Pigment Blue 60 or the like) and a dyeing lake pigment system triarylcarbonium pigment are desirable in the case of blue to cyan pigments, and a phthalocyanine pigment (its preferred examples including C.I. Pigment Blue 15:1, 15:2, 15:3, 15:4, 15:6 or the like copper phthalocyanine, monochloro- or low chlorination copper phthalocyanine, the pigment described in European Patent No. 860475 as a aluminum phthalocyanine, a metal-free phthalocyanine as C.I. Pigment Blue 16 and a phthalocyanine in which the central metals are Zn, Ni and Ti, of which C.I. Pigment Blue 15:3 and 15:4 and aluminum phthalocyanine are particularly preferable) is most desirable.

In the case of red to purple pigments, an azo pigment (its preferred examples including C.I. Pigment Red 3, 5, 11, 22, 38, 48:1, 48:3, 48:4, 49:1, 52:1, 53:1, 57:1, 63:2, 144, 146, 184 and the like, of which C.I. Pigment Red 57:1, 146 and 184 are particularly preferred), a quinacridone pigment (its preferred examples including C.I. Pigment Red 122, 192, 202, 207 and 209, and C.I. Pigment Violet 19 and 42, of which C.I. Pigment Red 122 is particularly preferred), a dyeing lake pigment system triarylcarbonium pigment (its preferred examples including a xanthene system C.I. Pigment Red 81:1 and C.I. Pigment Violet 1, 2, 3, 27 and 39), a dioxazine system pigment (e.g., C.I. Pigment Violet 23 and 37), a diketopyrrolopyrrole system pigment (e.g., C.I. Pigment Red 254), a perylene pigment (e.g., C.I. Pigment Violet 29), an anthraquinone system pigment (e.g., C.I. Pigment Violet 5:1, 31 and 33) and a thioindigo system pigment (e.g., C.I. Pigment Red 38 and 88) are desirably used.

In the case of yellow pigments, an azo pigment (its preferred examples including mono-azo pigment system C.I. Pigment Yellow 1, 3, 74 and 98, di-azo pigment system C.I. Pigment Yellow 12, 13, 14, 16, 17 and 83, general azo system C.I. Pigment Yellow 93, 94, 95, 128 and 155 and benzimidazolone system C.I. Pigment Yellow 120, 151, 154, 156 and 180 and the like, of which particularly preferred are those which do not use a benzidine system compound as the material), an isoindolinone-isoindolinone system pigment (its preferred examples including C.I. Pigment Yellow 109, 110, 137, 139 and the like), a quinophthalone pigment (its preferred examples including C.I. Pigment Yellow 138 and the like) and a flavanthrone pigment (e.g., C.I. Pigment Yellow 24 and the like) are desirably used.

As the black pigments, an inorganic pigment (its preferred examples including carbon black and magnetite) and aniline black can be cited as preferred examples.

In addition to the above, an orange pigment (C.I. Pigment Orange 13, 16 or the like) and a green pigment (C.I. Pigment Green 7 or the like) may be used.

The pigments which can be used in this technique may be the aforementioned naked pigments or pigments to which a surface treatment was applied. Examples of the surface treatment method include a method in which a resin or wax is surface-coated, a method in which a surface active agent is adhered thereto and a method in which a reactive substance (e.g., a silane coupling agent, an epoxy compound, a polyisocyanate or a radical generated from a diazonium salt) is linked to the pigment surface, and these are described in the following references and patents.
(1) Kinzoku Sekken-no Seishitsu-to Ohyoh (Properties and Applications of Metallic Soap) (Saiwai Shobo)
(2) Insatsu Inki Insatsu (Printing Ink Printing). (CMC Shuppan, 1984)
(3) Saishin Ganryo Ohyoh Gijutsu (New Pigment Application Techniques) (CMC Shuppan, 1986)
(4) U.S. Pat. Nos. 5,554,739 and 5,571,311
(5) JP-A-9-151342, JP-A-I0-140065, JP-A-10-292143 and JP-A-11-166145

Especially, the self-dispersing pigments described in the U.S. Patents of the aforementioned (4) prepared by allowing a diazonium salt to act upon carbon black and the encapsulated pigments prepared by the methods described in the Japanese patents of the aforementioned (5) are particularly effective because of the ability to obtain dispersion stability without using extra dispersing agent in ink.

According to the invention, the pigment may be further dispersed using a dispersing agent. As the dispersing agent, various conventionally known agents, such as a surfactant-type low molecular dispersing agent and high molecular type dispersing agent, can be used in response to the pigment to be used. As examples of the dispersing agent, those which are described in JP-A-3-69949, European Patent No. 549486 and the like can be cited. In addition, a pigment derivative called synergist may be added when a dispersing agent is used, in order to accelerate adhesion of the dispersing agent to the pigment.

Particle diameter of the pigment which can be used in this technique is preferably within the range of from 0.01 to 10 μm, more preferably from 0.05 to 1 μm, after dispersion.

As the method for dispersing the pigment, conventionally known dispersion techniques used at the time of ink production and toner production can be used. As the dispersing machine, vertical or horizontal agitator mill, attriter, colloid mill, ball mill, triple roll mill, pearl mill, super mill, impeller, disperser, KD mill, dynatron, pressure kneader and the like can be exemplified. Details are described in Saishin Ganryo Ohyoh Gijutsu (New Pigment Application Techniques) (CMC Shuppan, 1986).

Next, a surfactant which can be contained in the ink composition of the invention is described.

By containing a surfactant in the ink composition of the invention and thereby regulating liquid physical properties of the ink, discharge stability of the ink can be improved, and excellent effects can be obtained in terms of the improvement of water resistance of images and prevention of bleeding of the printed ink and the like.

According to the ink composition of the invention containing a magenta dye represented by formula (1) or (2), the effects to keep fastness of the pigment and to prevent bleeding of the recorded image become particularly significant, when a betaine system surfactant and/or a nonionic surfactant is dissolved and/or dispersed as a surfactant in an aqueous medium as the ink medium.

In this case, the "aqueous medium" means a medium in which a surfactant, a wetting agent, a stabilizer, an antiseptic and the like additive agents are added as occasion demands to water or a mixture of water and a small amount of a water-soluble organic solvent.

The betaine system surfactant to be contained in the ink of the invention basically has a hydrophilic group, keeps fastness of the pigment by improving solubility or dispersing ability of the aforementioned magenta dye and prevents bleeding of the recorded images, and the betaine system surfactant is also contained for example in a case in which it is used for dispersing an oil soluble dye.

The betaine system surfactant as used herein means a compound which has both of cationic part and anionic part in its molecule and also has surface activity. As the cationic part, an amine-derived nitrogen atom, nitrogen atom of a heteroaryl ring, boron atom having 4 bonds with carbon, phosphorous atom and the like can be exemplified. Preferred among them is nitrogen atom of ammonium structure or nitrogen atom of a heteroaryl ring (preferably imidazolium structure). Particularly preferred is a quaternary nitrogen atom. As the anionic part, hydroxyl group, thio group, sulfonamido group, sulfo group, carboxyl group, imido group, phosphate group, phosphonate group and the like can be exemplified. Particularly preferred among then are carboxyl group and sulfo group. Preferably, it is a carboxyl group- or sulfo group-containing surfactant. The charge as the whole molecule may be either cationic, anionic or neutral, but preferably neutral.

Preferred as the betaine system surfactant are the aforementioned compound A and compound B, and a compound represented by either formula (A) or formula (B) is particularly desirable.

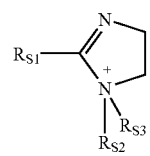

formula (A)

In formula (A), each of $R_{S1}$ and $R_{S2}$ represents an alkyl group, and $R_{S3}$ represents a carboxyl group-containing alkyl group or a sulfo group-containing alkyl group.

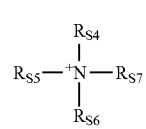

formula (B)

In formula (B), each of $R_{S4}$, $R_{S5}$ and $R_{S6}$ independently represents an alkyl group, an aryl group or a heterocyclic group, and they may form a ring structure through mutual connection. Each of $R_{S4}$, $R_{S5}$ and $R_{S6}$ independently represents an alkyl group (a group having preferably from 1 to 20 carbon atoms more preferably from 1 to 16 carbon atoms, which may be substituted, its examples including methyl group, ethyl group, propyl group, butyl group, hexyl group, octyl group, dodecyl group, cetyl group, stearyl group, oleyl group and the like), an aryl group (a group having preferably from 6 to 20 carbon atoms more preferably from 6 to 14 carbon atoms, which may be substituted, its examples including phenyl group, tolyl group, xylyl group, naphthyl group, cumyl group, dodecylphenyl group and the like) or a heterocyclic group (a group having preferably from 2 to 20 carbon atoms more preferably from 2 to 12 carbon atoms, which may be substituted, its examples including pyridyl group, quinolyl group and the like), and they may form a ring structure through mutual connection. Illustrative examples of the ring structure include piperidine ring, morpholine ring and the like. Alkyl groups are particularly desirable as $R_{S4}$, $R_{S5}$ and $R_{S6}$.

$R_{S7}$ represents a carboxyl group-containing alkyl group or a sulfo group-containing alkyl group. $R_{S7}$ represents a carboxyl group-or sulfo group-containing substituent group (preferably an alkyl group, an aryl group or a heterocyclic group, which contains carboxyl group or sulfo group).

As the aforementioned alkyl group, aryl group or heterocyclic group, the same groups described in relation to $R_{S4}$, $R_{S5}$ and $R_{S6}$ can be exemplified, and the same groups are desirable. It is desirable that $R_{S7}$ is a group represented by -L-COO—. L represents a divalent connecting group. As an example of this, a divalent connecting group which contains an alkylene group or an arylen group as the basic structural unit is desirable. The connected principal chain moiety may contain oxygen atom, sulfur atom, nitrogen atom or the like hetero atom. As L, an alkylene group (methylene or ethylene is preferable, and methylene is more preferable) is desirable $R_{S4}$, $R_{S5}$, $R_{S6}$ or L can be substituted with various substituent groups. Their examples include an alkyl group (having preferably from 1 to 20 carbon atoms, more preferably from 1 to 12 carbon atoms, particularly preferably from 1 to 8 carbon atoms, and its examples include methyl, ethyl, isopropyl, tert-butyl, n-octyl, n-decyl, n-hexadecyl, cyclopropyl, cyclopentyl, cyclohexyl and the like), an alkenyl group (having preferably from 2 to 20 carbon atoms, more preferably from 2 to 12 carbon atoms, particularly preferably from 2 to 8 carbon atoms, and its examples include vinyl, allyl, 2-butenyl, 3-pentenyl and the like), an alkynyl group (having preferably from 2 to 20 carbon atoms, more preferably from 2 to 12 carbon atoms, particularly preferably from 2 to 8 carbon atoms, and its examples include propargyl, 3-pentynyl and the like), an aryl group (having preferably from 6 to 30 carbon atoms, more preferably from 6 to 20 carbon atoms, particularly preferably from 6 to 12 carbon atoms, and its examples include phenyl, p-methylphenyl, naphthyl and the like), an amino group (having preferably from 0 to 20 carbon atoms, more preferably from 0 to 12 carbon atoms, particularly preferably from 0 to 6 carbon atoms, and its examples include amino, methylamino, dimethylamino, diethylamino, diphenylamino, dibenzylamino and the like), an alkoxy group (having preferably from 1 to 20 carbon atoms, more preferably from 1 to 12 carbon atoms, particularly preferably from 1 to 8 carbon atoms, and its examples include methoxy, ethoxy, butoxy and the like), an aryloxy group (having preferably from 6 to 20 carbon atoms, more preferably from 6 to 16 carbon atoms, particularly preferably from 6 to 12 carbon atoms, and its examples include phenyloxy, 2-naphthyloxy and the like), an acyl group (having preferably from 1 to 20 carbon atoms, more preferably from 1 to 16 carbon atoms, particularly preferably from 1 to 12 carbon atoms, and its examples include acetyl, benzoyl, formyl, pivaloyl and the like), an alkoxycarbonyl group (having preferably from 2 to 20 carbon atoms, more preferably from 2 to 16 carbon atoms, particularly preferably from 2 to 12 carbon atoms, and its examples include methoxycarbonyl, ethoxycarbonyl and the like), an aryloxycarbonyl group (having preferably from 7 to 20 carbon atoms, more preferably from 7 to 16 carbon atoms, particularly preferably from 7 to 10 carbon atoms, and its examples include phenyloxycarbonyl and the like), an acyloxy group (having preferably from 2 to 20 carbon atoms, more preferably from 2 to 16 carbon atoms, particularly preferably from 2 to 10 carbon atoms, and its examples include acetoxy, benzoyloxy and the like), an acylamino group (having preferably from 2 to 20 carbon atoms, more preferably from 2 to 16 carbon atoms, particularly preferably from 2 to 10 carbon atoms, and its examples include acetylamino, benzoylamino and the like), an alkoxycarbonylamino group (having preferably from 2 to 20 carbon atoms, more preferably from 2 to 16 carbon atoms, particularly preferably from 2 to 12 carbon atoms, and its examples include methoxycarbonylamino and the like), an aryloxycarbonylamino group (having preferably from 7 to 20 carbon atoms, more preferably from 7 to 16 carbon atoms, particularly preferably from 7 to 12 carbon atoms, and its examples include phenyloxycarbonylamino and the like), a sulfonylamino group (having preferably from 1 to 20 carbon atoms, more preferably from 1 to 16 carbon atoms, particularly preferably from 1 to 12 carbon atoms, and its examples include methanesulfonylamino, benzenesulfonylamino and the like), a sulfamoyl group (having preferably from 0 to 20 carbon atoms, more preferably from 0 to 16 carbon atoms, particularly preferably from 0 to 12 carbon atoms, and its examples include sulfamoyl, methylsulfamoyl, dimethylsulfamoyl, phenylsulfamoyl and the like), a carbamoyl group (having preferably from 1 to 20 carbon atoms, more preferably from 1 to 16 carbon atoms, particularly preferably from 1 to 12 carbon atoms, and its examples include carbamoyl, methylcarbamoyl, diethylcarbamoyl, phenylcarbamoyl and the like), an alkylthio group (having preferably from 1 to 20 carbon atoms, more preferably from 1 to 16 carbon atoms, particularly preferably from 1 to 12 carbon atoms, and its examples include methylthio, ethylthio and the like), an arylthio group (having preferably from 6 to 20 carbon atoms, more preferably from 6 to 16 carbon atoms, particularly preferably from 6 to 12 carbon atoms, and its examples include phenylthio and the like), a sulfonyl group (having preferably from 1 to 20 carbon atoms, more preferably from 1 to 16 carbon atoms, particularly preferably from 1 to 12 carbon atoms, and its examples include mesyl, tosyl and the like), a sulfinyl group (having preferably from 1 to 20 carbon atoms, more preferably from 1 to 16 carbon atoms, particularly preferably from 1 to 12 carbon atoms, and its examples include methanesulfinyl, benzenesulfinyl and the like), a ureido group (having preferably from 1 to 20 carbon atoms, more preferably from 1 to 16 carbon atoms, particularly preferably from 1 to 12 carbon atoms, and its examples include ureido, methylureido, phenylureido and the like), a phosphoric acid amido group (having preferably from 1 to 20 carbon atoms, more preferably from 1 to 16 carbon atoms, particularly preferably from 1 to 12 carbon atoms, and its examples include diethyl phosphate amido, phenyl phosphate amido and the like), hydroxy group, mercapto group, a halogen atom (e.g., fluorine atom, chlorine atom, bromine atom or iodine atom), cyano group, sulfo group, carboxyl group, nitro group, hydroxamate group, sulfino group, hydrazino group, imino group, a heterocyclic group (having preferably from 1 to 30 carbon atoms, more preferably from 1 to 12 carbon atoms, wherein it contains nitrogen atom, oxygen atom or sulfur atom as the hetero atom, and its illustrative examples include imidazolyl, pyridyl, quinolyl, furyl, thienyl, piperidyl, morpholino, benzoxazolyl, benzoimidazolyl, benzothiazolyl, carbazolyl, azepinyl and the like) and silyl group (having preferably from 3 to 40 carbon atoms, more preferably from 3 to 30 carbon atoms, particularly preferably from 3 to 24 carbon atoms, and its examples include trimethylsilyl, triphenylsilyl and the like). These substituent groups may be further substituted. Also, when two or more substituent groups are present, they may be the same or different. Also, they may form a ring through mutual connection when possible. In addition, two or more of betaine structure may be contained via $R_{S4}$, $R_{S5}$, $R_{S6}$ or L.

According to the compound represented by formula (B), which is used in the invention, a case in which any one of $R_{S4}$, $R_{S5}$, $R_{S6}$ and L contains a group having 8 or more carbon atoms is desirable. Particularly preferred is a case in which $R_{S4}$, $R_{S5}$ and $R_{S6}$ contain a long chain alkyl group having 8 or more carbon atoms. More preferred is a case in which L represents CH ($R_{S8}$), $R_{S8}$ represents hydrogen atom or an alkyl group having 8 or more carbon atoms, and any one of $R_{S4}$, $R_{S5}$, $R_{S6}$ and $R_{S8}$ is an alkyl group having 8 or more carbon atoms.

According to the compound represented by formula (A), which is used in the invention, each of $R_{S1}$ and $R_{S2}$ independently represents an alkyl group, and $R_{S3}$ represents an alkyl group which contains carboxy group or sulfo group.

The same groups exemplified in relation to the aforementioned $R_{S4}$, $R_{S5}$ and $R_{S6}$ can be applied to the alkyl groups represented by $R_{S1}$ and $R_{S2}$.

As the $R_{S3}$, the same groups of the aforementioned $R_{S7}$ can be exemplified. It is desirable that $R_{S3}$ is a carboxyalkyl group and a sulfoalkyl group (the number of carbon atoms of the alkyl moiety of said group is preferably from 1 to 6, more preferably from 1 to 4).

Desirable adding amount of the betaine system surfactant represented by formula (A) or formula (B) (its amount used for dispersing the dye is also included therein) has a broad range, but is preferably from 0.01 to 20 mass %, more preferably from 0.01 to 15 mass %, further preferably from 0.01 to 10 mass %, particularly preferably from 0.01 to 5 mass %.

Illustrative examples of the betaine system surfactant to be preferably used in the invention are shown in the following, though the invention is not restricted thereby as a matter of course.

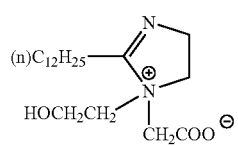

W-1

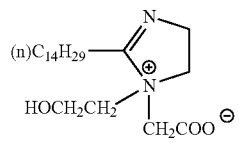

W-2

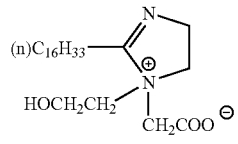

W-3

-continued

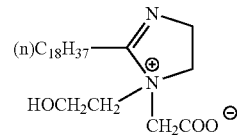

W-4

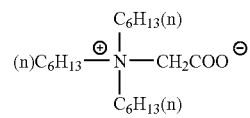

W-5

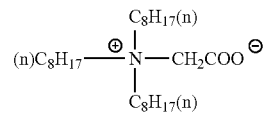

W-6

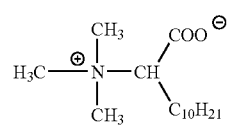

W-7

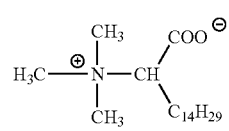

W-8

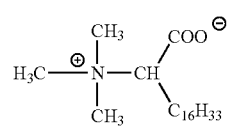

W-9

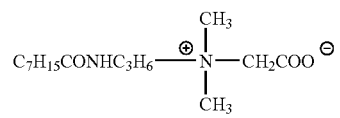

W-10

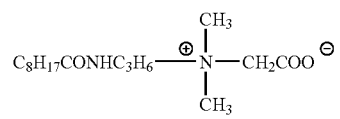

W-11

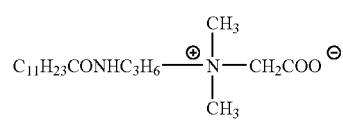

W-12

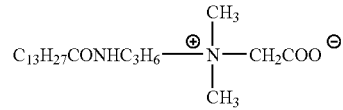

W-13

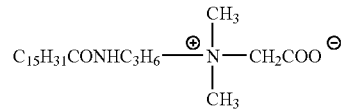

W-14

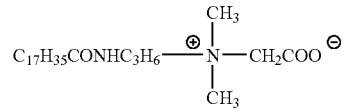

W-15

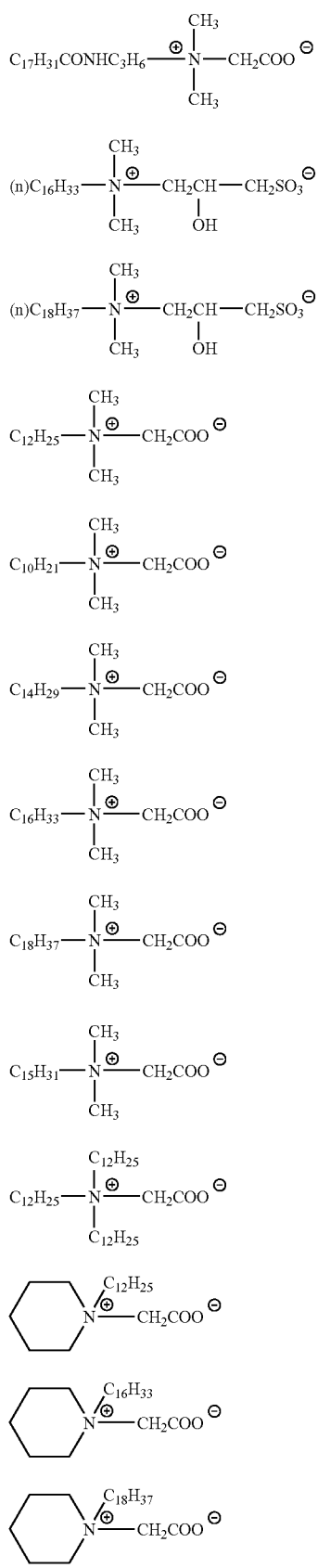
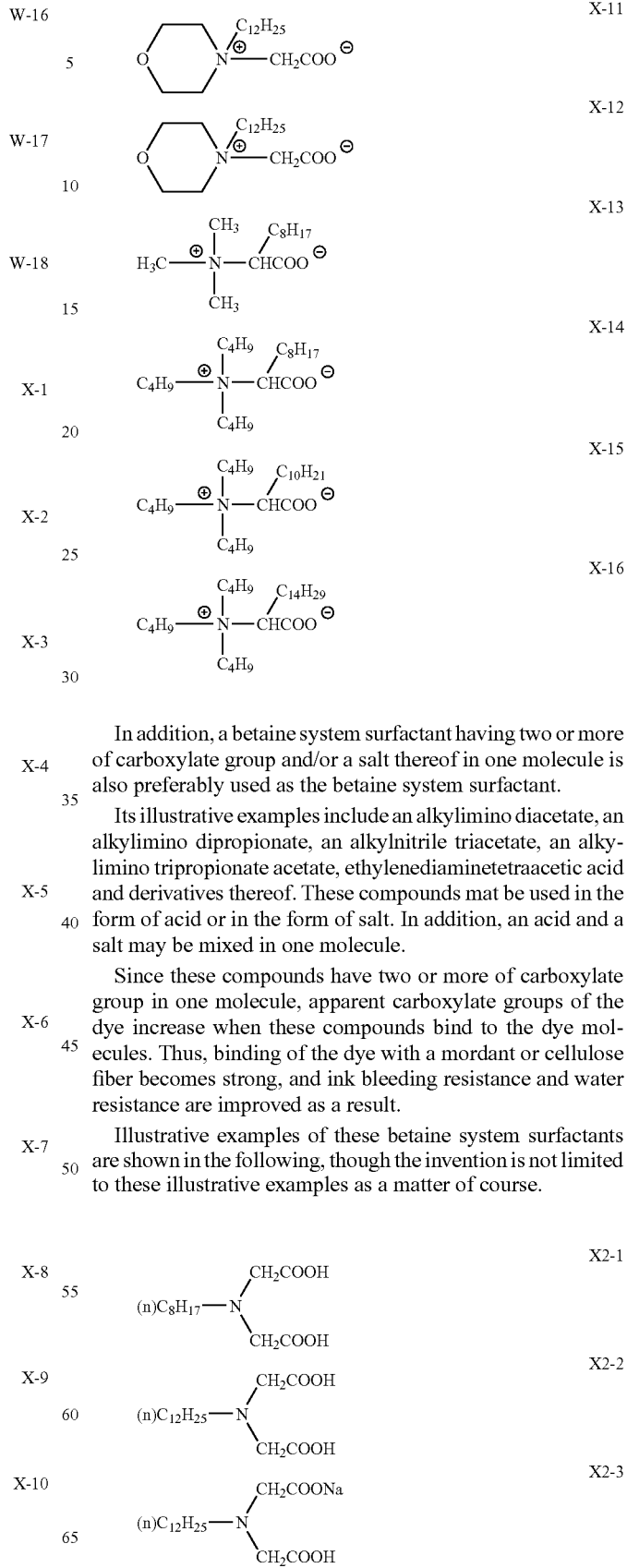

In addition, a betaine system surfactant having two or more of carboxylate group and/or a salt thereof in one molecule is also preferably used as the betaine system surfactant.

Its illustrative examples include an alkylimino diacetate, an alkylimino dipropionate, an alkylnitrile triacetate, an alkylimino tripropionate acetate, ethylenediaminetetraacetic acid and derivatives thereof. These compounds mat be used in the form of acid or in the form of salt. In addition, an acid and a salt may be mixed in one molecule.

Since these compounds have two or more of carboxylate group in one molecule, apparent carboxylate groups of the dye increase when these compounds bind to the dye molecules. Thus, binding of the dye with a mordant or cellulose fiber becomes strong, and ink bleeding resistance and water resistance are improved as a result.

Illustrative examples of these betaine system surfactants are shown in the following, though the invention is not limited to these illustrative examples as a matter of course.

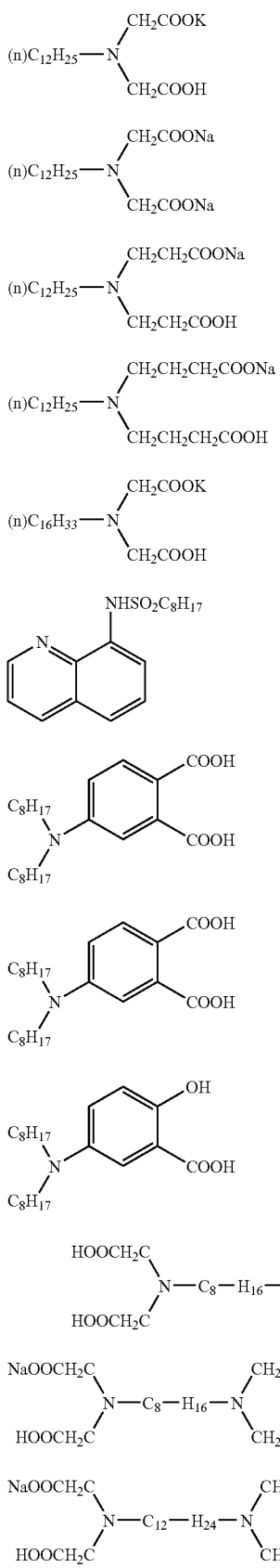
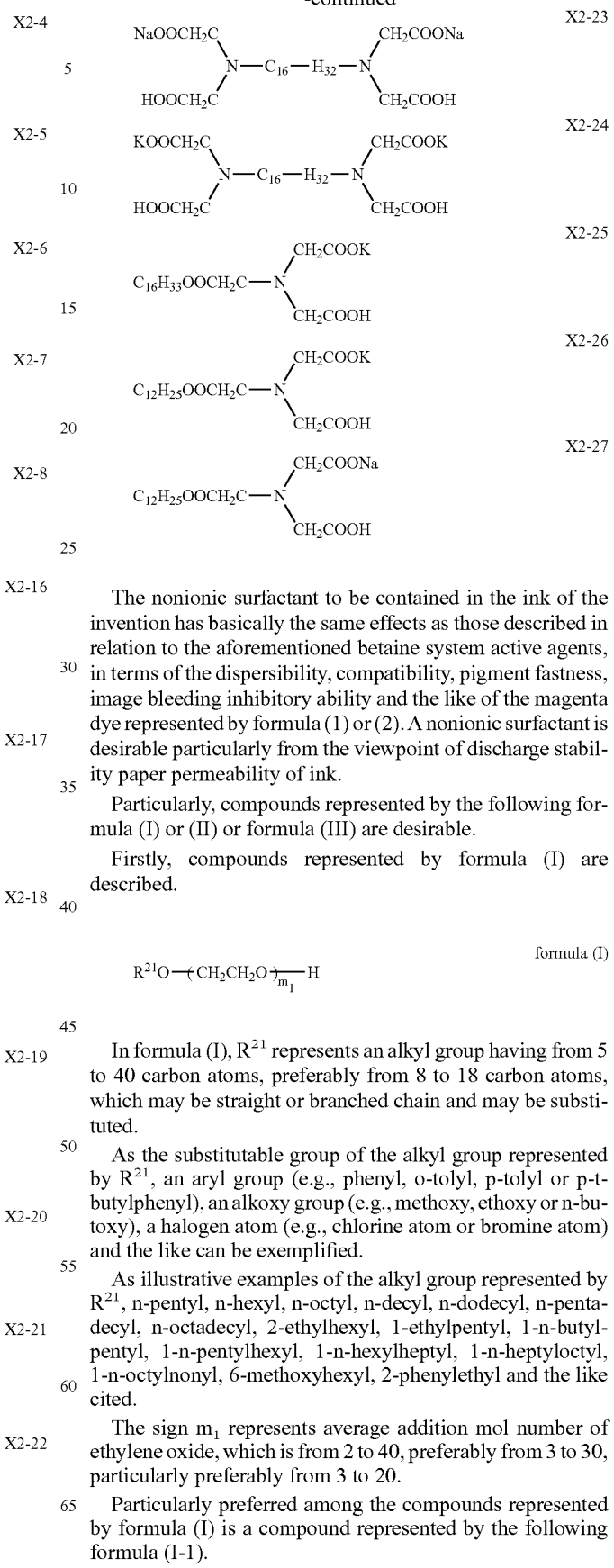

The nonionic surfactant to be contained in the ink of the invention has basically the same effects as those described in relation to the aforementioned betaine system active agents, in terms of the dispersibility, compatibility, pigment fastness, image bleeding inhibitory ability and the like of the magenta dye represented by formula (1) or (2). A nonionic surfactant is desirable particularly from the viewpoint of discharge stability paper permeability of ink.

Particularly, compounds represented by the following formula (I) or (II) or formula (III) are desirable.

Firstly, compounds represented by formula (I) are described.

$$R^{21}O-(CH_2CH_2O)_{m_1}-H \qquad \text{formula (I)}$$

In formula (I), $R^{21}$ represents an alkyl group having from 5 to 40 carbon atoms, preferably from 8 to 18 carbon atoms, which may be straight or branched chain and may be substituted.

As the substitutable group of the alkyl group represented by $R^{21}$, an aryl group (e.g., phenyl, o-tolyl, p-tolyl or p-t-butylphenyl), an alkoxy group (e.g., methoxy, ethoxy or n-butoxy), a halogen atom (e.g., chlorine atom or bromine atom) and the like can be exemplified.

As illustrative examples of the alkyl group represented by $R^{21}$, n-pentyl, n-hexyl, n-octyl, n-decyl, n-dodecyl, n-pentadecyl, n-octadecyl, 2-ethylhexyl, 1-ethylpentyl, 1-n-butylpentyl, 1-n-pentylhexyl, 1-n-hexylheptyl, 1-n-heptyloctyl, 1-n-octylnonyl, 6-methoxyhexyl, 2-phenylethyl and the like cited.

The sign $m_1$ represents average addition mol number of ethylene oxide, which is from 2 to 40, preferably from 3 to 30, particularly preferably from 3 to 20.

Particularly preferred among the compounds represented by formula (I) is a compound represented by the following formula (I-1).

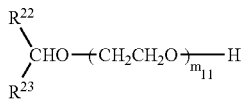
formula (I-1)

In formula (I-1), each of $R^{22}$ and $R^{23}$ independently represents a saturated hydrocarbon having from 4 to 10 carbon atoms, wherein the total number of carbon atoms of $R^{22}$ and $R^{23}$ is from 8 to 18. The sign $m_{11}$ represents average addition mol number of ethylene oxide, which is from 3 to 20. As the saturated hydrocarbon having from 4 to 10 carbon atoms represented by $R^{22}$ or $R^{23}$, n-butyl, i-butyl, n-pentyl, n-hexyl, n-heptyl, n-octyl, 2-ethylhexyl, n-nonyl, n-decyl and the like can be exemplified. The total number of carbon atoms of $R^{22}$ and $R^{23}$ is from 8 to 18, more preferably from 8 to 16. The sign $m_{11}$ is from 3 to 20, more preferably from 5 to 20, further preferably from 6 to 18.

Illustrative examples of the compound represented by formula (I) are shown in the following, though not limited thereto.

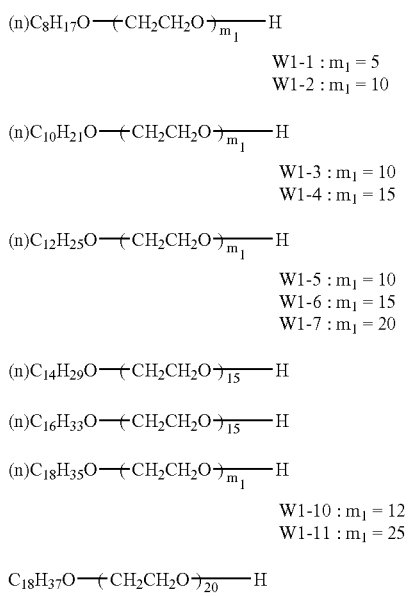

Illustrative examples of the compound represented by formula (I-1) are shown in the following Table 17, though not limited thereto.

TABLE 17

| No. | $R^{22}$ | $R^{23}$ | $m_{11}$ |
|---|---|---|---|
| W1-13 | (n)C$_4$H$_9$ | (n)C$_4$H$_9$ | 3 |
| W1-14 | (i)C$_4$H$_9$ | (i)C$_4$H$_9$ | 5 |
| W1-15 | (i)C$_4$H$_9$ | (i)C$_4$H$_9$ | 9.5 |
| W1-16 | (i)C$_4$H$_9$ | (i)C$_4$H$_9$ | 11.4 |
| W1-17 | (n)C$_5$H$_{11}$ | (n)C$_5$H$_{11}$ | 8 |
| W1-18 | (n)C$_5$H$_{11}$ | (n)C$_5$H$_{11}$ | 10 |
| W1-19 | (n)C$_5$H$_{11}$ | (n)C$_5$H$_{11}$ | 11.4 |
| W1-20 | (n)C$_5$H$_{11}$ | (n)C$_5$H$_{11}$ | 13.5 |
| W1-21 | (n)C$_5$H$_{11}$ | (n)C$_5$H$_{11}$ | 15 |
| W1-22 | (n)C$_6$H$_{13}$ | (n)C$_6$H$_{13}$ | 10 |
| W1-23 | (n)C$_6$H$_{13}$ | (n)C$_6$H$_{13}$ | 13.6 |

TABLE 17-continued

| No. | $R^{22}$ | $R^{23}$ | $m_{11}$ |
|---|---|---|---|
| W1-24 | (n)C$_6$H$_{13}$ | (n)C$_6$H$_{13}$ | 15.8 |
| W1-25 | (n)C$_6$H$_{13}$ | (n)C$_7$H$_{15}$ | 16 |
| W1-26 | (n)C$_7$H$_{15}$ | (n)C$_7$H$_{15}$ | 15 |
| W1-27 | (n)C$_7$H$_{15}$ | (n)C$_7$H$_{15}$ | 16.5 |
| W1-28 | (n)C$_8$H$_{17}$ | (n)C$_8$H$_{17}$ | 14 |
| W1-29 | (n)C$_8$H$_{17}$ | (n)C$_8$H$_{17}$ | 17.6 |
| W1-30 | (n)C$_8$H$_{17}$ | (n)C$_{10}$H$_{21}$ | 20 |

Next, compounds represented by formula (II) are described.

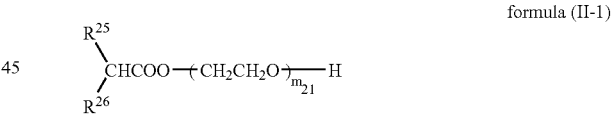
formula (II)

In formula (II), $R^{24}$ represents an alkyl group having from 5 to 40 carbon atoms, preferably from 5 to 30 carbon atoms, which may be straight or branched chain and may be substituted.

As the substitutable group of the alkyl group represented by $R^{24}$, an aryl group (e.g., phenyl, o-tolyl, p-tolyl or p-t-butylphenyl), an alkoxy group (e.g., methoxy, ethoxy or n-butoxy), a halogen atom (e.g., chlorine atom or bromine atom) and the like can be exemplified.

As illustrative examples of the alkyl group represented by $R^{24}$, n-pentyl, n-hexyl, n-octyl, n-decyl, n-dodecyl, n-pentadecyl, n-octadecyl, 2-ethylhexyl, 1-ethylpentyl, 1-n-butylheptyl, 1-n-hexylnonyl, 1-n-heptyldecyl, 1-n-octyldodecyl, 1-n-decyltetradecyl, 6-methoxyhexyl, 2-phenylethyl and the like cited.

The sign $m_2$ represents average addition mol number of ethylene oxide, which is from 2 to 40, preferably from 3 to 30, particularly preferably from 4 to 20.

Particularly preferred among the compounds represented by formula (II) is a compound represented by the following formula (II-1).

$$R^{25}\!\!\!\diagdown\!\!\!\underset{R^{26}\diagup}{CHCOO\!-\!(CH_2CH_2O)_{m_{21}}\!-\!H}$$

formula (II-1)

In formula (II-1), each of $R^{25}$ and $R^{26}$ independently represents a saturated hydrocarbon radical having from 2 to 20 carbon atoms, preferably from 4 to 13 carbon atoms. As the saturated hydrocarbon radical having from 2 to 20 carbon atoms represented by $R^{25}$ or $R^{26}$, ethyl, n-butyl, i-butyl, n-pentyl, n-hexyl, n-heptyl, n-octyl, 2-ethylhexyl, n-nonyl, n-decyl, n-dodecyl, n-hexadecyl, n-octadecyl and the like can be exemplified. The sign $m_{21}$ represents average addition mol number and is from 2 to 40, preferably from 3 to 30.

Illustrative examples of the compound represented by formula (II) are shown in the following, though not limited thereto.

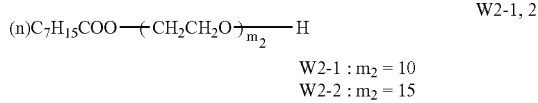
W2-1, 2

W2-1 : $m_2$ = 10
W2-2 : $m_2$ = 15

-continued

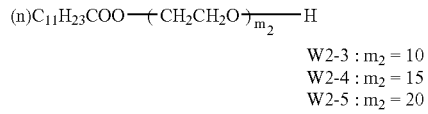

W2-3~5
W2-3 : $m_2$ = 10
W2-4 : $m_2$ = 15
W2-5 : $m_2$ = 20

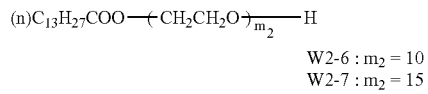

W2-6~7
W2-6 : $m_2$ = 10
W2-7 : $m_2$ = 15

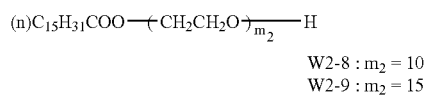

W2-8, 9
W2-8 : $m_2$ = 10
W2-9 : $m_2$ = 15

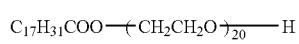

W2-10

W2-11

W2-12

As the compound represented by formula (II-1), for example, a one-terminal ester of polyethylene oxide of 2-butyloctanoic acid, a polyethylene oxide addition product of undecan-6-ol and the like can be cited. Illustrative examples of the compound represented by formula (II-1) are shown in the following Table 18, though not limited thereto.

TABLE 18

| No. | $R^{25}$ | $R^{26}$ | $m_{21}$ |
|---|---|---|---|
| W2-13 | $C_2H_5$ | $C_4H_9$ | 3 |
| W2-14 | $C_2H_5$ | $C_4H_9$ | 5 |
| W2-15 | $C_4H_9$ | $C_6H_{13}$ | 9.5 |
| W2-16 | $C_6H_{13}$ | $C_8H_{17}$ | 5 |
| W2-17 | $C_6H_{13}$ | $C_8H_{17}$ | 8 |
| W2-18 | $C_6H_{13}$ | $C_8H_{17}$ | 10 |
| W2-19 | $C_6H_{13}$ | $C_8H_{17}$ | 11.4 |
| W2-20 | $C_6H_{13}$ | $C_8H_{17}$ | 12.5 |
| W2-21 | $C_6H_{13}$ | $C_8H_{17}$ | 15 |
| W2-22 | $C_6H_{13}$ | $C_8H_{17}$ | 25 |
| W2-23 | $C_7H_{15}$ | $C_9H_{19}$ | 14 |
| W2-24 | $C_7H_{15}$ | $C_9H_{19}$ | 15 |
| W2-25 | $C_7H_{15}$ | $C_9H_{19}$ | 20 |
| W2-26 | $C_7H_{15}$ | $C_9H_{19}$ | 25 |
| W2-27 | $C_8H_{17}$ | $C_{10}H_{21}$ | 30 |
| W2-28 | $C_{10}H_{21}$ | $C_{12}H_{25}$ | 20 |
| W2-29 | $C_{10}H_{21}$ | $C_{12}H_{25}$ | 25 |
| W2-30 | $C_{10}H_{21}$ | $C_{13}H_{27}$ | 20 |
| W2-31 | $C_{10}H_{21}$ | $C_{13}H_{27}$ | 25 |
| W2-32 | $C_{10}H_{21}$ | $C_{13}H_{27}$ | 40 |

It is possible to synthesize the compounds represented by formula (I) or formula (II) using conventionally known methods; for example, they can be obtained by the methods described in an completely revised "Shin Kaimen Kassei Zai Nyumon (A New Introduction to Surfactants)", edited by T. Fujimoto (1992), pp. 94-107.

Next, compounds represented by formula (III) are described.

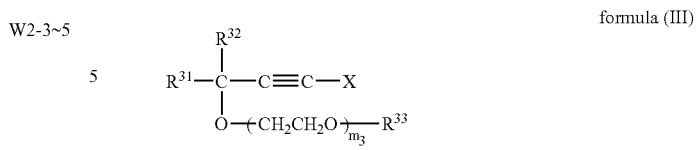

formula (III)

In formula, each of $R^{31}$ and $R^{32}$ independently represents an alkyl group having from 1 to 18 carbon atoms.

In further minutely describing, each of $R^{31}$ and $R^{32}$ independently represents an alkyl group having from 1 to 18 carbon atoms (e.g., methyl, ethyl, n-propyl, butyl, hexyl, octyl, decyl, dodecyl or the like) which may be substituted. As examples of the substituent group, an alkyl group (e.g., methyl, ethyl, isopropyl or the like), an alkoxy group (e.g., methoxy, ethoxy or the like), a halogen atom (e.g., chlorine atom, bromine atom or the like) and the like can be cited. As $R^{31}$ and $R^{32}$, unsaturated straight chain alkyl groups or unsaturated branched chain alkyl groups having from 1 to 12 carbon atoms are desirable, and their particularly desirable illustrative examples include methyl, ethyl, n-butyl, 2-methylbutyl, 2,4-dimethylpentyl and the like.

$R^{32}$ represents hydrogen atom, an alkyl group having from 1 to 6 carbon atoms or phenyl group, and the alkyl group and phenyl group may be substituted.

As the substituent group of the alkyl group of $R^{33}$, an alkyl group (e.g., methyl, ethyl, isopropyl or the like), an alkoxy group (e.g., methoxy, ethoxy or the like) and phenyl group can be exemplified. As the substituent group of the phenyl group of $R^{33}$, an alkyl group (e.g., methyl, ethyl, isopropyl or the like), an alkoxy group (e.g., methoxy, ethoxy or the like), a halogen atom (e.g., fluorine atom, chlorine atom or bromine atom) and the like can be exemplified. Preferred among $R^{33}$ is hydrogen atom or an alkyl group having from 1 to 4 carbon atoms, and particularly preferred is hydrogen atom.

X represents hydrogen atom or

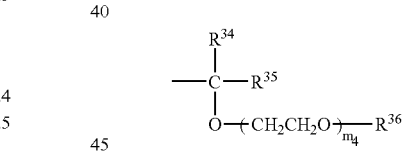

and each of $R^{34}$ and $R^{35}$ independently represents an alkyl group having from 1 to 18 carbon atoms. Preferred substituent groups and illustrative examples of $R^{34}$ and $R^{35}$ are substituent groups and illustrative examples selected from the same group of the aforementioned $R^{31}$ and $R^{32}$. $R^{36}$ represents hydrogen atom, an alkyl group having from 1 to 6 carbon atoms or phenyl group, and its preferred illustrative examples are substituent groups and illustrative examples selected from the same group of the aforementioned $R^{33}$.

The signs $m_3$ and $m_4$ respectively represent average addition mol numbers of ethylene oxide, wherein $m_3+m_4$ is from 0 to 100, preferably from 0 to 50, particularly preferably from 0 to 40.

In this case, $R^{33}$ represents hydrogen atom when $m_3=0$, and $R^{36}$ represents hydrogen atom when $m_4=0$. In addition, when X represents hydrogen atom, $m_3$ is from 1 to 100, preferably from 1 to 50, particularly preferably from 1 to 40.

Particularly preferred among the compounds represented by formula (III) are compounds represented by the following formula (III-1).

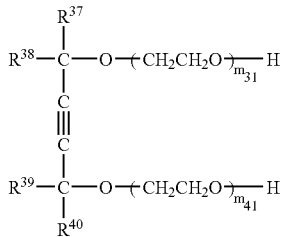

formula (III-1)

In formula, each of $R^{37}$, $R^{38}$, $R^{39}$ and $R^{40}$ independently represents an alkyl group having from 1 to 6 carbon atoms, preferably from 1 to 4 carbon atoms. Each of the signs $m_{31}$ and $m_{41}$ represents addition mol number of ethylene oxide, wherein their total becomes from 0 to 40, preferably from 2 to 20.

Illustrative examples of the compound represented by formula (III) or formula (III-1) are shown in the following, though not limited thereto.

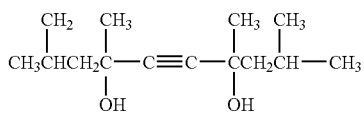

W5-1

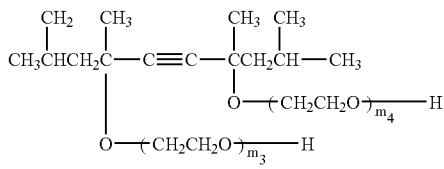

W5-2~6

W5-2 : $m_3 + m_4 = 1.3$
W5-3 : $m_3 + m_4 = 3.5$
W5-4 : $m_3 + m_4 = 10$
W5-5 : $m_3 + m_4 = 20$
W5-6 : $m_3 + m_4 = 30$

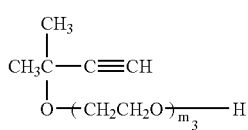

W5-7, 8

W5-7 : $m_3 = 5$
W5-8 : $m_3 = 10$

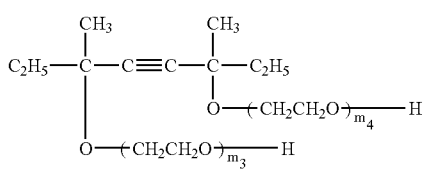

W5-9, 10

W5-9 : $m_3 + m_4 = 3$
W5-10 : $m_3 + m_4 = 10$

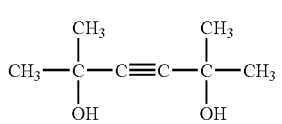

W5-11

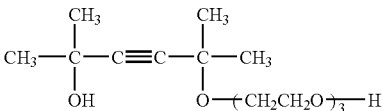

W5-12

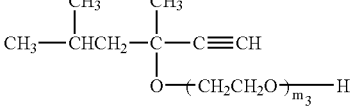

W5-13, 14

W5-13 : $m_3 = 5$
W5-14 : $m_3 = 10$

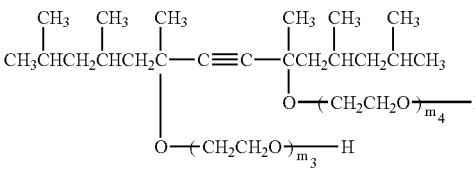

W5-15, 16

W5-15 : $m_3 + m_4 = 8$
W5-16 : $m_3 + m_4 = 20$

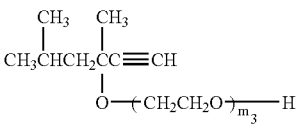

W5-17, 18

W5-17 : $m_3 = 5$
W5-18 : $m_3 = 10$

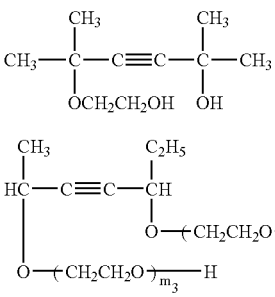

W5-19

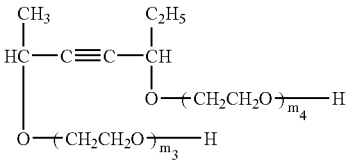

W5-20

$m_3 + m_4 = 2$

It is possible to synthesize the compounds represented by formula (III) or formula (III-1) using conventionally known methods; for example, they can be obtained by the methods described in an completely revised "Shin Kaimen Kassei Zai Nyumon (A New Introduction to Surfactants)", edited by T. Fujimoto (1992), pp. 94-107.

In addition, the compounds represented by formula (III) or formula (III-1) can also be obtained easily as articles on the market, and their illustrative trade names include SUR-FYNOL 61, 82, 104, 420, 440, 465, 485, 504, CT-111, CT-121, CT-131, CT-136, CT-141, CT-151, CT-171, CT-324, DF-37, DF-58, DF-75, DF-110D, DF-210, GA, OP-340, PSA-204, PSA-216, PSA-336, SE, SE-F, Dynol 604 (all mfd. by Nisshin Chemical Industry and Air Products & Chemicals), Olfine A, B, AK-02, CT-151 W, E1004, E1010, P, SPC, STG, Y, 32W (all mfd. by Nisshin Chemical Industry) and the like.

As the compounds represented by formula (III-1), for example, ethylene oxide addition products of acetylene system diol (SURFYNOL series, mfd. by Air Products & Chemicals) and the like are suitable, of which those having a molecular weight of 200 or more and 1,000 or less are preferable, having a molecular weight of 300 or more and 900 or less are bore preferable, and having a molecular weight of 400 or more and 900 or less are particularly preferable.

As the surfactant of the invention to be contained in the ink, it is desirable that its precipitation and separation from the ink hardly occur and it has less foaming property, and the aforementioned betaine system surfactants and nonionic surfactants are desirable also from this point of view. Nonionic surfactants are particularly desirable from the viewpoint of foaming property, of which a compound represented by formula (I-1) or formula (II-1) is desirable as a nonionic surfactant in which the hydrophobic region is double-stranded or the hydrophobic region is branched, and a compound represented by formula (III-1) is desirable as a nonionic surfactant which has a hydrophilic group at around the center of a hydrophobic region.

When a nonionic surfactant is used in the ink to be used in the invention, its amount to be contained is from 0.01 to 20 mass %, preferably from 0.01 to 15 mass %, more preferably from 0.01 to 10 mass %, particularly preferably from 0.01 to 5 mass %. When the nonionic surfactant in ink is used alone and its concentration is less than 0.01 mass %, the printing qualities are apt to decrease considerably, such as reduction of discharge stability, generation of bleeding at the time of color mixing and generation of whiskers. In addition, when amount of the surfactant in ink is larger than 20 mass %, it causes poor printing in some cases due, for example, to adhesion of the ink to the hardware surface at the time of discharge. From this point of view, static surface tension of the ink of the invention is preferably 20 mN/m or more, more preferably 25 mN/m, at 25° C. Also, 60 mN/m or less is preferable, 50 mN/m or less is more preferable, 40 mN/m or less is particularly preferable, at 25° C. The static surface tension is further described later.

In addition, according to the ink of the invention, it is possible to jointly use the aforementioned betaine system surfactant and nonionic surfactant and to jointly use other species of surfactant.

When other species of surfactant is jointly used, effect of the aforementioned surfactants of the invention is reinforced in some cases due to control of surface tension and the like liquid physical property of ink, improvement of discharge stability of ink, improvement of water resistance of images or improvement of the property to inhibit bleeding of the printed ink.

As these surfactants which can be jointly used with the aforementioned surfactants, for example, anionic surfactants such as a fatty acid salt, an alkyl sulfuric acid ester salt, an alkylbenzene sulfonate, an alkylnaphthalene sulfonate, a dialkyl sulfosuccinate, an alkyl phosphoric acid ester salt, a naphthalene sulfonate formalin condensate, polyoxyethylene alkyl sulfuric acid ester salt and the like, cationic surfactants such as a fatty amine salt, a quaternary ammonium salt, an alkyl pyridinium salt and the like, and fluorine system and silicon system compounds and the like can be cited. These can be used alone or as a mixture of two or more.

Illustratively, sodium dodecyl sulfate, sodium dodecyloxy sulfonate, sodium alkylbenzene sulfonate and the like anionic surfactants, cetylpyridinium chloride, trimethylcetylammonium chloride, tetrabutylammonium chloride and the like cationic surfactants and the like can for example be cited.

Regarding these surfactants which may be jointly used, it is possible to add them within such a range that the effects of the invention are not spoiled, their containing amount is from 0.001 to 15 mass %, preferably from 0.005 to 10 mass %, more preferably from 0.01 to 5 mass %, based on the ink, and they are used within such a range that they do not exceed concentration of the aforementioned betaine system surfactant and nonionic surfactant. Total of the containing amounts of surfactants is from 0.01 to 20 mass %, preferably from 0.01 to 15 mass %, more preferably from 0.01 to 5 mass %, based on the ink. Preferably, substantially the aforementioned betaine system surfactant and nonionic surfactant alone are used as the surfactants.

According to the invention, the surfactants are also used when emulsification and dispersion of a color material which is described later are required and when they are used as surface tension adjusting agents, so that further description on the surfactants will be added to respective items.

The ink composition of the invention can be prepared by dissolving and/or dispersing the aforementioned azo dye and surfactant in an aqueous medium. The "aqueous medium" according to the invention means a medium in which a wetting agent, a stabilizer, an antiseptic and the like additive agents are added as occasion demands to water or a mixture of water and a water-soluble organic solvent.

The ink of the invention contains a plurality of water-soluble organic solvents, and a water-soluble organic solvent having a thio ether or sulfoxide moiety in the water-soluble organic solvents is 10 mass % to 80 mass %, preferably 15 mass % to 60 mass %, more preferably 20 mass % to 50 mass %. When it is less than 10 mass %, the ozone resistance improving effect cannot be obtained, and inhibition of changes in hue also becomes insufficient. On the other hand, when it exceeds 80 mass %, it becomes difficult to control physical properties of the ink, and the discharging property becomes poor as an ink for ink jet recording use. By the use of the water-soluble organic solvent having a thio ether or sulfoxide moiety, it becomes possible to further improve ozone resistance and to inhibit changes in hue. In this connection, in this specification, illustrations of compounds having a thio ether or sulfoxide moiety are present in other columns than the description of the water-soluble organic solvent, and the amount of compound having a thio ether or sulfoxide moiety in the ink of the invention is the total amount of these compounds contained in the ink.

As the water-soluble organic solvent having a thio ether or sulfoxide moiety, the thio ethers, or sulfoxides as their oxidized forms, described in JP-A-2005-119220 and the like can be cited as its examples, though not limited thereto. Preferred are 2,2'-thiodiethanol and dimethyl sulfoxide, 2,2-bishydroxyethyl sulfoxide and 3,6-dioctane 1,8 diol, most preferred are 2,2'-thiodiethanol and dimethyl sulfoxide.

Examples of other water-soluble organic solvents which can be used in addition to the above include an alcohol (e.g. methanol, ethanol, propanol, isopropanol, butanol, isobutanol, sec-butanol, t-butanol, pentanol, hexanol, cyclohexanol, benzyl alcohol or the like), polyhydric alcohols (e.g. ethylene glycol, diethylene glycol, triethylene glycol, polyethylene glycol, propylene glycol, dipropylene glycol, polypropylene glycol, butylene glycol, hexanediol, pentanediol, glycerol, hexanetriol and the like), a glycol derivative (e.g. ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, triethylene glycol monomethyl ether, triethylene glycol monoethyl ether, ethylene glycol monophenyl ether or the like), an amine (e.g. ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine or the like), urea, a urea derivative and other polar solvent (e.g. formamide, N,N-dimethylformamide, N,N-dimethylacetamide, 2-pyrrolidone, N-methyl-2-pyrrolidone, N-vinyl-2-pyrrolidone, 2-oxazolidone, 1,3-dimethyl-2-imidazoleidinone, acetonitrile, acetone or the like). In this connection, the aforementioned water-soluble organic solvent is a compound which may be liquid or solid at 25° C., and two or more species thereof may be jointly used.

Amount of the water-soluble organic solvent to be used is preferably from 10 to 80 mass %, more preferably from 20 to 60 mass %, in the ink of the invention. In addition, the term water-soluble as used herein means that solubility in water of 25° C. is 1 g/100 g or more.

When the aforementioned azo dye is an oil soluble dye, it can be prepared by dissolving said oil soluble dye in a high boiling point organic solvent and emulsifying and dispersing in an aqueous medium.

Boiling point of the high boiling point organic solvent to be used in the invention is 150° C. or more, but preferably 170° C. or more.

Its examples include phthalic acid esters (e.g., dibutyl phthalate, dioctyl phthalate, dicyclohexyl phthalate, di-2-ethylhexyl phthalate, decyl phthalate, bis(2,4-di-tert-amylphenyl)isophthalate, bis(1,1-diethylpropyl)phthalate and the like), phosphoric acid or phosphonic acid esters (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridecyl phosphate, di-2-ethylhexylphenyl phosphate and the like), benzoic acid esters (e.g., 2-ethylhexyl benzoate, 2,4-dichloro benzoate, dodecyl benzoate, 2-ethylhexyl-p-hydroxy benzoate and the like), amides (e.g., N,N-diethyldodecanamide, N,N-diethyllaurylamide and the like), alcohols or phenols (e.g., isostearyl alcohol, 2,4-di-tert-amylphenol and the like), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate and the like), aniline derivatives (e.g., N,N-dibutyl-2-butoxy-5-tert-octylaniline and the like), chlorinated paraffins (paraffins having a chlorine content of from 10% to 80%), trimesic acid esters (e.g., tributyl trimesate and the like), dodecylbenzene, diisopropylnaphthalene, phenols (e.g., 2,4-di-tert-amylphenol, 4-dodecyloxyphenol, 4-dodecyloxycarbonylphenol, 4-(4-dodecyloxyphenylsulfonyl)phenol and the like), carboxylic acids (e.g., 2-(2,4-di-tert-amylphenoxy)butyrate, 2-ethoxy octane decanoate and the like) and alkyl phosphates (e.g., di-2(ethylhexyl)phosphate and the like). The high boiling point organic solvent can be used at a mass ratio of from 0.01 to 3 times, preferably from 0.01 to 1.0, based on the oil soluble dye.

These high boiling point organic solvents maybe used alone or as a mixture of several species [e.g., tricresyl phosphate with dibutyl phthalate, trioctyl phosphate with di(2-ethylhexyl)sebacate, or dibutyl phthalate with poly(N-t-butylacrylamide)].

Examples of high boiling point organic solvents to be used in the invention other than the aforementioned compounds and/or methods for synthesizing these high boiling point organic solvents are described, for example, in U.S. Pat. No. 2,322,027, U.S. Pat. No. 2,533,514, U.S. Pat. No. 2,772,163, U.S. Pat. No. 2,835,579, U.S. Pat. No. 3,594,171, U.S. Pat. No. 3,676,137, U.S. Pat. No. 3,689,271, U.S. Pat. No. 3,700,454, U.S. Pat. No. 3,748,141, U.S. Pat. No. 3,764,336, U.S. Pat. No. 3,765,897, U.S. Pat. No. 3,912,515, U.S. Pat. No. 3,936,303, U.S. Pat. No. 4,004,928, U.S. Pat. No. 4,080,209, U.S. Pat. No. 4,127,413, U.S. Pat. No. 4,193,802, U.S. Pat. No. 4,207,393, U.S. Pat. No. 4,220,711, U.S. Pat. No. 4,239,851, U.S. Pat. No. 4,278,757, U.S. Pat. No. 4,353,979, U.S. Pat. No. 4,363,873, U.S. Pat. No. 4,430,421, U.S. Pat. No. 4,430,422, U.S. Pat. No. 4,464,464, U.S. Pat. No. 4,483,918, U.S. Pat. No. 4,540,657, U.S. Pat. No. 4,684,606, U.S. Pat. No. 4,728,599, U.S. Pat. No. 4,745,049, U.S. Pat. No. 4,935,321, U.S. Pat. No. 5,013,639, European Patent No. 276,319A, European Patent No. 286,253A, European Patent No. 289,820A, European Patent No. 309,158A, European Patent No. 309,159A, European Patent No. 309,160A European Patent No. 509,311A, European Patent No. 510,576A, East Germany Patent No. 147,009, East Germany Patent No. 157,147, East Germany Patent No. 159,573, East Germany Patent No. 225,240A, British Patent No. 2,091,124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946, JP-A-4-346338 and the like.

The aforementioned high boiling point organic solvent is used at a mass ratio of from 0.01 to 3 times, preferably from 0.01 to 1.0, based on the oil soluble dye.

According to the invention, the oil soluble dye and high boiling point organic solvent are used by emulsifying and dispersing them in an aqueous medium. From the viewpoint of emulsifiability, a low boiling point organic solvent can be used in some cases in carrying out emulsification and dispersion. The low boiling point organic solvent is an organic solvent having a boiling point of about 30° C. or more and 150° C. or less under ordinary pressure. For example, esters (e.g., ethyl acetate, butyl acetate, ethyl propionate, β-ethoxyethyl acetate, methyl cellosolve acetate and the like), alcohols (e.g., isopropyl alcohol, n-butyl alcohol, secondary butyl alcohol and the like), ketones (e.g., methyl isobutyl ketone, methyl ethyl ketone, cyclohexanone and the like), amides (e.g., dimethylformamide, N-methylpyrrolidone and the like) and ethers (e. g., tetrahydrofuran, dioxane and the like) are desirably used, though not limited thereto.

The emulsification dispersion is carried out for preparing minute oil drops of oil phase, by dissolving a dye in a high boiling point organic solvent, or in its mixed solvent with a low boiling point organic solvent as occasion demands, and dispersing the resulting oil phase in a water phase mainly comprising water. In carrying out this, a surfactant, a wetting agent, a dye stabilizer, an emulsification stabilizer, an antiseptic, a fungicide and the like additive agents, which are described later, can be added to either one of the water phase and oil phase or both of them as occasion demands.

As the emulsification method, a method in which the oil phase is added to the water phase is general, but a so-called phase inversion emulsification method in which the water phase is added dropwise to the oil phase can also be used suitably. In this connection, the aforementioned emulsification method can be applied also to a case in which the azo dye to be used in the invention is water-soluble and the additive agent is oil soluble.

In carrying out the emulsification dispersion, various surfactants can be used. For example, a fatty acid salt, an alkyl sulfuric acid ester salt, an alkylbenzene sulfonate, an alkylnaphthalene sulfonate, a dialkyl sulfosuccinate, an alkyl phosphoric acid ester salt, a naphthalene sulfonate formalin condensate, a polyoxyethylene alkyl sulfuric acid ester salt and the like anionic surfactants, and a polyoxyethylene alkyl ether, a polyoxyethylene alkyl aryl ether, a polyoxyethylene fatty acid ester, a sorbitan fatty acid ester, a polyoxyethylene sorbitan fatty acid ester, a polyoxyethylene alkyl amine, a glycerol fatty acid ester, an oxyethylene oxypropylene block copolymer and the like nonionic surfactants are desirable. In addition, an acetylene system polyoxyethylene oxide surfactant, SURFYNOLS (mfd. by Air Products & Chemicals), is also used preferably. Also, an N,N-dimethyl-N-alkylamine oxide and the like amine oxide type ampholytic surfactants are desirable, too. In addition, those which are described as surfactants in JP-A-59-157,636 pages (37) to (38) and Research Disclosure No. 308119 (1989) can also be used.

In addition, for the purpose of effecting stabilization just after the emulsification, a water-soluble polymer can be added together with the aforementioned surfactant. As the water-soluble polymer, polyvinyl alcohol, polyvinyl pyrrolidone, polyethylene oxide, polyacrylic acid, polyacrylamide or a copolymer thereof is suitably used. In addition, the use of a polysaccharide, casein, gelatin or the like natural water-soluble polymer is also desirable. In addition, in order to stabilize the dye dispersion, it is also effective to jointly use polyvinyl, polyurethane, polyester, polyamide, polyurea, polycarbonate and the like obtained by polymerization of substantially aqueous medium-insoluble acrylic esters, methacrylic esters, vinyl esters, acrylamides, methacrylamides, olefins, styrenes, vinyl ethers, acrylonitriles and the like. It is desirable that these polymers contain $-SO_3^-$ or $-COO^-$. When these polymers which are substantially insoluble in aqueous media are jointly used, they are used in an amount of preferably 20 mass % or less, more preferably 10 mass % or less, based on the high boiling point organic solvent.

When a water-color ink is prepared by dispersing an oil soluble dye and a high boiling point organic solvent through their emulsification dispersion, control of the particle size is particularly important. In order to increase color purity and density when an image was formed by ink jet, it is essential to minimize average particle size. The volume average particle size is preferably 1 μm or less, more preferably from 5 to 100 nm.

Volume average particle size and particle size distribution of the aforementioned dispersion particles can be easily measured by conventionally known methods such as a static light scattering method, a dynamic light scattering method and a centrifugal precipitation method, as well as the method described in Jikken Kagaku Koza (Experimental Chemistry Course) 4th edition, pages 417 to 418. For example, these can be easily measured using a commercially available volume average particle size analyzer (e.g., Micro Track UPA (mfd. by Nikkiso)), by diluting the sample with distilled water to such a level that particle density in the ink becomes from 0.1 to 1 mass %. In addition, a dynamic light scattering method introduced with the laser Doppler effect is particularly desirable because of the ability to measure more smaller particle size.

The volume average particle size is an average particle size weighted with the particle volume, which is obtained by dividing the sum total of the results of multiplying diameter of individual particle by volume of the particle, by total particle volumes in the assembly of particles.

The volume average particle size is described in "Kobunshi Latex No Kagaku (Chemistry of Polymer Latex) (edited by S. Muroi, published by Kobunshi Kanko Kai)", page 119.

In addition, it has been revealed that the presence of bulky particles also takes a markedly important role in the printing performance. That is, it was found that when bulky particles cause clogging of head nozzle, or not clog but form stains, they interfere discharge of the ink or cause slippage of the discharge, and thereby exert serious influence on the printing performance. In order to prevent this, it is important to control a particle of 5 μm or more to 10 particles, and a particle of 1 μm or more to 1,000 particles, in 1 μl of ink when the ink is prepared.

As the method for removing these bulky particles, conventionally known centrifugation method, precision filtration method and the like can be used. These separation means may be carried out just after the emulsification dispersion, or just before filling in the ink cartridge after adding wetting agent, surfactant and the like various additive agents to the emulsification dispersion product.

A mechanical emulsification device can be used as an effective means for reducing average particle size and eliminating bulky particles.

As the emulsification device, a simple stirrer or impeller agitation system, an inline agitation system, a colloid mill or the like milling system, an ultrasonic system and the like conventionally known devices can be used, but the use of a high pressure homogenizer is particularly desirable.

Minute mechanism of the high pressure homogenizer is described in U.S. Pat. No. 4,533,254, JP-A-6-47264 and the like, and its commercially available devices include Gaulin homogenizer (A.P.V GAULIN INC.) Microfluidizer (MICROFLUIDEX INC.) Ultimizer (Sugino Machine) and the like.

In addition, a high pressure homogenizer equipped with a mechanism in which minute particles are formed in an ultra high pressure jet stream, as has been described recently in U.S. Pat. No. 5,720,551, is particularly effective for the emulsification dispersion of the invention. As an example of the high pressure homogenizer which uses an ultra high pressure jet stream, DeBEE 2000 (BEE INTERNATIONAL LTD.) can be cited.

The pressure in carrying out emulsification by a high pressure emulsification dispersion device is 50 MPa or more, preferably 60 MPa or more, more preferably 180 MPa or more.

A particularly desirable method is joint use of two or more emulsification devices, for example, by effecting emulsification using an agitation emulsifier and then passing the emulsion through a high pressure homogenizer. Also desirable is a method in which when emulsification dispersion is once effected using these emulsifiers, wetting agent, surfactant and the like additive agents are added thereto, and then the mixture is again passed through the high pressure homogenizer when the ink is filled in a cartridge.

When a low boiling point organic solvent is contained therein in addition to the high boiling point organic solvent, it is desirable to remove the low boiling point solvent from the viewpoint of stability and safe hygiene of the emulsion. As the method for removing the low boiling point solvent, various conventionally known methods can be used in response to the kind of solvent. That is, included therein are vaporization, vacuum vaporization, ultrafiltration and the like. It is desirable to carry out this low boiling point organic solvent-removing step just after the emulsification as quickly as possible.

In the ink composition obtained by the invention, various additive agents such as a drying preventing agent for preventing clogging in the ink injection opening caused by drying, a permeation accelerator for effecting more excellent permeation of ink into paper, an ultraviolet ray absorbent, an antioxidant, a viscosity adjusting agent, a surface tension adjusting agent, a dispersing agent, a dispersion stabilizer, a fungicide, a preservative, a pH adjusting agent, an antifoaming agent, a chelating agent and the like can be used in appropriate amounts by optionally selecting them.

As the drying preventing agent to be used in the invention, a water-soluble organic solvent having a vapor pressure of lower than water is desirable. Its illustrative examples include polyhydric alcohols typified by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerol, trimethylolpropane and the like, polyhydric alcohol lower alkyl ethers such as ethylene glycol monomethyl(or ethyl) ether, diethylene glycol monomethyl(or ethyl) ether, triethylene glycol monoethyl (or butyl) ether and the like, heterocyclics such as 2-pyrrolidine, N-methyl-2-pyrrolidone, 1,3-dimethyl-2-imidazolidinone, N-ethylmorpholine and the like, sulfur-containing compounds such as sulfolane, dimethyl sulfoxide, 3-sulfolane and the like, multifunctional compounds such as diacetone alcohol, diethanolamine and the like, and urea derivatives. Among them, glycerol, diethylene glycol and the like polyhydric alcohols are more desirable. In addition, the aforementioned drying preventing agents may be used alone or as a mixture of two or more. It is desirable that these drying preventing agents are contained in the ink in an amount of from 10 to 50 mass %.

As the permeation accelerator to be used in the invention, ethanol, isopropanol, butanol, di(tri)ethylene glycol monobutyl ether, 1,2-hexanediol and the like alcohols, sodium lauryl sulfate, sodium oleate, a nonionic surfactant and the like can be used. These exert sufficient effects when from 10 to 30 mass % of them are contained in the ink, and it is desirable to use them within such a range of adding amounts that they do not cause print bleeding or print through.

Examples of the ultraviolet ray absorbent which is used in the invention for improving shelf life of images include the benzotriazole system compounds described in JP-A-58-186677, JP-A-61-190537, JP-A-2-782, JP-A-5-197075, JP-A-9-34057 and the like, the benzophenone system compounds described in JP-A-46-2784, JP-A-5-194483, U.S. Pat. No. 3,214,463 and the like, the cinnamic acid system compounds described in JP-B-48-30492, JP-B-6-21141, JP-A-10-88106 and the like, the triazine system compounds described in JP-A-4-298503, JP-A-8-53427, JP-A-8-239368, JP-A-10-182621, JP-T-8-501291 and the like, the compounds described in Research Disclosure No. 24239, and the compounds which generate fluorescence by absorbing ultraviolet ray, so-called fluorescent whitening agents, typified by stilbene system and benzoxazole system compounds.

As the antioxidant to be used in the invention for improving shelf life of images, various organic system and metal complex system fading preventing agents can be used. Examples of the organic fading preventing agent include hydroquinones, alkoxyphenols, dialkoxyphenols, phenols, anilines, amines, indanes, chromans, alkoxyanilines, heterocyclics and the like, and examples of the metal complex include a nickel complex, a zinc complex and the like. More illustratively, the compounds described in the patent references cited in Research Disclosure No. 17643, VII-I and J, Research Disclosure No. 15162, Research Disclosure No. 18716, page 650, left column, Research Disclosure No. 36544, page 527, Research Disclosure No. 307105, page 872, and Research Disclosure No. 15162, and the compounds included in formulae of typical compounds and examples of compounds described in JP-A-62-215272, pages 127 to 137, can be used.

From the viewpoint of preventing corrosion, it is desirable that the ink of the invention contains an antiseptic in the ink.

According to the invention, the antiseptic means a substance which has a function to prevent generation and growth of microorganisms, particularly bacteria and fungi (to be also called fungicide).

The following substances can be effectively used as the antiseptics useful in the invention.

As inorganic system antiseptics, heavy metal ion-containing substances (copper ion-containing substances, copper complex compounds and the like) and salts thereof can be firstly exemplified. Examples of various substances which can be used as organic system antiseptics include quaternary ammonium salts (tetrabutylammonium chloride, diisopropylammonium nitrite, cetylpyridinium chloride, dicyclohexylammonium nitrite, benzyltrimethylammonium chloride and the like), phenol derivatives (phenol, cresol, butylphenol, xylenol, bisphenol and the like), phenoxy ether derivatives (phenoxyethanol and the like), heterocyclic compounds (benzotriazole, PROXEL, 1,2-benzoisothiazoline-3-one and the like), acid amides, carbamic acid, carbamates, amidines and guanidines, pyridines (sodium pyridinethion-1-oxide and the like), diazines, triazines, pyrroles and imidazoles, oxazoles and oxazines, pentaerythritol tetranitrate, benzotriazoles, thiazoles and thiadiazines, thioureas, thiosemicarbazides, dithiocarbamates, sulfides, sulfoxides, sulfones, sulfamides, antibiotics (penicillin, tetracycline and the like), sodium dihydroacetate, sodium benzoate, p-hydroxybenzoic acid ethyl ester, acid sulfite, sodium thiosulfate, ammonium thioglycolate, 1,2-benzoisothiazoline-3-one and salts thereof. Also useful as the antiseptics include those which are described in Bokin Bobai Handbook (Bactericides Fungicides Handbook) (published by Gihodo: 1986), Bokin Bobaizai Jiten (edited by the Dictionary Editorial Committee, The Research Society for Antibacterial and Antifungal Agents, Japan) and the like.

Though various substances having an oil-soluble structure, a water-soluble structure and the like can be used as these compounds, preferred are water-soluble compounds. PROXEL and benzotriazole can be particularly preferably used.

Particularly according to the invention, when two or more of these antiseptics are used in combination, discharge stability during continuous use of the ink for a prolonged period of time is sharply improved so that the effects of the invention are exerted further suitably. When two or more of them are used in combination, it is desirable that species of the antiseptics have different chemical structure nuclei. In addition, when two or more antiseptics are contained, it is desirable that at least one antiseptic is a heterocyclic compound. For example, a combination of heterocyclic compound with an antibiotic, a combination of a heterocyclic compound with a phenol derivative and the like can be suitably cited. When two antiseptics are used in combination, their containing ratio is not particularly limited, but a range of antiseptic A/antiseptic B=0.01 to 100 (mass ratio) is desirable.

The antiseptics can be used within a broad range of adding amounts, which is from 0.01 to 10 mass %, preferably from 0.02 to 5.00 mass %, more preferably from 0.1 to 5 mass %.

The pH adjusting agent to be used in the invention can be suitably used in view of the pH adjustment, provision of dispersion stability and the like, and it is desirable that pH of the ink at 25° C. is adjusted a value of from 4 to 11. When the pH is less than 4, the nozzle is apt to cause clogging due to reduction of solubility of the dye, while the water resistance is apt to decrease when it exceeds 11. As the pH adjusting agent, an organic base, an inorganic alkali and the like can be exemplified as basic agents, and an organic acid, an inorganic acid and the like as acidic agents.

As the aforementioned organic base, triethanolamine, diethanolamine, N-methyldiethanolamine, dimethylethanolamine and the like can be exemplified. As the aforementioned inorganic alkali, an alkali metal hydroxide (e.g., sodium hydroxide, lithium hydroxide, potassium hydroxide or the like) or carbonate (e.g., sodium carbonate, sodium bicarbonate or the like), ammonium and the like can be exemplified. Also, as the aforementioned organic acid, acetic acid, propionic acid, trifluoroacetic acid, an alkylsulfonic acid and the like can be exemplified. As the aforementioned inorganic acid, hydrochloric acid, sulfuric acid, phosphoric acid and the like can be exemplified.

According to the ink composition production method of the invention which comprises dissolving and/or dispersing at least one species of dye represented by the aforementioned formula (1) or (2) in a medium, its stabilization is effectively achieved at least by a step of applying ultrasonic vibration so that the discharge stability and hue are improved.

In addition, according to the invention, a production method in which bubbles are removed by applying an ultrasonic energy equal to or larger than the energy received at the recording head, in advance to ink production process, is desirable in order to prevent generation of bubbles in the ink by the pressure added at the recording head.

The ultrasonic vibration is an ultrasonic wave of generally 20 kHz or more, preferably 40 kHz or more, more preferably 50 kHz, as the number of vibration. Also, the energy applied by the ultrasonic vibration to the liquid is generally $2 \times 10^7$ $J/m^3$ or more, preferably $5 \times 10^7$ $J/m^3$ or more, more preferably $1 \times 10^8$ $J/m^3$ or more. In addition, the ultrasonic vibration applying period of time is generally from about 10 minutes to 1 hour.

The step for applying ultrasonic vibration shows its effect at any time after charging of the dye into the medium. The effect can also be obtained when the ink after its completion is once preserved, and then ultrasonic vibration is applied thereto. However, it is desirable to apply the ultrasonic vibration when the dye is dissolved and/or dispersed in the medium, because the bubble removing effect becomes more high, and also, dissolution and/or dispersion of the pigment in the medium is accelerated by the ultrasonic vibration.

That is, the aforementioned step for at least applying ultrasonic vibration can be carried out either during the step for dissolving and/or dispersing the dye in the medium or after the step. In other words, the aforementioned step for at least applying ultrasonic vibration can be carried out optionally once or more after preparation of the ink until it becomes a product.

According to the invention, it is desirable that the step for dissolving and/or dispersing a dye in a medium has a step for dissolving the aforementioned dye in a part of the whole medium and a step for mixing the remaining medium, it is more desirable that ultrasonic vibration is applied to at least one of the aforementioned steps, and it is further desirable that at least ultrasonic vibration is applied to the step for dissolving the dye in a part of the whole medium.

The aforementioned step for mixing the remaining medium may be a single step or two or more steps.

In addition, joint use of a heat degassing or vacuum degassing in the ink production by the invention is desirable, because it increases the effect to remove bubbles in the ink. It is desirable to carry out the heat degassing step or vacuum degassing step simultaneously with the step for mixing the remaining medium or thereafter.

As the means for generating ultrasonic vibration in the step for applying ultrasonic vibration, an ultrasonic dispersion machine and the like conventionally known devices can be exemplified.

According to the invention, water or an aqueous medium as the mixed solvent of water and a water-soluble organic solvent is desirable as the medium.

When the ink concerned in the invention is prepared, a step for removing solid contaminants by filtration is important for improving stability of the ink and improving the hue. A filtration filter is used in this operation, and as the filtration filter of this case, a filter having an effective pore size of 1 μm or less, preferably 0.3 μm or less and 0.05 μm or more, particularly preferably 0.3 μm or less and 0.25 μm or more, is used. Regarding material of the filter, various substances can be used, but particularly in the case of an ink of water-soluble dye, it is desirable to use a filter prepared for use in water system solvents. It is particularly desirable to use a jacket type filter prepared using a polymer material which hardly produces contaminants. Regarding the filtering method, the ink maybe passed through the jacket by liquid feeding, and both methods of compression filtration and vacuum filtration can also be used.

In addition, air is incorporated into the solution after the filtration in many cases. Since the bubbles due to this air also become the cause of image disorders in ink jet recording in many cases, a defoaming step is separately arranged in the invention. As the defoaming method, an ultrasonic defoaming, a vacuum defoaming and the like various methods can be used.

In order to prevent mingling with contaminants at the time of operations, it is desirable to carry out these operations making use of a space such as a clean room or a clean bench. According to the invention, these operations are carried out particularly in a space of Class 100 or less as the cleanliness factor.

It is desirable that viscosity of the ink of the invention is from 1 to 30 mPa·s at 25° C. It is more preferably from 2 to 15 mPa·s, particularly preferably from 2 to 10 mPa·s. When it exceeds 30 mPa·s, fixing rate of recording image becomes slow, and the discharge performance is also reduced. When less than 1 mPa·s, appearance quality is reduced due to bleeding of the recording image.

The viscosity can be optionally adjusted with the adding amount of an ink solvent. Examples of the ink solvent include glycerol, diethylene glycol, triethanolamine, 2-pyrrolidone, diethylene glycol monobutyl ether, triethylene glycol monobutyl ether and the like.

The viscosity measuring method is minutely described in JIS Z 8803, but it can be conveniently measured by a commercially available viscometer. For example, its rotational type includes type B viscometer and type E viscometer manufactured by Tokyo Keiki. In the invention, this was measured at 25° C. using an-oscillating type viscometer model VM-100A-L manufactured by Yamaichi Denki. Unit of the viscosity is pascal second (Pa·s), but milli-pascal second (mPa·s) is generally used.

It is desirable that the ink composition to be used in the invention has a static surface tension of from 25 to 50 mN/m at 25° C. It is more desirable that the static surface tension at 25° C. is from 30 to 40 mN/m. When the static surface tension of ink exceeds 50 mN/m, printing qualities are considerably reduced, such as reduction of discharge stability, generation of bleeding at the time of color mixing, generation of whiskers(e.g., when a black letter is printed on a cyan solid, a string-like bleeding is generated from the black letter) and the like. Also, when the static surface tension of ink is less than 25 mN/m, adhesion of ink to the hardware surface occurs at the time of discharge, thus sometimes causing poor printing.

As the static surface tension measuring method, a capillary tube ascending method, a dropping method, a suspension lug method and the like are known, but a vertical plate method is used in the invention as the static surface tension measuring method.

When a glass or platinum thin plate is vertically suspended in a liquid by partially soaking therein, a downward surface tension occurs in a region where the liquid face contacts with the plate. This surface tension can be measured by balancing with the upward force suspending the plate.

The dynamic surface tension of the ink to be used in the invention is preferably from 25 to 50 mN/m, more preferably from 30 to 40 mN/m, at 25° C. When the dynamic surface tension of ink exceeds 50 mN/m, printing qualities are considerably reduced, such as reduction of discharge stability, generation of bleeding at the time of color mixing, generation of whiskers and the like. Also, when it is less than 25 mN/m, adhesion of ink to the hardware surface occurs at the time of discharge, thus sometimes causing poor printing.

Regarding the dynamic surface tension measuring method, an oscillation jet method, a meniscus dropping method, a maximum bubble pressure method and the like are known as described, for example, in "Shin Jikken Kagaku Koza (New Experimental Chemistry Course), volume 18, Kaimen to Koroido (Surface and Colloid)" [published by Maruzen, pp. 69-90 (1977)], and a liquid film destruction method is also known as described in JP-A-3-2064, but in the invention, a bubble pressure differential pressure method is used as the dynamic surface tension measuring method. Its measuring principle and method are described in the following.

When a solution prepared by adding a surfactant is stirred and homogenized, and bubbles are formed in the solution, a new gas-liquid interface is formed and the surfactant molecules in the solution are gathered on the water surface at a constant rate. When the bubble rate (forming rate of bubbles) is changed, the surfactant molecules are gathered on the bubble surface more frequently as the forming rate becomes slow, so that the maximum bubble pressure just before the burst of bubbles, and the maximum bubble pressure based on the bubble rate (surface tension) can therefore be detected. In the dynamic surface tension measurement of the invention, bubbles are formed in the solution using large and small two probes, and the dynamic surface tension is calculated by measuring differential pressure under the maximum bubble pressure states of the two probes.

Adjustment of the static surface tension and dynamic surface tension can be carried out by the use of a surface tension adjusting agent, and these can be adjusted within the aforementioned ranges.

As the surface tension adjusting agent, a nonionic, cationic or anionic surfactant can be exemplified. For example, a fatty acid salt, an alkyl sulfate ester salt, an alkylaryl sulfonate salt (e.g., alkylbenzene sulfonate salt, petroleum sulfonate salt or the like), a dialkyl sulfosuccinate salt, an alkyl phosphate ester salt, a naphthalene sulfonate formalin condensate, a polyoxyethylene alkyl sulfate ester salt and the like can be cited as the anionic surfactant, and an acetylene system diol (e.g., 2,4,7,9-tetramethyl-5-decyne-4,7-diol or the like), a polyoxyethylene alkyl ether (e.g., polyoxyethylene decyl ether, an ethylene oxide addition product of an acetylene system diol or the like), a polyoxyethylene fatty acid ester, a sorbitan fatty acid ester, a polyoxyethylene sorbitan fatty acid ester, a polyoxyethylene alkyl amine, a glycerol fatty acid ester, an oxyethylene oxypropylene block copolymer and the like can be cited as the nonionic surfactant. Among them, the aforementioned nonionic surfactants represented by formula (I), (II) or (III), particularly the nonionic surfactants represented by formula (II) or (III), are also suitable as the surface tension adjusting agents for the purpose of adjusting static surface tension and dynamic surface tension.

In addition, an amine oxide type ampholytic surfactant such as N,N-dimethyl-N-alkylamine oxide or the like is also desirable. Also can be used are those which are described as surfactants in JP-A-59-157,636, pages (37) and (38) and in Research Disclosure No. 308118 (1989).

From the viewpoint of hardly causing precipitation and separation from the ink and less foaming ability, an anionic surfactant in which the hydrophobic region is double-stranded or the hydrophobic region is branched, an anionic or nonionic surfactant which has a hydrophilic group at around the center of a hydrophobic region, and a nonionic surfactant in which the hydrophobic region is double-stranded or the hydrophobic region is branched (a nonionic surfactant represented by formula (II) or (III) is its example) are desirable.

The surfactant-containing amount for this purpose is from 0.001 to 15 mass %, preferably from 0.005 to 10 mass %, more preferably from 0.01 to 5 mass %, based on the ink.

It is desirable that the ink of the invention has a conductivity of within the range of from 0.01 to 10 S/m when measured at 25° C. The conductivity is particularly preferably within the range of from 0.05 to 5 S/m.

Regarding the conductivity measuring method, it can be measured by a commercially available electrode method which uses saturated potassium chloride.

It is possible to control the conductivity mainly by ion concentration in a water system solution. When concentration of a salt is high, it can be desalted using an ultrafiltration membrane or the like. In addition, when the conductivity is adjusted by adding a salt or the like, it can be adjusted by adding various organic salt or inorganic salt.

Useful as the inorganic salt includes a potassium halide, a sodium halide, sodium sulfate, potassium sulfate, sodium hydrogensulfate, potassium hydrogensulfate, sodium nitrate, potassium nitrate, sodium bicarbonate, potassium bicarbonate, sodium phosphate, disodium hydrogenphosphate, boric acid, potassium dihydrogenphosphate, sodium dihydrogenphosphate and the like inorganic compounds, and sodium acetate, potassium acetate, potassium tartarate, sodium tartarate, sodium benzoate, potassium benzoate, sodium p-toluenesulfonate, potassium saccharinate, potassium phthalate, sodium picolinate and the like organic compounds.

In addition, the conductivity can also be adjusted by selecting aqueous medium components which are described later.

It is desirable that, in the ink of the invention, the rate of change of viscosity at 10° C. based on viscosity at 25° C. is 250% or less, and the rate of change of surface tension at 10° C. based on surface tension at 25° C. is 130% or less. When the rate of change of viscosity exceeds 250% or the rate of change of surface tension exceeds 130%, the discharge stability is considerably reduced. In order to obtain stable discharge performance under various environments, it is very important that changes in physical properties are as small as possible. Particularly, viscosity and surface tension must be controlled strictly.

The rate of change of viscosity at 10° C. based on viscosity at 25° C. is more preferably 200% or less, further preferably 190% or less, and the rate of change of surface tension at 10° C. based on surface tension at 25° C. is more preferably 125% or less, further preferably 120% or less.

The rate of change of viscosity at 10° C. based on viscosity at 25° C. and the rate of change of surface tension at 10° C. based on surface tension at 25° C. are calculated using the following formulae.

Rate of change of viscosity at 10° C. based on viscosity at 25° C. (%)=viscosity at 10° C./viscosity at 25° C.×100(%)

Rate of change of surface tension at 10° C. based on surface tension at 25° C. (%)=surface tension at 10° C./surface tension at 25° C.×100(%)

When an ink for ink jet recording use containing the magenta dye of the invention and having the aforementioned composition and ink physical properties is used, bleeding of the resulting image is also controlled at a low level. According to a typical embodiment of the invention, bleeding on an image receiving material having an image receiving layer containing white inorganic pigment particles is at such a level that it cannot be detected visually by the least distance of distinct vision. In addition, bleeding on an image receiving material having a gelatin-containing hardening layer as the image recording layer is also at such a level that it cannot be detected visually by the least distance of distinct vision. Even when preserved at particularly high humidity and high temperature, images drawn by the magenta ink of the invention have excellent bleeding resistance.

In addition to the properties of the dye, various factors are concerned in the cause of bleeding, such as the content and kind of glycerol, diethylene glycol, triethylene glycol monobutyl ether or the like auxiliary solvent added for adjusting physical properties and preventing drying of the ink, amount of the residual solvent, image structure, overlapping condition of second colors (red and blue) and the like. In order to improve bleeding by the ink formulation, reduction of the amount of auxiliary solvent and optimization of surface tension of the ink (from 30 to 37 mN/m, preferably from 30 to 35 mN/m) are effective, in addition to the selection of dye.

Though the degree of bleeding varies depending on the image receiving paper, the ink of the invention is also characterized in that it does not cause bleeding when kind of the image receiving paper is changed. In order to improve bleeding by ink formulation designing, it is desirable to use a solvent having low solubility of the dye. In the case of a dye represented by formula (1) or (2), it is desirable to use, for example, glycerol or PFG (propylene glycol monopropyl ether). Another method for improving bleeding is to reinforce mordanting strength, and to introduce an anchor compound for mordanting. Illustratively, interaction between a mordant and a dye is strengthened by the use of a betaine compound.

In this connection, preparation methods of inks for ink jet recording use are illustratively described in JP-A-5-148436, JP-A-5-295312, JP-A-7-97541, JP-A-7-82515 and JP-A-7-118584, and these can be applied to the preparation of the ink of the invention for ink jet recording use.

The recording paper and recording film on which images are drawn with the ink of the invention is described. Examples of those which can be used in the invention include conventionally known materials to be recorded thereon, namely ordinary paper, resin coat paper, paper for ink jet use describe for example in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597, JP-A-10-337947 and the like, film, electrophotography shared paper, cloth, glass, metal, pottery and the like.

The recording paper and recording film to be used in carrying out ink jet printing using the ink of the invention are described in the following. The base material of recording paper and recording film consists of LBKP, NBKP or the like chemical pulp, GP, PGW, RMP, TMP, CTMP, CMP, CGP or the like mechanical pulp, DIP or the like waste paper pulp and the like, and those which are produced using a Fourdrinier paper machine, a cylinder paper machine and the like various devices, after mixing with conventionally known pigment, binder, sizing agent, fixing agent, cationic agent, paper strength reinforcing agent and the like additive agent as occasion demands, can be used. In addition to these base materials, the base material may be a synthetic paper or a plastic film sheet, and it is desirable that thickness of the base material is from 10 to 250 μm, and its basic weight is from 10 to 250 g/m².

An image receiving layer and a back coat layer may be directly arranged on the base material and used as the image receiving material of the ink of the invention, or after arranging a size press or anchor coat layer, an image receiving layer and a back coat layer may be arranged thereon and used as the image receiving material. In addition, a flattening treatment may be applied to the base material using a machine calender, a TG calender, a soft calender or the like calender device.

As the base material according to the invention, a sheet of paper in which its both sides are laminated with a polyolefin (e.g., polyethylene, polystyrene, polybutene or a copolymer thereof) or polyethylene terephthalate and a sheet of plastic film are desirably used. It is desirable to add a white pigment (e.g., titanium oxide, zinc oxide or the like) or a salting dye (e.g., cobalt blue, ultramarine blue, neodymium oxide or the like) to the polyolefin.

The image receiving layer to be arranged on the base material is described. The image receiving layer comprises a porous material and a water base binder. In addition, it is desirable that a pigment is contained in the image receiving layer, and a white pigment is desirable as the pigment. Examples of the pigment include calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, zinc carbonate and the like inorganic white pigments and a styrene system pigment, an acryl system pigment, a urea resin, a melamine resin and the like organic pigments. Particularly preferred are porous white inorganic pigments, and a synthetic amorphous silica or the like having large pore area is particularly desirable. As the synthetic amorphous silica, both of the silicic anhydride obtained by a dry production method (vapor phase method) and hydrous silicic acid obtained by a wet production method can be used.

As the recording paper containing the aforementioned pigment in its image receiving layer, illustratively, those which are disclosed in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777, JP-A-2001-301314 and the like can be used.

Examples of the water base binder to be contained in the image receiving layer include polyvinyl alcohol, silanol-modified polyvinyl alcohol, starch, cationized starch, casein, gelatin, carboxymethylcellulose, hydroxyethylcellulose, polyvinyl pyrrolidone, polyalkylene oxide, a polyalkylene oxide derivative and the like water-soluble polymers, and styrene butadiene latex, acryl emulsion and the like water-dispersible polymers. These water base binders can be used alone or as a mixture of two or more. According to the invention, polyvinyl alcohol and silanol-modified polyvinyl alcohol are particularly suitable among them, from the viewpoint of their adhesion to pigments and peeling resistance of the ink receiving layer.

In addition to the pigment and water base binder, the image receiving layer can contain other additive agents such as a mordant, a water resistance-providing agent, a light fastness improving agent, a gas proof improving agent, a surfactant and a hardening agent.

It is desirable that the mordant to beaded to the image receiving layer is immobilized. For this purpose, a polymer mordant is desirably used from the viewpoint of preventing bleeding.

Regarding the polymer mordant, there are descriptions in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, U.S. Pat. No. 2,484,430, U.S. Pat. No. 2,548,564, U.S. Pat. No. 3,148,061, U.S. Pat. No. 3,309,690, U.S. Pat. No. 4,115,124, U.S. Pat. No. 4,124,386, U.S. Pat. No. 4,193,800, U.S. Pat. No. 4,273,853, U.S. Pat. No. 4,282,305 and U.S. Pat. No. 4,450,224. An image receiving material containing the polymer mordant described in JP-A-1-161236, pages 212 to 215, is particularly desirable. when the polymer mordant described in this official gazette is used, an image which does not cause bleeding and has excellent image quality can be obtained, and light fastness of images is improved.

The water resistance-providing agent is effective in providing images with water resistance, and a cationic resin is particularly desirable as the water resistance-providing agent. Examples of such a cationic resin include polyamide polyamine epichlorohydrin, polyethyleneimine, polyamine-sulfone, dimethyldiarylammonium chloride polymer, cationic polyacrylamide and the like. The content of these cationic resins is preferably from 1 to 15 mass %, particularly preferably from 3 to 10 mass %, based on the total solids of the ink receiving layer.

Examples of the light fastness improving agent and gas proof improving agent include a phenol compound, a hindered phenol compound, a thioether compound, a thiourea compound, a thiocyanic acid compound, an amine compound, a hindered amine compound, a TEMPO compound, a hydrazine compound, a hydrazide compound, an amidine compound, a vinyl group-containing compound, an ester compound, an amide compound, an ether compound, an alcohol compound, a sulfinic acid compound, saccharides, a water-soluble reducing compound, an organic acid, an inorganic acid, a hydroxy group-containing compound, a benzotriazole compound, a benzophenone compound, a triazine compound, a heterocyclic compound, a water-soluble metal salt, an organometallic compound, a metal complex and the like.

Illustrative examples of these compounds include those which are described in JP-A-10-182621, JP-A-2-1-260519, JP-A-2000-260519, JP-B-4-34953, JP-B-4-34513, JP-B-4-34512, JP-A-11-170686, JP-A-60-67190, JP-A-7-276808, JP-A-2000-94829, JP-T-8-512258, JP-A-11-321090 and the like.

The surfactant functions as an application auxiliary, a peeling ability improving agent, a slipping ability improving agent or an antistatic agent. Regarding the surfactant, there are descriptions in JP-A-62-173467 and JP-A-62-183457.

An organic fluoro compound may be used instead of the surfactant. It is desirable that the organic fluoro compound is hydrophobic. Examples of the organic fluoro compound include a fluorine system surfactant, an oily fluorine system compound (e.g., fluorine oil) and a solid fluorine compound resin (e.g., ethylene tetrafluoride resin). Regarding the organic fluoro compound, there are descriptions in JP-B-57-9053 (8th to 17th columns), JP-A-61-20994 and JP-A-62-135826.

As the hardening agent, the materials described in JP-A-1-161236, page 222, JP-A-9-263036, JP-A-10-119423 and JP-A-2001-310547 can be used.

Examples of other additive agents to be added to the image receiving layer include a pigment dispersant, a thickener, an antifoaming agent, a dye, a fluorescent whitening agent, an antiseptic, a pH adjusting agent, a mat agent, a hardening agent and the like. In this connection, the ink receiving layer may be a single layer or a double layer.

A back coat layer can be arranged on the recording paper and recording film, and a white pigment, a water base binder and other components can be exemplified as the components which can be added to this layer.

Examples of the white pigment to be contained in the back coal layer include precipitated calcium carbonate light, calcium carbonate heavy, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrated halloysite, magnesium carbonate, magnesium hydroxide and the like white inorganic pigments and a styrene system plastic pigment, an acryl system plastic pigment, polyethylene, microcapsule, a urea resin, a melamine resin and the like organic pigments.

Examples of the water base binder to be contained in the back coat layer include styrene/maleate copolymer, styrene/acrylate copolymer, polyvinyl alcohol, silanol-modified polyvinyl alcohol, starch, cationized starch, casein, gelatin, carboxymethylcellulose, hydroxyethylcellulose, polyvinyl and the like water-soluble polymers, and styrene butadiene latex, acryl emulsion and the like water-dispersible polymers. As other components to be contained in the back coat layer, an antifoaming agent, a foam suppressor, a dye, a fluorescent whitening agent, an antiseptic, a water resistance-providing agent and the like can be cited.

A polymer fine particle dispersion may beaded to the composing layer (back layer) of the ink jet recording paper and recording film. The polymer fine particle dispersion is used for the purpose of improving physical properties of film, such as improvement of dimensional stability, prevention of curling, prevention of adhesion and prevention of cracking of film. Regarding the polymer fine particle dispersion, there are descriptions in JP-A-62-245258, JP-A-62-1316648 and JP-A-62-110066. When a polymer fine particle dispersion having a low glass transition temperature (of 40° C. or less) is added to a layer containing a mordant, cracking and curling of the layer can be prevented. In addition, the curling can also be prevented when a polymer fine particle dispersion having a high glass transition temperature is added to the back layer.

The ink jet recording system to be applied to the ink of the invention has no particular limitation, and can be used in conventionally known systems such as a charge control system in which ink is discharged making use of electrostatic attraction force, a drop-on-demand system (pressure pulse system) which uses vibration pressure of piezo-element, an acoustic ink jet system in which ink is discharged making use of radiation pressure by converting an electric signal into an acoustic beam and applying it to the ink, and a thermal ink jet (bubble jet) system which uses a pressure generated by the formation of bubbles through heating of the ink.

Also included in the ink jet recording system are a system in which a low density ink, so-called photo ink, is ejected as a large number of small volume droplets, a system in which the image quality is improved using two or more inks having substantially the same hue but different densities, and a system which uses a colorless and transparent ink.

EXAMPLES

The following illustratively describes the invention based on examples, but the invention is not limited to these examples.

The following components were added to 3.5 g of the following magenta dye [M-1], and the mixture was adjusted to 100 g by adding deionized water and then mixed by stirring for 1 hour while heating at from 30 to 40° C. Thereafter, an ink 1 was prepared by filtering this under a reduced pressure through a microfilter having an average pore size of 0.25 μm.

Ink 1:

| | |
|---|---|
| Dye M-1 | 3.5 g |
| Urea | 2.4 g |
| Triethylene glycol | 1.9 g |
| Triethylene glycol monobutyl ether | 10.4 g |
| 1,2-Hexanediol | 1.2 g |
| 2-Pyrrolidone | 1.1 g |
| Glycerol | 10.2 g |
| Triethanolamine | 0.2 g |
| PROXEL XL II | 1.0 g |
| Additive agent 1 | 1.8 g |

Deionized water was added to the above components to adjust the total amount ot 100 g.

Deionized water was added to the above components to adjust the total amount to 100 g.

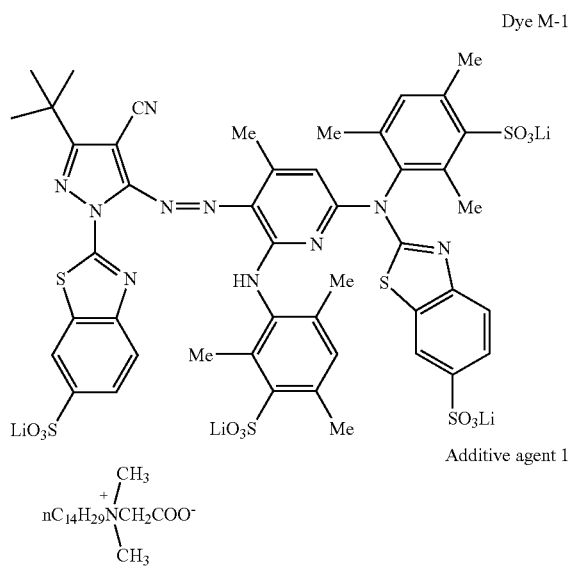

Ink 2:

An ink 2 was prepared in the same manner as the case of the aforementioned ink 1 using the same formulation of the ink 1, except that glycerol was changed to 2,2'-thiodiethanol.

Ink 3:

An ink 3 was prepared in the same manner as the case of the aforementioned ink 1 using the same formulation of the ink 1, except that triethylene glycol monobutyl ether was changed to 2,2'-thiodiethanol.

Ink 4:

An ink 4 was prepared in the same manner as the case of the aforementioned ink 2 using the same formulation of the ink 2, except that the dye M-1 was changed to the following dye M-2.

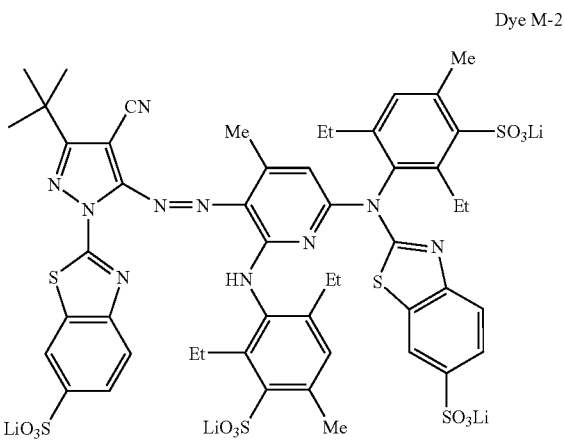

Ink 5:

An ink 5 was prepared in the same manner as the case of the aforementioned ink 3 using the same formulation of the ink 3, except that the dye M-1 was changed to the dye M-2.

Ink 6:

An ink 6 was prepared in the same manner as the case of the aforementioned ink 1 using the same formulation of the ink 1, except that triethylene glycol monobutyl ether was changed to dimethyl sulfoxide.

Ink 7:

An ink 7 was prepared in the same manner as the case of the aforementioned ink 1 using the same formulation of the ink 1, except that all of the components other than deionized water, dye M-1, PROXEL XL II and additive agent 1 were changed to 2,2'-thiodiethanol.

Ink 8:

An ink 8 was prepared in the same manner as the case of the aforementioned ink 1 using the same formulation of the ink 1, except that triethylene glycol monobutyl ether and glycerol were changed to 2,2'-thiodiethanol.

Ink 9:

An ink 9 was prepared in the same manner as the case of the aforementioned ink 1 using the same formulation of the ink 1, except that 2-pyrrolidone was changed to dimethyl sulfoxide.

Each of the thus obtained inks was filled in a magenta ink cartridge of an ink jet printer PM-A 700(mfd. by EPSON). In this case, steps for the dissolution of dye to the ink loading were carried out using a clean bench under a space of a cleanliness factor of 1,000 or less.

The PM-A 700 printer was loaded with the thus prepared ink cartridge, and an image was printed with the magenta ink alone on a gloss-finished ink jet paper "Gasai" manufactured by Fuji Photo Film.

An examination was made on the ozone ($O_3$) resistance of the thus obtained image. Illustratively, the aforementioned photo gloss paper on which an image was formed was allowed to stand for 3 days in a box wherein the ozone gas concentration was ser to 5.0 ppm, and the image densities before and after the standing in the ozone gas were measured using a reflection densitometer (X-Rite 310 TR) and evaluated as the residual ratio of the color. In this connection, the aforementioned reflection density was measured at three points of 1, 1.5 and 2.0. The ozone gas concentration in the box was set using an ozone gas monitor (model: OZG-EM-01) manufactured by APPLICS. The results were evaluated based on the three steps of case A in which the residual ratio of,color was 90% or more at each density, case B in which the 1 or 2 points were less than 90%, and case C in which it was less than 90% at all densities. The thus obtained results are shown in the following table. The item "change of half breadth center" means changes in the wavelength of the center of half breadth of the reflection spectrum of the part of reflection density 1.0, before and after the ozone treatment.

Regarding the discharge stability, discharging conditions of the ink from all nozzles were verified by setting the cartridge into the printer, and then the image was output on 20 sheets of A4 size paper and evaluated based on the following criteria.

A: Disorder of printed image is not present from the commencement to completion of the printing B: Generation of an output having disorder of printed image C: Disorder of printed image is present from the commencement to completion of the printing

TABLE 19

| Examples | Ozone resistance | Change of half breadth center | Discharge stability |
|---|---|---|---|
| Ink 1 (comparative) | C | Extended wave length by 5 nm | A |
| Ink 2 (inventive) | B | No change | A |
| Ink 3 (inventive) | B | No change | A |
| Ink 4 (inventive) | A | No change | A |
| Ink 5 (inventive) | A | No change | A |
| Ink 6 (inventive) | B | No change | A |
| Ink 7 (comparative) | B | No change | B |
| Ink 8 (inventive) | B | No change | A |
| Ink 9 (comparative) | C | Extended wave length by 4 nm | A |

According to the invention, since components of the dye and water-soluble organic solvent to be used were specified, an ink composition which is excellent in weather resistance, because degradation of the dye due to active gasses (ozone and the like) in the environment is inhibited, and does not generate changes in hue at the time of fading, and a recording method which uses the same are provided.

The entire disclosure of each and every foreign patent application from which the benefit of foreign priority has been claimed in the present application is incorporated herein by reference, as if fully set forth.

What is claimed is:

1. An ink composition which comprises:
a compound represented by formula (1); and
a plurality of water-soluble organic solvents,
wherein the water-soluble organic solvents contains at least a water-soluble organic solvent having a thioether or sulfoxide moiety in an amount of 10 mass % to 80 mass %:

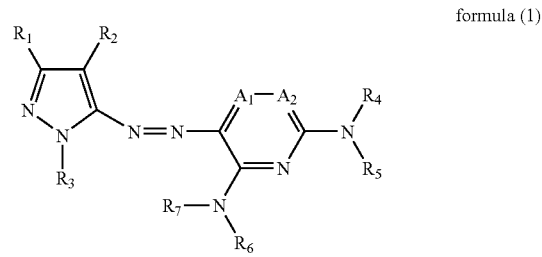

formula (1)

in formula (1), $R_1$ represents hydrogen atom, alkyl group, cycloalkyl group, aralkyl group, aryl group, heterocyclic group or acyl group, wherein each substituent group may be further substituted;

$R_2$ represents hydrogen atom, halogen atom or cyano group;

$R_3$ represents hydrogen atom, alkyl group, cycloalkyl group, aralkyl group, alkenyl group, aryl group, heterocyclic group, carboxyl group or sulfo group, wherein each substituent group may be further substituted;

$R_4$, $R_5$, $R_6$ and $R_7$ each independently represents hydrogen atom; alkyl group, cycloalkyl group, aralkyl group, alkenyl group, aryl group, heterocyclic group, sulfonyl group, acyl group, carboxyl group, sulfo group or carbamoyl group, wherein each substituent group may be further substituted, with the proviso that $R_4$ and $R_5$ are not hydrogen atoms at the same time, and $R_6$ and $R_7$ are not hydrogen atoms at the same time; and both of $A_1$ and $A_2$ are carbon atoms which may be substituted, or one of them is a carbon atom which may be substituted and the other is a nitrogen atom.

2. An ink composition which comprises:
a compound which is represented by formula (2) and has at least one ionic hydrophilic group; and
a plurality of water-soluble organic solvents,
wherein the water-soluble organic solvents contains at least a water-soluble organic solvent having a thioether or sulfoxide moiety in an amount of 10 mass % to 80 mass %:

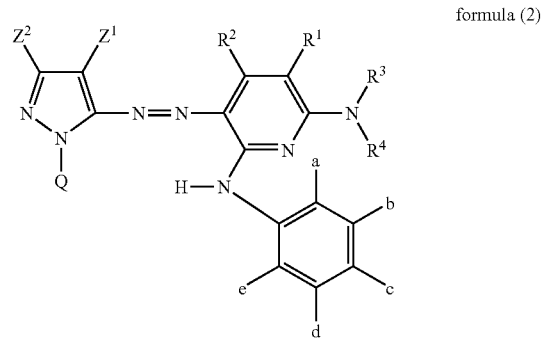

formula (2)

in formula (2), $R^1$ and $R^2$ each independently represents hydrogen atom, halogen atom, aliphatic group, aryl group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic ring oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group, wherein $R^1$ and $R^2$ may be bonded together to form a 5- or 6-membered ring;

$R^3$ and $R^4$ each independently represents hydrogen atom, aliphatic group, aryl group, heterocyclic group, acyl group, alkoxycarbonyl group, aryloxycarbonyl group, carbamoyl group, alkylsulfonyl group, arylsulfonyl group or sulfamoyl group, wherein $R^3$ and $R^4$ may be bonded together to form a 5- or 6-membered ring;

a and e each independently represents alkyl group, alkoxy group or halogen atom, wherein when both of a and e are alkyl groups, total of the number of carbons constituting the alkyl groups is 3 or more and each of the alkyl groups may be further substituted, and b, c and d each independently has the same meaning of $R^1$ or $R^2$, wherein a and b may be bonded together to form a condensed ring and e and d may be bonded together to form a condensed ring;

$Z^1$ represents an electron attractive group having a Hammett substituent constant σp value of 0.20 or more;

$Z^2$ represents hydrogen atom, aliphatic group, aryl group or heterocyclic group; and Q represents hydrogen atom, aliphatic group, aryl group or heterocyclic group.

3. The ink composition according to claim 1, wherein the water-soluble organic solvent having a thioether or sulfoxide moiety is selected from the group consisting of 2,2'-thiodiethanol, dimethyl sulfoxide, 2,2-bishydroxyethyl sulfoxide and 3,6-dithiooctane 1,8 diol.

4. The ink composition according to claim 2, wherein the water-soluble organic solvent having a thioether or sulfoxide moiety is selected from the group consisting of 2,2'-thiodiethanol, dimethyl sulfoxide, 2,2-bishydroxyethyl sulfoxide and 3,6-dithiooctane 1,8 diol.

5. A recording method, which comprises discharging ink droplets of an ink composition according to claim 1 onto an image receiving material.

6. A recording method, which comprises discharging ink droplets of an ink composition according to claim 2 onto an image receiving material.

7. The recording method according to claim 5, which is an ink jet recording method.

8. The recording method according to claim 6, which is an ink jet recording method.

* * * * *